(12) United States Patent
Imai et al.

(10) Patent No.: US 11,686,668 B2
(45) Date of Patent: Jun. 27, 2023

(54) ANALYSIS DEVICE

(71) Applicant: Keyence Corporation, Osaka (JP)

(72) Inventors: Ryosuke Imai, Osaka (JP); Kenichiro Hirose, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 17/466,288

(22) Filed: Sep. 3, 2021

(65) Prior Publication Data

US 2022/0349813 A1 Nov. 3, 2022

(30) Foreign Application Priority Data

Apr. 30, 2021 (JP) ................. 2021-077183

(51) Int. Cl.
*G01N 21/25* (2006.01)
*G02B 19/00* (2006.01)
*G02B 5/10* (2006.01)
*G01N 21/31* (2006.01)

(52) U.S. Cl.
CPC ........... *G01N 21/255* (2013.01); *G01N 21/31* (2013.01); *G02B 5/10* (2013.01); *G02B 19/0019* (2013.01)

(58) Field of Classification Search
None
See application file for complete search history.

(56) References Cited

U.S. PATENT DOCUMENTS 5,141,312 A * 8/1992 Thompson ............ G01J 1/0425
356/28
8,209,767 B1 * 6/2012 Manassen ............ G01B 11/026
850/3

(Continued)

FOREIGN PATENT DOCUMENTS

JP 2020113569 A 7/2020

OTHER PUBLICATIONS

U.S. Appl. No. 17/466,271, filed Sep. 3, 2021(120 pages).

*Primary Examiner* — Tarifur R Chowdhury
*Assistant Examiner* — Roberto Fabian, Jr.
(74) *Attorney, Agent, or Firm* — Kilyk & Bowersox, P.L.L.C.

(57) ABSTRACT

An analysis and observation device includes: an electromagnetic wave emitter that emits a primary electromagnetic wave; a reflective object lens having a primary mirror provided with a primary reflection surface reflecting a secondary electromagnetic wave and a secondary mirror provided with a secondary reflection surface receiving and further reflecting the secondary electromagnetic wave; first and second detectors that receive the secondary electromagnetic wave and generate an intensity distribution spectrum; and a controller that performs component analysis of a sample based on the intensity distribution spectrum. A transmissive region through which the primary electromagnetic wave is transmitted is provided at a center of the secondary mirror. The transmissive region transmits the primary electromagnetic wave, which has been emitted from the electromagnetic wave emitter and passed through an opening of the primary mirror, thereby emitting the primary electromagnetic wave along an analysis optical axis of the reflective object lens.

11 Claims, 29 Drawing Sheets

(56) References Cited

U.S. PATENT DOCUMENTS

| | | | |
|---|---|---|---|
| 2003/0094573 A1* | 5/2003 | Lin | G01J 3/42 |
| | | | 250/339.05 |
| 2011/0242528 A1* | 10/2011 | Hwang | G02B 17/084 |
| | | | 359/730 |
| 2016/0266362 A1* | 9/2016 | Kapanidis | G02B 21/0008 |
| 2020/0240907 A1* | 7/2020 | Wang | G01N 21/4788 |

* cited by examiner

FRONT ←　　　　　　　　　　　　　　　→ REAR

FRONT ← → REAR

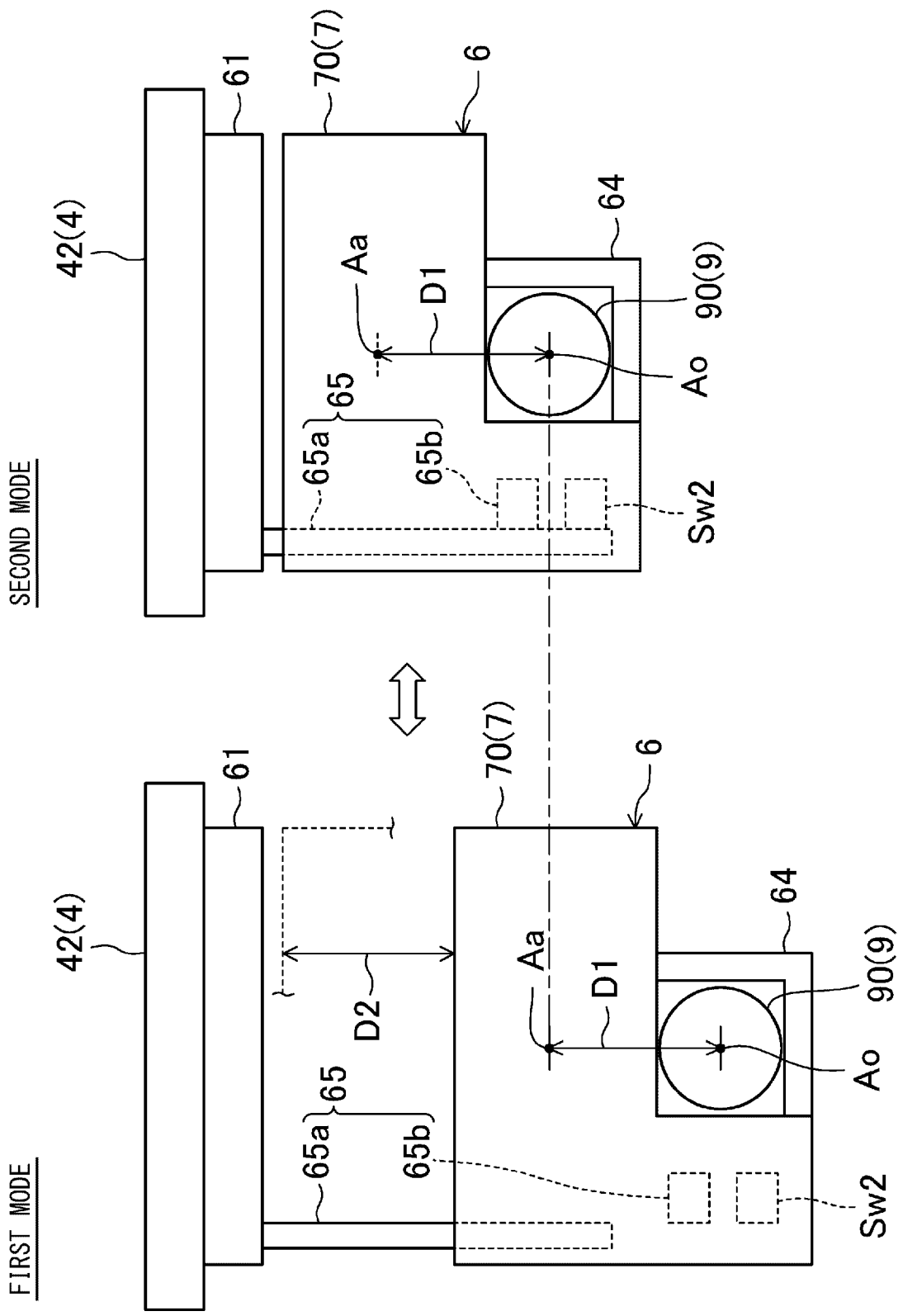

FIG. 16A
FIRST MODE
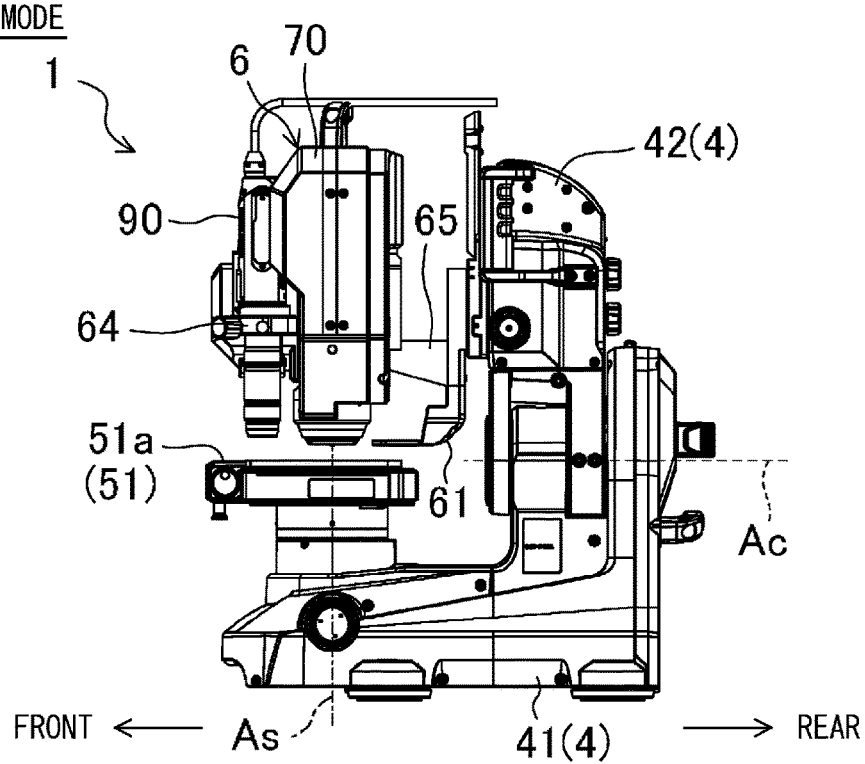
SECOND MODE
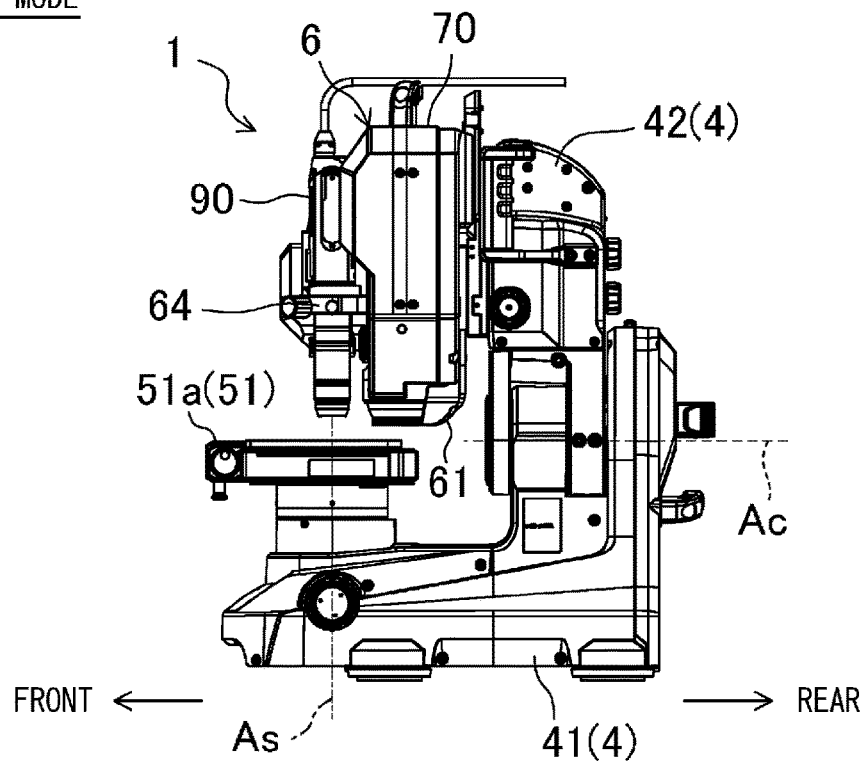

FIG. 16B
FIRST MODE
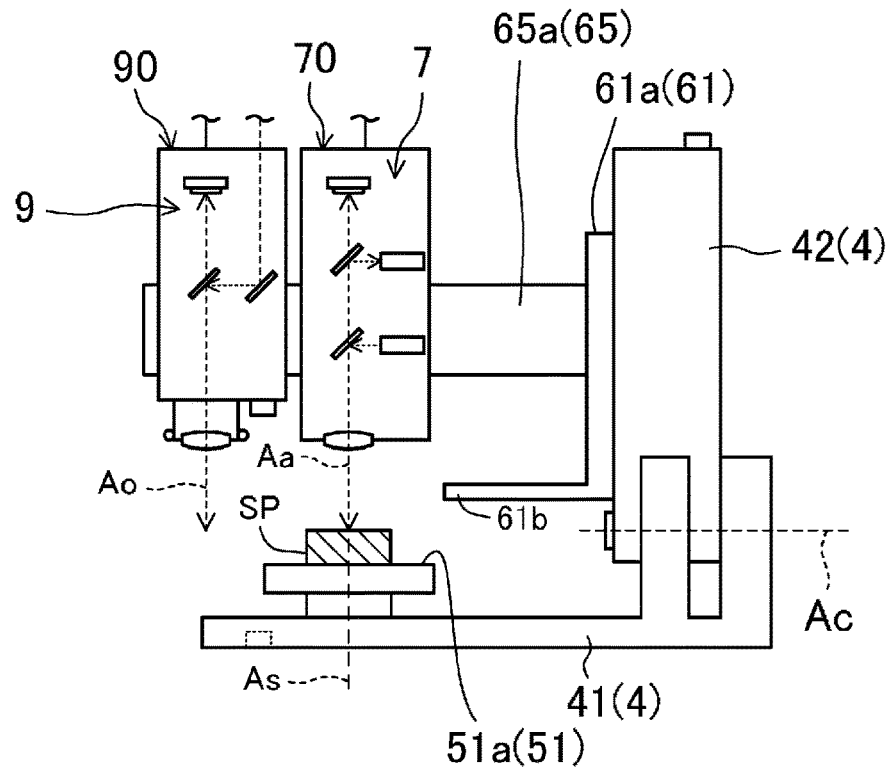
SECOND MODE
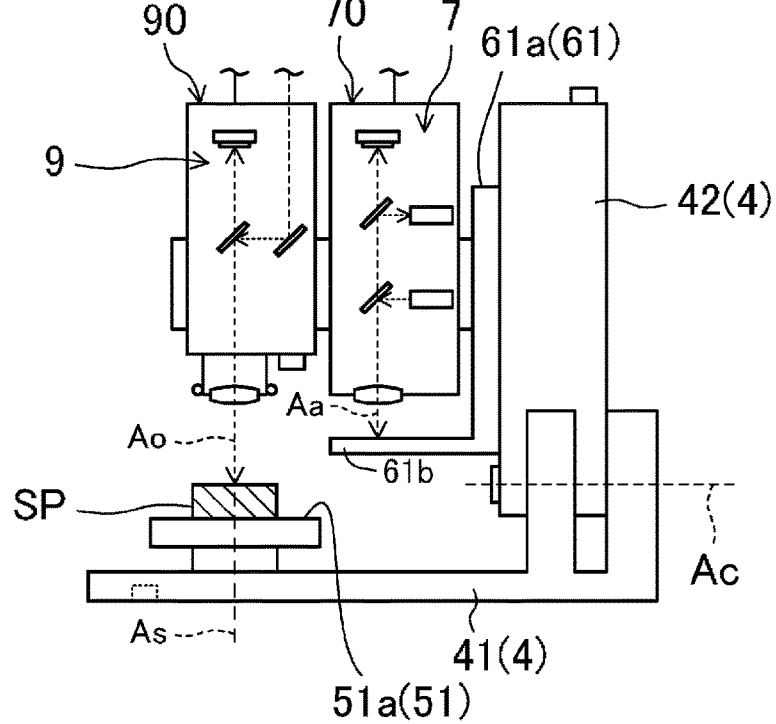

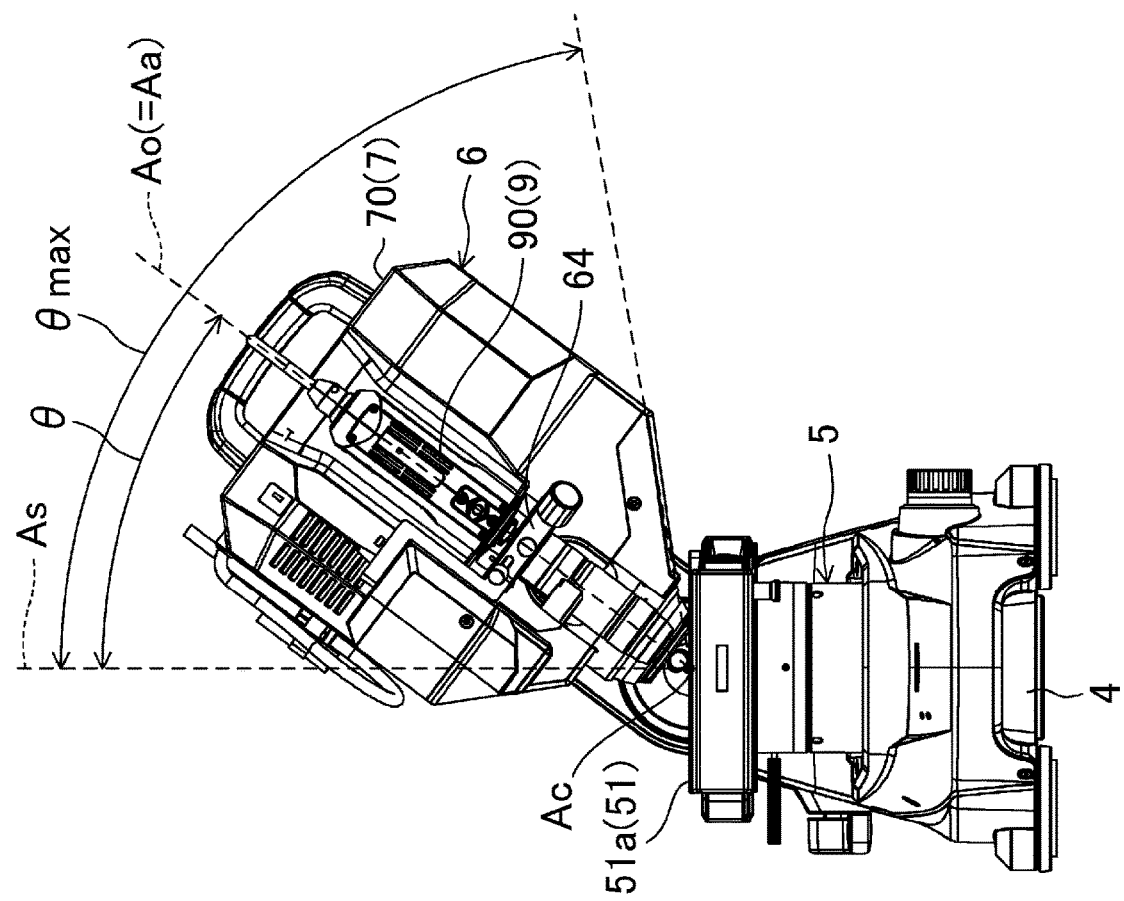
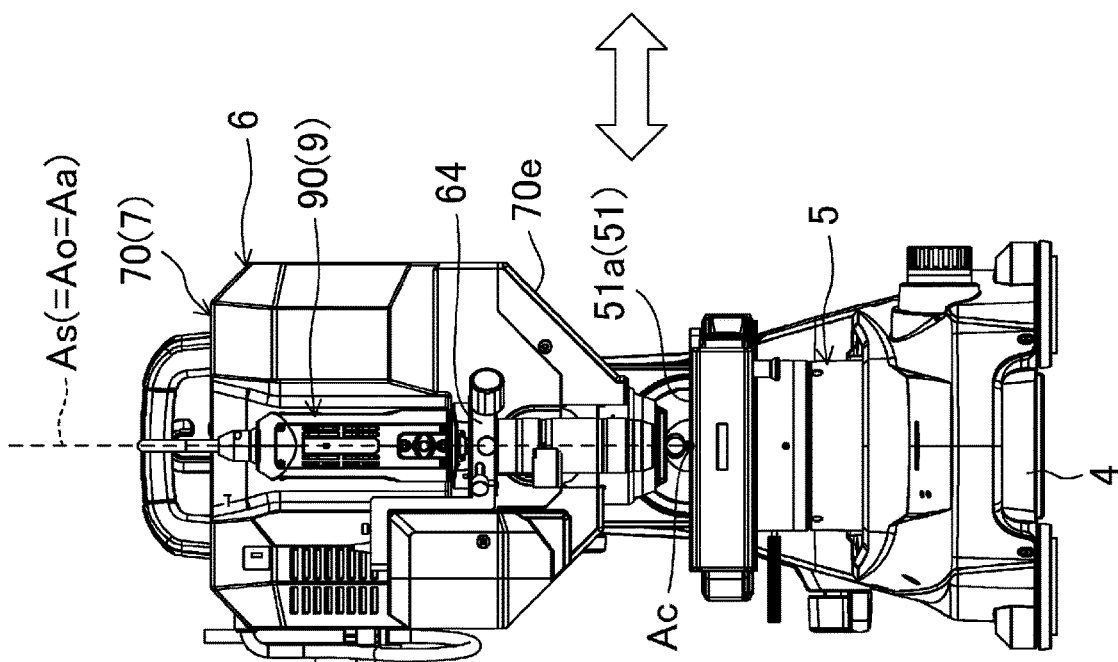
FIG. 17A

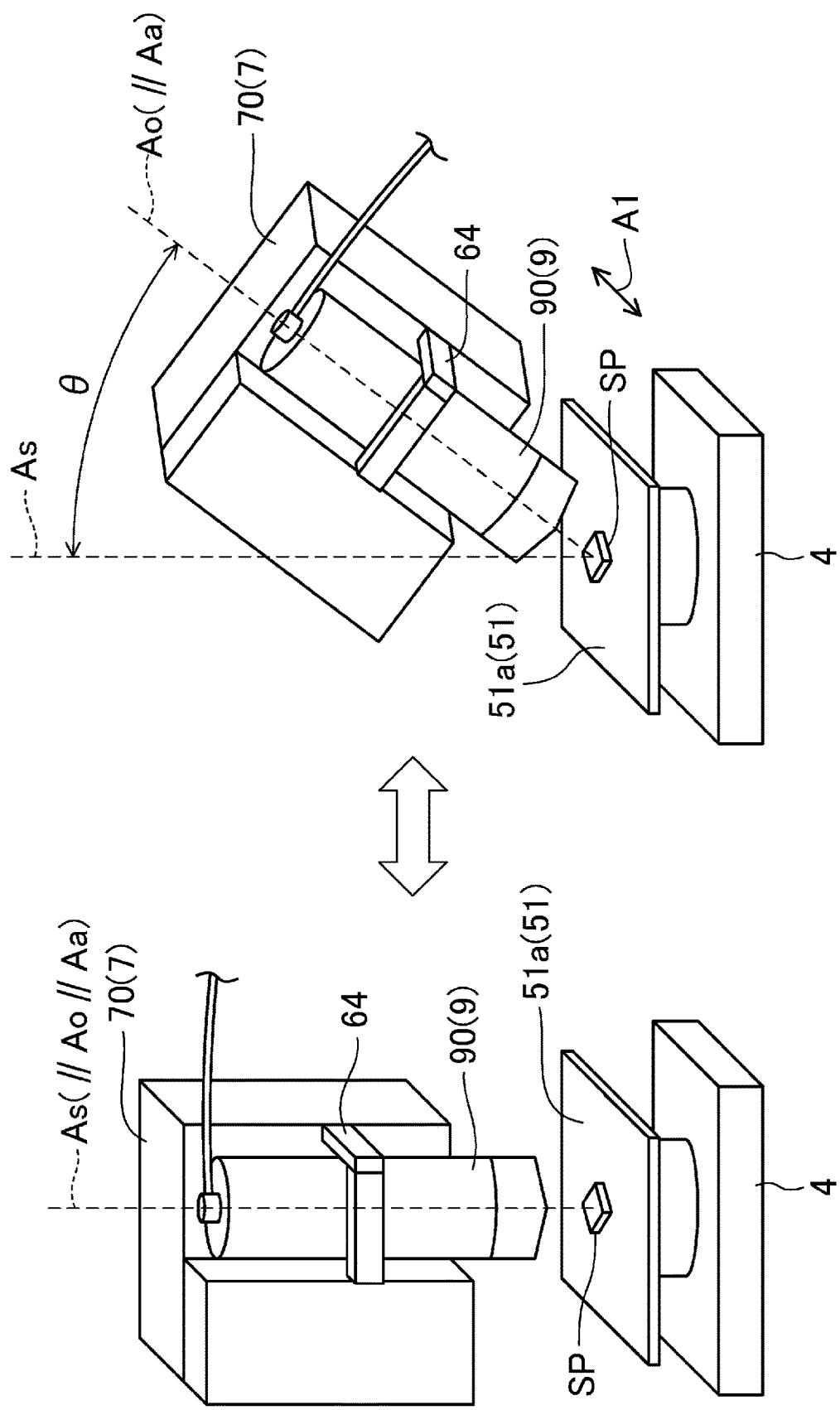

FIG. 28
ANNULAR ILLUMINATOR
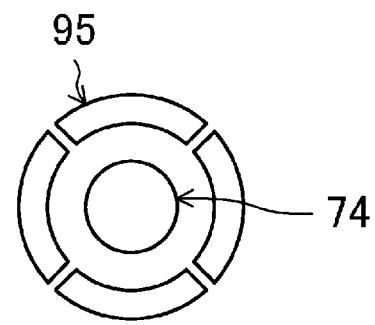
RECTANGULAR ILLUMINATOR
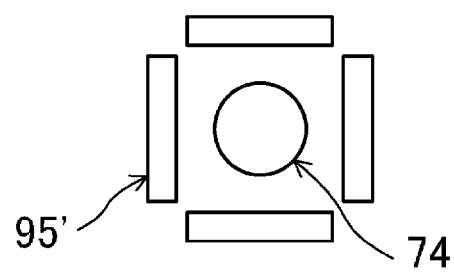
CROSS-SHAPED ILLUMINATOR
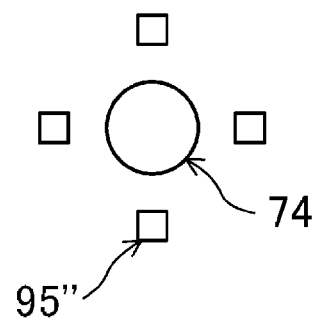

ANALYSIS DEVICE

CROSS-REFERENCE TO RELATED APPLICATIONS

The present application claims foreign priority based on Japanese Patent Application No. 2021-077183, filed Apr. 30, 2021, the contents of which are incorporated herein by reference.

BACKGROUND OF THE INVENTION

1. Field of the Invention

The technology disclosed herein relates to an analysis device.

2. Description of Related Art

For example, JP 2020-113569 A discloses an analysis device (spectroscopic device) configured to perform component analysis of a sample. Specifically, the spectroscopic device disclosed in JP 2020-113569 A includes a condenser lens, configured to collect a primary electromagnetic wave (ultraviolet laser light), and a collection head configured to collect a secondary electromagnetic wave (plasma) generated on a sample surface in response to the primary electromagnetic wave in order to perform the component analysis using laser induced breakdown spectroscopy (LIBS). According to JP 2020-113569 A, a peak of a spectrum of the sample is measured from a signal of the secondary electromagnetic wave so that chemical analysis of the sample based on the measured peak can be executed.

Further, the collection head according to JP 2020-113569 A is connected to a detector (spectrometer) via an optical fiber.

The secondary electromagnetic wave (plasma) generated on the sample surface is guided to the detector (spectrometer) via the optical fiber.

Meanwhile, the secondary electromagnetic wave guided to the detector is likely to be attenuated in the analysis device as disclosed in JP 2020-113569 A, which is disadvantageous in terms of implementing improvement in analysis accuracy.

SUMMARY OF THE INVENTION

The technology disclosed herein has been made in view of such points, and an object thereof is to improve analysis accuracy in an analysis device that uses a primary electromagnetic wave and a secondary electromagnetic wave.

One embodiment of the present disclosure relates to an analysis device that performs component analysis of an analyte. The analysis device includes: an electromagnetic wave emitter that emits a primary electromagnetic wave for analysis of the analyte; a reflective object lens that has a primary mirror in which an opening is provided at a radial center and a primary reflection surface reflecting a secondary electromagnetic wave, generated in the analyte in response to the emission of the primary electromagnetic wave, is provided around the opening, and a secondary mirror provided with a secondary reflection surface that receives and further reflects the secondary electromagnetic wave reflected by the primary reflection surface, the reflective object lens collecting the secondary electromagnetic waves by the primary mirror and the secondary mirror and guiding the secondary electromagnetic waves to the opening; a detector that receives the secondary electromagnetic wave generated in the analyte and collected by the reflective object lens, and generates an intensity distribution spectrum which is an intensity distribution for each wavelength of the secondary electromagnetic wave; and a processor that performs the component analysis of the analyte based on the intensity distribution spectrum generated by the detector. The secondary reflection surface is provided at an outer edge of the secondary mirror, and a transmissive region through which the primary electromagnetic wave is transmitted is provided at a center of the secondary mirror.

Then, according to the one embodiment of the present disclosure, the transmissive region is configured to transmit the primary electromagnetic wave, which has been emitted from the electromagnetic wave emitter and passed through the opening, to emit the primary electromagnetic wave along an optical axis of the reflective object lens.

According to the one embodiment, the primary electromagnetic wave is emitted to the analyte in a state of being coaxial with the optical axis of the reflective object lens, that is, in a state having no angle. As a result, the secondary electromagnetic wave generated in the analyte can be collected as sufficiently as possible by the primary mirror. As a result, the intensity of the secondary electromagnetic wave reaching the detector can be increased, and the detection accuracy of the analysis device can be enhanced.

Further, according to another embodiment of the present disclosure, the analysis device may further include a parabolic mirror that reflects the secondary electromagnetic wave collected by the reflective object lens, and the parabolic mirror may be configured to condense the secondary electromagnetic wave, reflected by the parabolic mirror, on the detector.

According to the another embodiment, the secondary electromagnetic wave reaches the detector via the parabolic mirror. Since the secondary electromagnetic wave is guided by a reflection system in this manner, it is possible to implement a fiberless configuration that does not require an optical fiber. As a result, a loss of the secondary electromagnetic wave is suppressed as much as possible, which is advantageous in terms of enhancing the detection accuracy of the analysis device.

Further, according to still another embodiment of the present disclosure, the analysis device may include a spectroscopic element made of a material in which a second wavelength region belonging to a wavelength region equal to or more than a predetermined wavelength has a higher transmittance than a first wavelength region belonging to a wavelength region less than the predetermined wavelength. The spectroscopic element may be configured to receive the secondary electromagnetic wave collected by the reflective object lens and reflect the secondary electromagnetic wave corresponding to the first wavelength region out of the secondary electromagnetic waves, and to transmit the secondary electromagnetic wave corresponding to the second wavelength region. The detector may have a first detector on which the secondary electromagnetic wave reflected by the spectroscopic element is incident, and a second detector on which the secondary electromagnetic wave transmitted through the spectroscopic element is incident.

According to the still another embodiment, the analysis device is configured to guide the first wavelength region on the ultraviolet side, which is likely to be lost due to transmission through a glass material, to the first detector without requiring the transmission through the glass material, and to cause the second wavelength region on the infrared side, which is less affected by the loss than the first wavelength region, to be transmitted through the glass material and guided to the second detector. With this configuration, it is possible to implement detection by the plurality of detectors while suppressing the loss of the secondary electromagnetic wave as much as possible. The detection by the plurality of detectors contributes to improvement of wavelength resolution. This contributes to improvement of measurement accuracy due to suppression of the loss of the secondary electromagnetic wave and improvement of the wavelength resolution.

Further, according to still another embodiment of the present disclosure, the analysis device may include a deflection element on which the primary electromagnetic wave emitted from the electromagnetic wave emitter is incident and which deflects the primary electromagnetic wave in an optical axis direction of the reflective object lens. The deflection element may have a reflective region arranged to oppose the transmissive region so as to reflect the primary electromagnetic wave along the optical axis direction of the reflective object lens, and a hollow region allowing passage of the secondary electromagnetic wave collected by the reflective object lens.

According to the still another embodiment, the deflection element reflects the primary electromagnetic wave by the reflective region to be guided to the reflective object lens, and allows the secondary electromagnetic wave to pass through the hollow region. The loss of the secondary electromagnetic wave can be suppressed by allowing the secondary electromagnetic wave to pass through the hollow region. Therefore, the still another embodiment is advantageous in terms of achieving both coaxial setting of the coaxial primary electromagnetic wave by the reflective region and improvement of measurement accuracy due to the suppression of loss of the secondary electromagnetic wave.

Further, according to still another embodiment of the present disclosure, the analysis device may include an analysis housing that accommodates the deflection element. The deflection element may have: a plate-shaped element supporter attached to the analysis housing and provided with a through-hole; a mirror member which is arranged at a center of the through-hole and forms the reflective region; and a first supporting leg which radially extends from an outer side surface of the mirror member and is connected to an inner side surface of the through-hole. The hollow region may be defined by the inner side surface of the through-hole and the outer side surface of the mirror member.

According to the still another embodiment, the reflective region and the hollow region can be simultaneously achieved by the single deflection element. Such a configuration is advantageous in terms of achieving both the coaxial setting of the coaxial primary electromagnetic wave by the reflective region and the improvement of measurement accuracy due to the suppression of loss of the secondary electromagnetic wave.

Further, according to still another embodiment of the present disclosure, the secondary mirror may be connected to the analysis housing via an annular mirror supporter arranged around the secondary reflection surface and attached to the analysis housing, and a second supporting leg which radially extends from an outer edge of the secondary reflection surface and is connected to an inner peripheral surface of the mirror supporter. The first and second supporting legs may be arranged to overlap each other when viewed along the optical axis direction of the reflective object lens.

According to the still another embodiment, the secondary electromagnetic wave having passed through a region near the first supporting leg can pass through the deflection element without being blocked by the second supporting leg. This is advantageous in terms of suppressing the loss of the secondary electromagnetic wave and achieving the improvement of the measurement accuracy in the analysis device.

Further, according to still another embodiment of the present disclosure, the element supporter may be attached to the analysis housing in a posture in which a thickness direction is tilted with respect to the optical axis direction of the reflective object lens, and the through-hole may be formed so as to penetrate the element supporter along the optical axis direction of the reflective object lens.

According to the still another embodiment, the through-hole defining the hollow region is formed to extend along the optical axis direction of the reflective object lens. When being formed in this manner, the through-hole can be configured to be rotationally symmetric about the optical axis. As a result, it is possible to secure a distance between the inner peripheral surface of the through-hole and the secondary electromagnetic wave passing through the hollow region and to suppress interference between the through-hole and the secondary electromagnetic wave. This is advantageous in terms of suppressing the loss of the secondary electromagnetic wave, and contributes to the improvement of measurement accuracy.

Further, according to still another embodiment of the present disclosure, the analysis device may include a camera that collects reflection light, reflected by the analyte via the reflective object lens, and detects a light reception amount of the collected reflection light, and the camera may collect the reflection light via an optical path common to the secondary electromagnetic wave collected by the reflective object lens.

According to this configuration, not only the primary electromagnetic wave but also an optical axis of the camera is set to be coaxial with the reflective object lens. As a result, three functions including irradiation of the analyte with the primary electromagnetic wave, collection of the secondary electromagnetic wave from the analyte, and capturing of the analyte by the camera can be implemented by the single reflective object lens without inhibiting each other.

Further, according to still another embodiment of the present disclosure, an optical thin film that blocks the reflection light reflected by the analyte may be interposed between the transmissive region and a placement surface on which the analyte is placed, and the camera may collect reflection light reflected by the primary reflection surface and the secondary reflection surface.

According to the still another embodiment, the collection of the reflection light through the transmissive region can be suppressed, and the reflection light can be collected only by the primary reflection surface and the secondary reflection surface. As a result, a possibility that the reflection light is doubly captured in the camera is suppressed, which is advantageous in terms of improving the measurement accuracy.

Further, according to still another embodiment of the present disclosure, the analysis device may include a coaxial illuminator that irradiates the analyte with illumination light, and the coaxial illuminator may emit the illumination light via an optical path coaxial with the primary electromagnetic wave emitted from the electromagnetic wave emitter.

According to this configuration, not only the optical axis of the camera but also an illumination device is also set to be coaxial with the reflective object lens. As a result, four functions including the irradiation of the analyte with the primary electromagnetic wave, the collection of the secondary electromagnetic wave from the analyte, the capturing of the analyte by the camera, and irradiation of the analyte with the illumination light can be implemented by the single reflective object lens without inhibiting each other.

Further, according to still another embodiment of the present disclosure, the electromagnetic wave emitter may be configured using a laser light source that emits laser light as the primary electromagnetic wave. The reflective object lens may collect light generated in the analyte in response to irradiation of the laser light emitted from the electromagnetic wave emitter. The detector may generate an intensity distribution spectrum which is an intensity distribution for each wavelength of light generated in the analyte and collected by the reflective object lens.

As described above, the analysis accuracy can be improved in the analysis device that uses the primary electromagnetic wave and the secondary electromagnetic wave according to the present disclosure.

BRIEF DESCRIPTION OF THE DRAWINGS

FIG. 15 is a schematic view for describing a configuration of a slide mechanism;

FIG. 16A is a view for describing horizontal movement of a head;

FIG. 16B is a view for describing the horizontal movement of the head;

FIG. 17A is a view for describing an operation of a tilting mechanism;

FIG. 17B is a view for describing the operation of the tilting mechanism;

FIG. 28 is a bottom view illustrating a modification of the side illuminator.

DETAILED DESCRIPTION OF PREFERRED EMBODIMENTS

Hereinafter, an embodiment of the present disclosure will be described with reference to the drawings. Note that the following description is given as an example.

<Overall Configuration of Analysis and Observation Device A>

Figure 1:
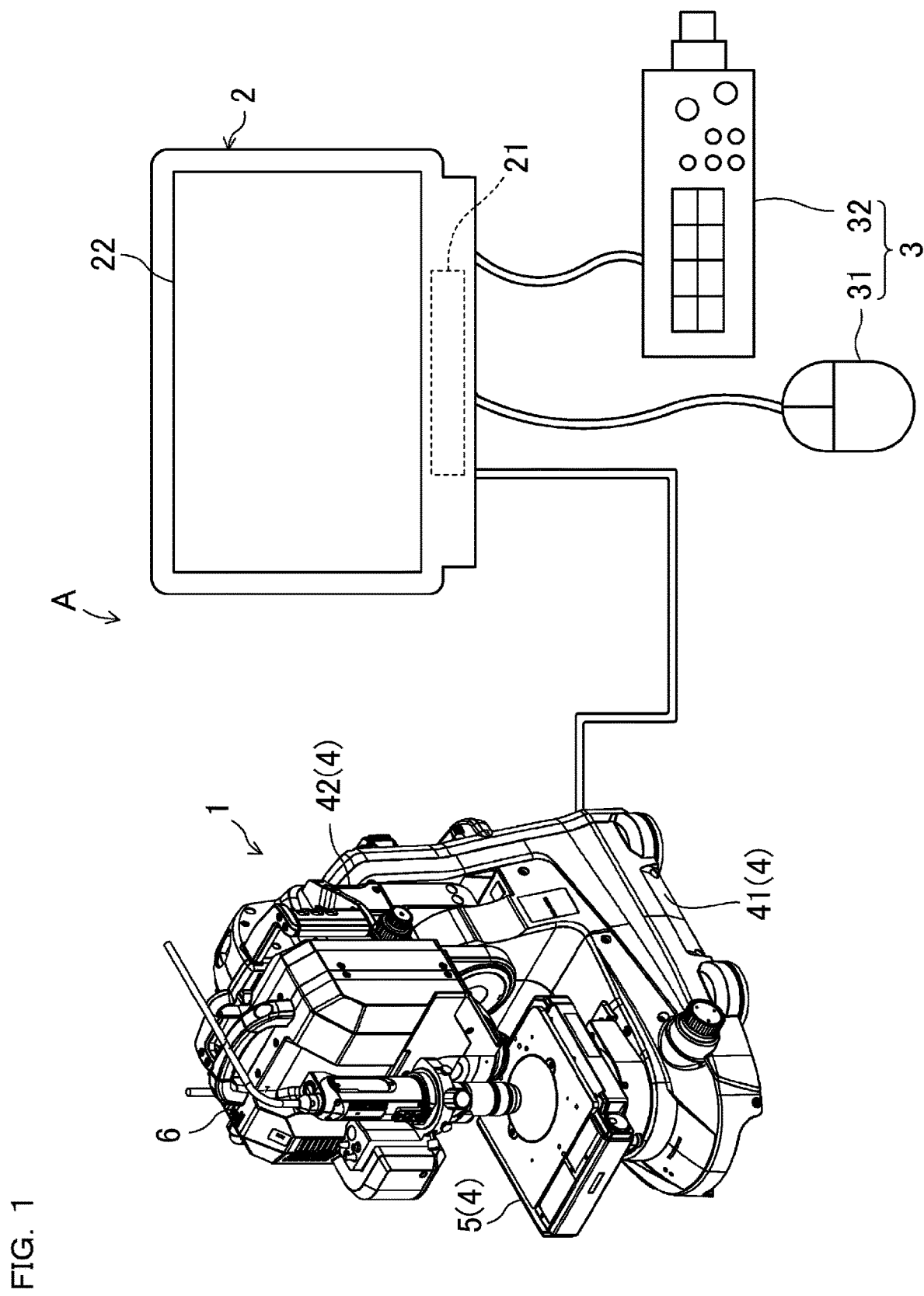
FIG. 1 is a schematic diagram illustrating an overall configuration of an analysis and observation device.

FIG. 1 is a schematic diagram illustrating an overall configuration of an analysis and observation device A as an analysis device according to an embodiment of the present disclosure. The analysis and observation device A illustrated in FIG. 1 can perform magnifying observation of a sample SP, which serves as both of an observation target and an analyte, and can also perform component analysis of the sample SP.

Specifically, for example, the analysis and observation device A according to the present embodiment can search for a site where component analysis is to be performed in the sample SP and perform inspection, measurement, and the like of an appearance of the site by magnifying and capturing an image of the sample SP including a specimen such as a micro object, an electronic component, a workpiece, and the like. When focusing on an observation function, the analysis and observation device A can be referred to as a magnifying observation device, simply as a microscope, or as a digital microscope.

The analysis and observation device A can also perform a method referred to as a laser induced breakdown spectroscopy (LIBS), laser induced plasma spectroscopy (LIPS), or the like in the component analysis of the sample SP. When focusing on an analysis function, the analysis and observation device A can be referred to as a component analysis device, simply as an analysis device, or as a spectroscopic device.

As illustrated in FIG. 1, the analysis and observation device A according to the present embodiment includes an optical system assembly (optical system main body) 1, a controller main body 2, and an operation section 3 as main constituent elements.

Among them, the optical system assembly 1 can perform capturing and analysis of the sample SP and output an electrical signal corresponding to a capturing result and an analysis result to the outside.

The controller main body 2 includes a controller 21 configured to control various components constituting the optical system assembly 1 such as a first camera 81. The controller main body 2 can cause the optical system assembly 1 to observe and analyze the sample SP using the controller 21. The controller main body 2 also includes a display 22 capable of displaying various types of information. The display 22 can display an image captured in the optical system assembly 1, data indicating the analysis result of the sample SP, and the like.

Figure 18:
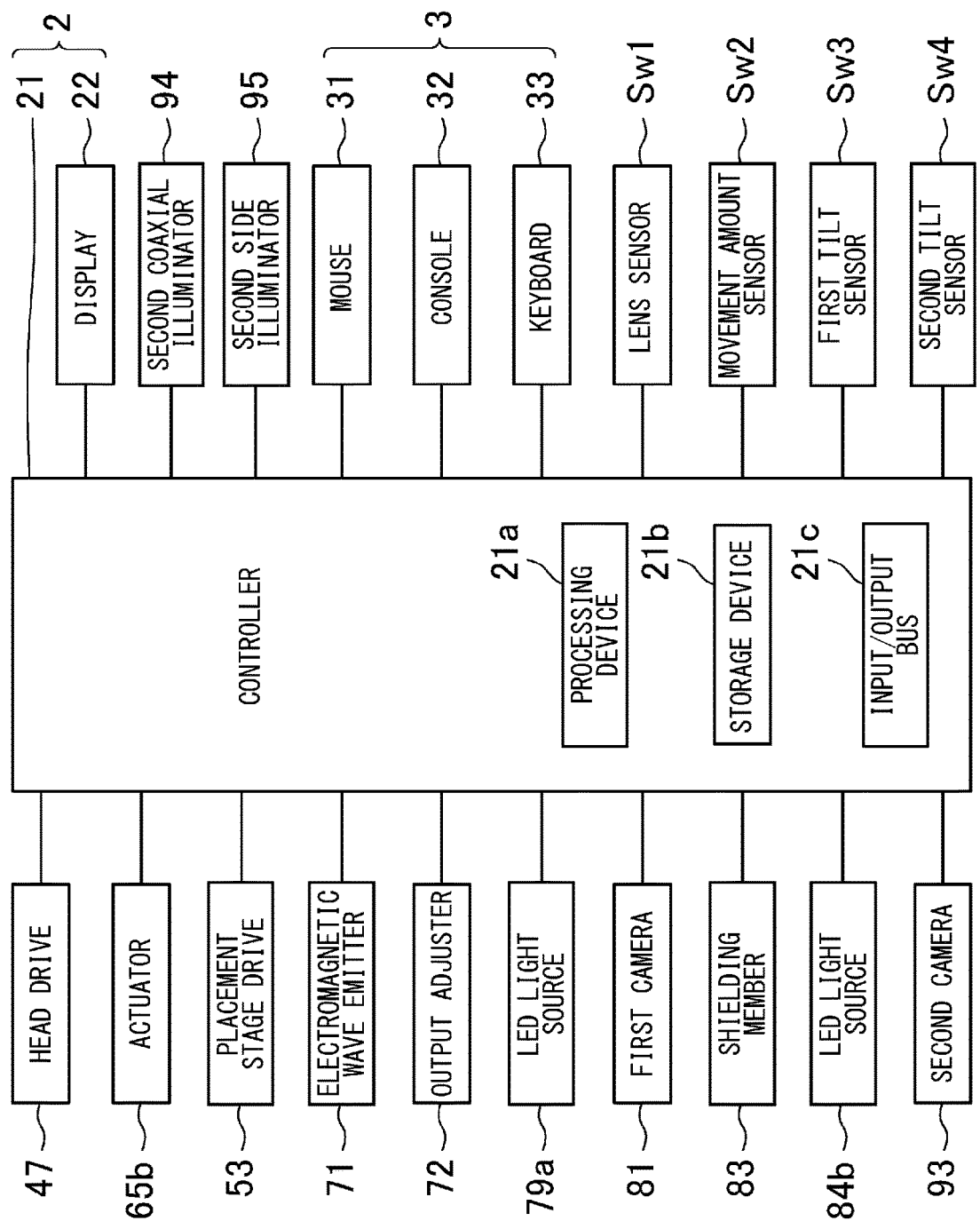
FIG. 18 is a block diagram illustrating a configuration of a controller main body.

The operation section 3 includes a mouse 31, a console 32, and a keyboard 33 that receive an operation input by a user (the keyboard 33 is illustrated only in FIG. 18). The console 32 can instruct acquisition of image data, brightness adjustment, and focusing of the first camera 81 to the controller main body 2 by operating a button, an adjustment knob, and the like.

Note that the operation section 3 does not necessarily include all three of the mouse 31, the console 32, and the keyboard 33, and may include any one or two. Further, a touch-panel-type input device, an audio-type input device, or the like may be used in addition to or instead of the mouse 31, the console 32, and the keyboard 33. In the case of the touch-panel-type input device, any position on a screen displayed on the display 22 can be detected.

<Details of Optical System Assembly 1>

Figure 2:
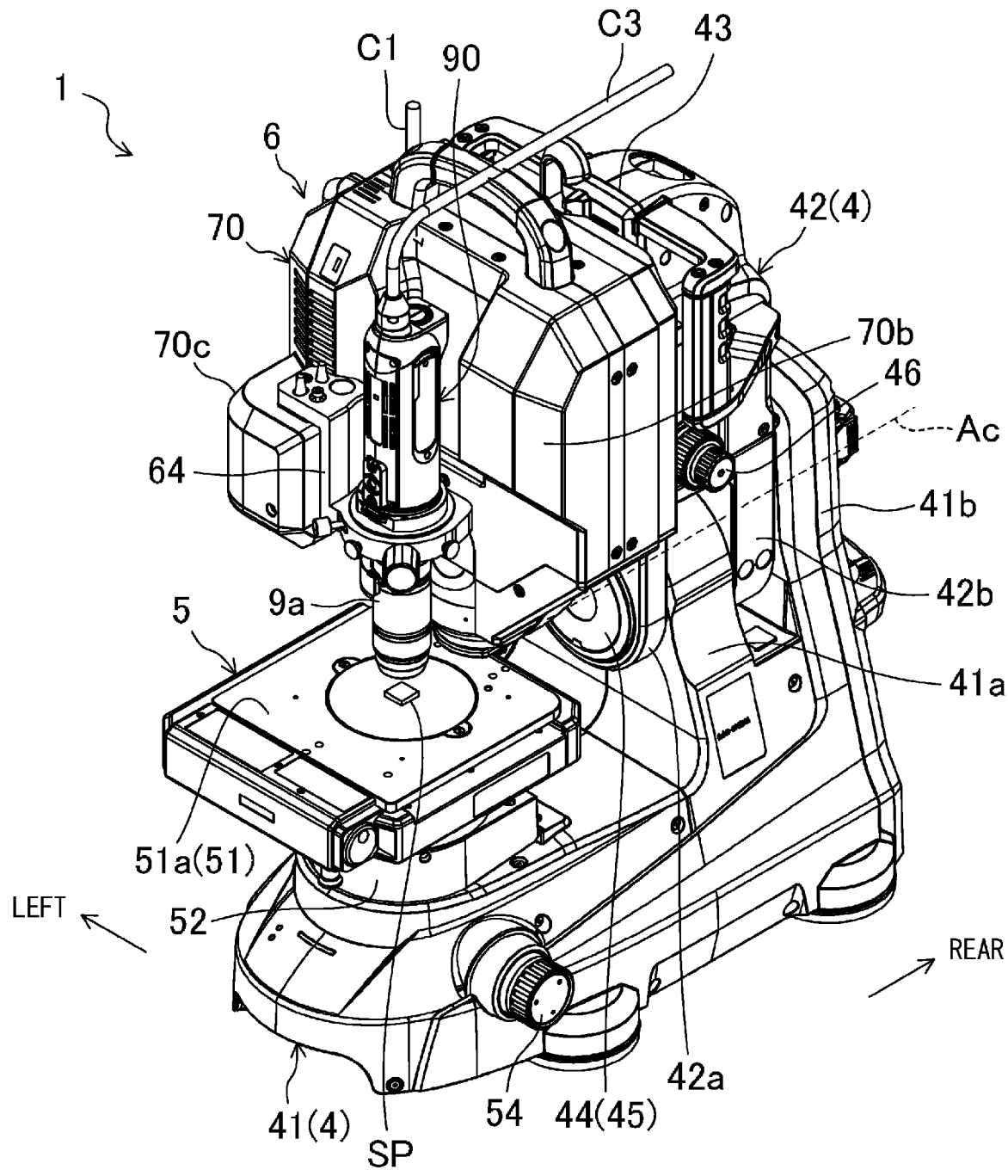
FIG. 2 is a perspective view illustrating an optical system assembly.
Figure 3:
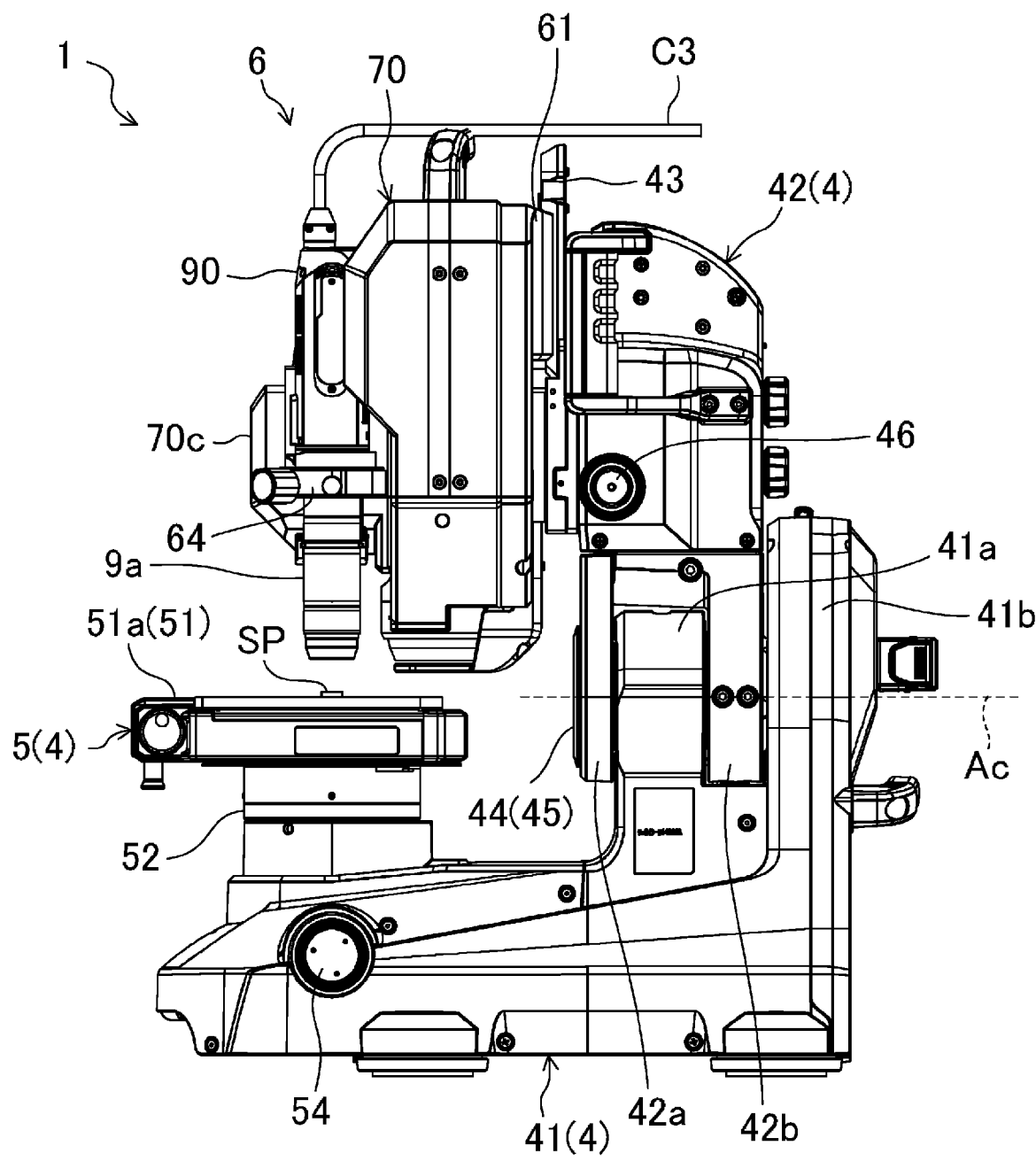
FIG. 3 is a side view illustrating the optical system assembly.
Figure 4:
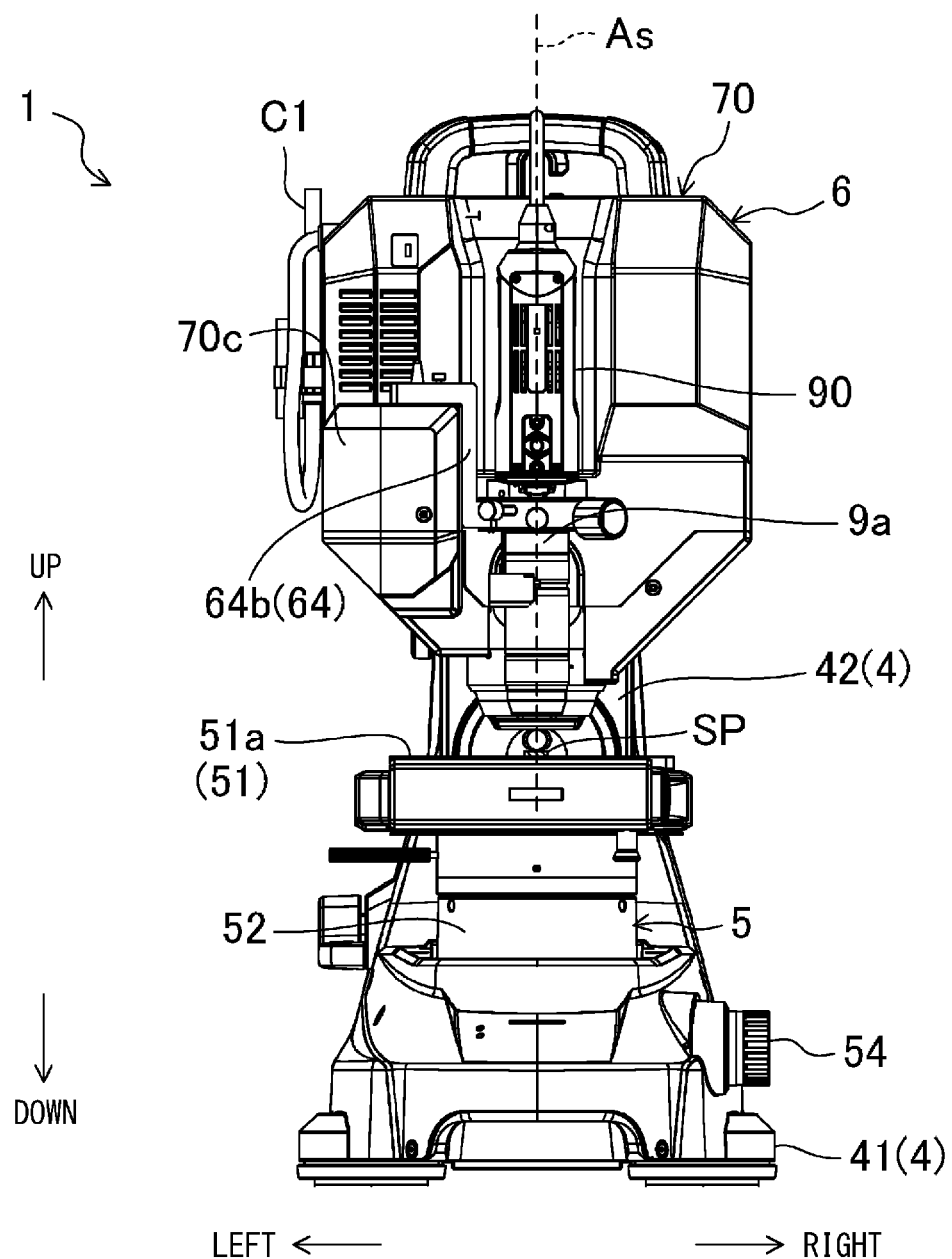
FIG. 4 is a front view illustrating the optical system assembly.
Figure 5:
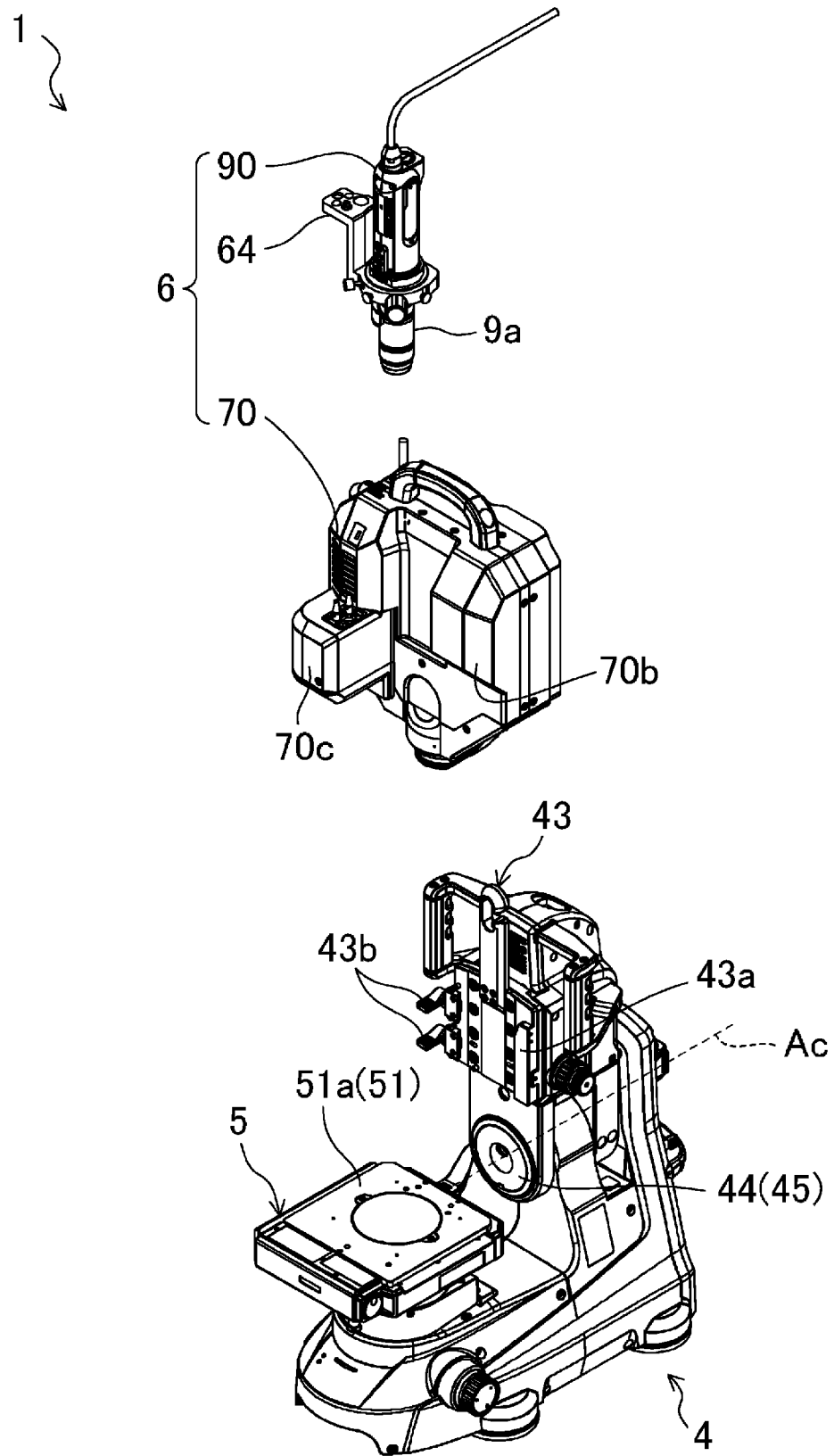
FIG. 5 is an exploded perspective view illustrating the optical system assembly.
Figure 6:
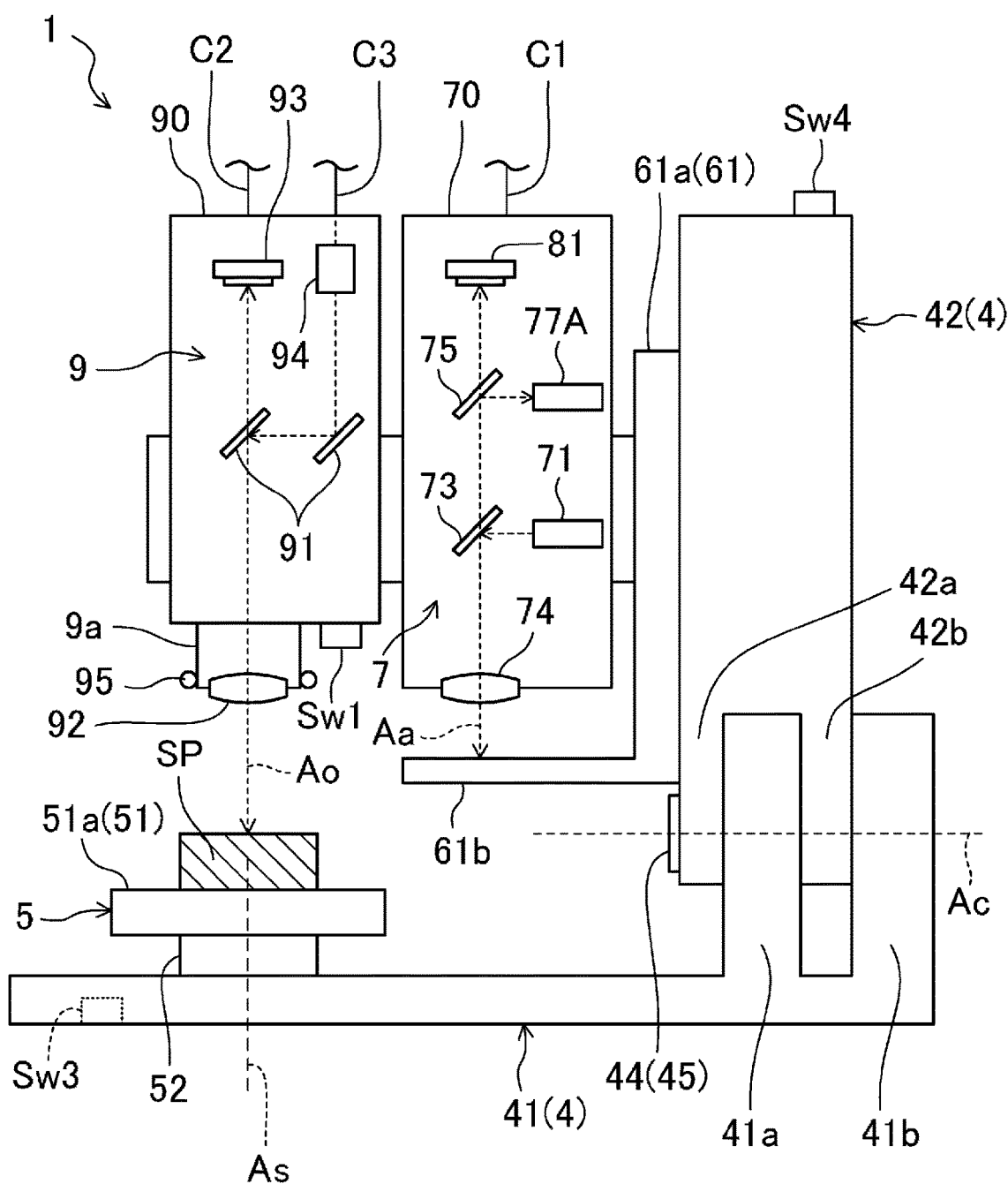
FIG. 6 is a side view schematically illustrating a configuration of the optical system assembly.

FIGS. 2 to 4 are a perspective view, a side view, and a front view respectively illustrating the optical system assembly 1. Further, FIG. 5 is an exploded perspective view of the optical system assembly 1, and FIG. 6 is a side view schematically illustrating a configuration of the optical system assembly 1.

As illustrated in FIGS. 1 to 6, the optical system assembly 1 includes: a stage 4 which supports various instruments and on which the sample SP is placed; and a head 6 attached to the stage 4. Here, the head 6 is formed by mounting an observation housing 90 in which an observation optical system 9 is accommodated onto an analysis housing 70 in which an analysis optical system 7 is accommodated. Here, the analysis optical system 7 is an optical system configured to perform the component analysis of the sample SP. The observation optical system 9 is an optical system configured to perform the magnifying observation of the sample SP. The head 6 is configured as a device group having both of an analysis function and a magnifying observation function of the sample SP.

Note that the front-rear direction and the left-right direction of optical system assembly 1 are defined as illustrated in FIGS. 1 to 4 in the following description. That is, one side opposing the user is a front side of the optical system assembly 1, and an opposite side thereof is a rear side of the optical system assembly 1. When the user opposes the optical system assembly 1, a right side as viewed from the user is a right side of the optical system assembly 1, and a left side as viewed from the user is a left side of the optical system assembly 1. Note that the definitions of the front-rear direction and the left-right direction are intended to help understanding of the description, and do not limit an actual use state. Any direction may be used as the front.

Further, in the following description, the left-right direction of the optical system assembly 1 is defined as an "X direction", the front-rear direction of the optical system assembly 1 is defined as a "Y direction", a vertical direction of the optical system assembly 1 is defined as a "Z direction", and a direction rotating about an axis parallel to the Z axis is defined as a "φ direction". The X direction and the Y direction are orthogonal to each other on the same horizontal plane, and a direction along the horizontal plane is defined as a "horizontal direction". The Z axis is a direction of a normal line orthogonal to the horizontal plane. These definitions can also be changed as appropriate.

The head 6 can move along a central axis Ac illustrated in FIGS. 2 to 6 or swing about the central axis Ac although will be described in detail later. As illustrated in FIG. 6 and the like, the central axis Ac extends along the above-described horizontal direction, particularly the front-rear direction.

(Stage 4)

The stage 4 includes a base 41 installed on a workbench or the like, a stand 42 connected to the base 41, and a placement stage 5 supported by the base 41 or the stand 42. The stage 4 is a member configured to define a relative positional relation between the placement stage 5 and the head 6, and is configured such that at least the observation optical system 9 and the analysis optical system 7 of the head 6 are attachable thereto.

The base 41 forms a substantially lower half of the stage 4, and is formed in a pedestal shape such that a dimension in the front-rear direction is longer than a dimension in the left-right direction as illustrated in FIG. 2. The base 41 has a bottom surface to be installed on the workbench or the like. The placement stage 5 is attached to a front portion of the base 41.

Further, a first supporter 41a and a second supporter 41b are provided in a state of being arranged side by side in order from the front side on the rear side portion (in particular, a portion located on the rear side of the placement stage 5) of the base 41 as illustrated in FIG. 6 and the like. Both the first and second supporters 41a and 41b are provided so as to protrude upward from the base 41. Circular bearing holes (not illustrated) arranged to be concentric with the central axis Ac are formed in the first and second supporters 41a and 41b.

The stand 42 forms an upper half of the stage 4, and is formed in a columnar shape extending in the vertical direction perpendicular to the base 41 (particularly, the bottom surface of the base 41) as illustrated in FIGS. 2 to 3, 6, and the like. The head 6 is attached to a front surface of an upper portion of the stand 42 via a separate mounting tool 43.

Further, a first attachment section 42a and a second attachment section 42b are provided in a lower portion of the stand 42 in a state of being arranged side by side in order from the front side as illustrated in FIG. 6 and the like. The first and second attachment sections 42a and 42b have configurations corresponding to the first and second supporters 41a and 41b, respectively. Specifically, the first and second supporters 41a and 41b and the first and second attachment sections 42a and 42b are laid out such that the first attachment section 41a is sandwiched between the first attachment section 42a and the second attachment section 42b and the second attachment section 42b is sandwiched between the first supporter 41a and the second supporter 41b.

Further, circular bearing holes (not illustrated) concentric with and having the same diameter as the bearing holes formed in the first and second attachment sections 42a and 42b are formed in the first and second supporters 41a and 41b. A shaft member 44 is inserted into these bearing holes via a bearing (not illustrated) such as a cross-roller bearing. The shaft member 44 is arranged such that the axis thereof is concentric with the central axis Ac. The base 41 and the stand 42 are coupled so as to be relatively swingable by inserting the shaft member 44. The shaft member 44 forms a tilting mechanism 45 in the present embodiment together with the first and second supporters 41*a* and 41*b* and the first and second attachment sections 42*a* and 42*b*.

As the base 41 and the stand 42 are coupled via the tilting mechanism 45, the stand 42 is supported by the base 41 in the state of being swingable about the central axis Ac. The stand 42 swings about the central axis Ac to be tilted in the left-right direction with respect to a predetermined reference axis As (see FIGS. 17A and 17B). The reference axis As can be set as an axis extending perpendicularly to an upper surface (placement surface 51*a*) of the placement stage 5 in a non-tilted state illustrated in FIG. 4 and the like. Further, the central axis Ac functions as a central axis (rotation center) of swing caused by the tilting mechanism 45.

Specifically, the tilting mechanism 45 according to the present embodiment can tilt the stand 42 rightward by about 90° with respect to the reference axis As or leftward by about 60° with respect to the reference axis As. Since the head 6 is attached to the stand 42 as described above, the head 6 can also be tilted in the left-right direction with respect to the reference axis As. Tilting the head 6 is equivalent to tilting the analysis optical system 7 and the observation optical system 9, and eventually, tilting an analysis optical axis Aa and an observation optical axis Ao which will be described later.

The mounting tool 43 includes: a rail 43*a* that guides the head 6 along a longitudinal direction (which corresponds to the vertical direction in the non-tilted state and will be hereinafter referred to as a "substantially vertical direction") of the stand 42; and a lock lever 43*b* configured to lock a relative position of the head 6 with respect to the rail 43*a*. A rear surface portion (specifically, a head attachment member 61) of the head 6 is inserted into the rail 43*a*, and can be moved along the substantially vertical direction. Then, the head 6 can be fixed at a desired position by operating the lock lever 43*b* in a state where the head 6 is set at a desired position. Further, the position of the head 6 can also be adjusted by operating a first operation dial 46 illustrated in FIGS. 2 to 3.

Further, the stage 4 or the head 6 incorporates a head drive 47 configured to move the head 6 in the substantially vertical direction. The head drive 47 includes an actuator (for example, a stepping motor) (not illustrated) controlled by the controller main body 2 and a motion conversion mechanism that converts the rotation of an output shaft of the stepping motor into a linear motion in the substantially vertical direction, and moves the head 6 based on a drive pulse input from the controller main body 2. When the head drive 47 moves the head 6, the head 6, and eventually, the analysis optical axis Aa and the observation optical axis Ao can be moved along the substantially vertical direction.

The placement stage 5 is arranged on the front side of the center of the base 41 in the front-rear direction, and is attached to an upper surface of the base 41. The placement stage 5 is configured as an electric placement stage provided in an open space, and can cause the sample SP placed on the placement surface 51*a* to move along the horizontal direction, to move up and down along the vertical direction, or to rotate along the φ direction.

Specifically, the placement stage 5 according to the present embodiment includes: a placement stage main body 51 having the placement surface 51*a* configured for mounting of the sample SP; a placement stage supporter 52 that is arranged between the base 41 and the placement stage main body 51 and displaces the placement stage main body 51; and a placement stage drive 53 illustrated in FIG. 18 which will be described later.

An upper surface of the placement stage main body 51 forms the placement surface 51*a*. The placement surface 51*a* is formed to extend along the substantially horizontal direction. The sample SP is placed on the placement surface 51*a* in an atmospheric open state, that is, in a state of not being accommodated in a vacuum chamber or the like.

The placement stage supporter 52 is a member that couples the base 41 and the placement stage main body 51, and is formed in a substantially columnar shape extending along the vertical direction. The placement stage supporter 52 can accommodate the placement stage drive 53.

The placement stage drive 53 includes a plurality of actuators (for example, stepping motors) (not illustrated) controlled by the controller main body 2 and a motion conversion mechanism that converts the rotation of an output shaft of each stepping motor into a linear motion, and moves the placement stage main body 51 based on a drive pulse input from the controller main body 2. As the placement stage main body 51 is moved by the placement stage drive 53, the placement stage main body 51, and eventually, the sample SP placed on the placement surface 51*a* can be moved along the horizontal direction and the vertical direction.

Similarly, the placement stage drive 53 can also rotate the placement stage main body 51 along the φ direction based on a drive pulse input from the controller main body 2. As the placement stage drive 53 rotates the placement stage main body 51, the sample SP placed on the placement surface 51*a* can be rotated in the φ direction.

Further, the placement stage main body 51 can be manually moved and rotated by operating a second operation dial 54 or the like illustrated in FIG. 2. Details of the second operation dial 54 are omitted.

Returning to the description of the base 41 and the stand 42, a first tilt sensor Sw3 is incorporated in the base 41. The first tilt sensor Sw3 can detect a tilt of the reference axis As perpendicular to the placement surface 51*a* with respect to the direction of gravity. On the other hand, a second tilt sensor Sw4 is attached to the stand 42. The second tilt sensor Sw4 can detect a tilt of the analysis optical system 7 with respect to the direction of gravity (more specifically, a tilt of the analysis optical axis Aa with respect to the direction of gravity). Detection signals of the first tilt sensor Sw3 and the second tilt sensor Sw4 are both input to the controller 21.

(Head 6)

The head 6 includes the analysis optical system 7 accommodated in the analysis housing 70, the observation optical system 9 accommodated in the observation housing 90, the head attachment member 61, a housing coupler 64, and a slide mechanism (horizontal drive mechanism) 65. The head attachment member 61 is a member configured to connect the analysis housing 70 to the stand 42. The housing coupler 64 is a member configured to connect the observation housing 90 to the analysis housing 70. The slide mechanism 65 is a mechanism configured to slide the analysis housing 70 with respect to the stand 42.

Specifically, the head attachment member 61 according to the present embodiment is arranged on the rear side of the head 6, and is configured as a plate-like member for mounting the head 6 to the stand 42. As described above, the head attachment member 61 is fixed to the mounting tool 43 of the stand 42.

The head attachment member 61 includes: a plate main body 61*a* extending substantially parallel to a rear surface of the head 6; and a cover member 61*b* protruding forward from a lower end of the plate main body 61*a*. The plate main body 61*a* is separated from the rear surface of the head 6 in the front-rear direction in a first mode (first state) to be described later in which the reflective object lens 74 faces the sample SP. The plate main body 61*a* is in close contact with or in proximity to the rear surface of the head 6 in a second mode (second state) to be described later in which the objective lens 92 faces the sample SP.

Further, a guide rail 65*a* forming the slide mechanism 65 is attached to a left end of the head attachment member 61 as illustrated in FIG. 15. The guide rail 65*a* couples the head attachment member 61 and other elements (specifically, the analysis optical system 7, the observation optical system 9, and the housing coupler 64) in the head 6 so as to be relatively displaceable in the horizontal direction.

Hereinafter, configurations of the analysis optical system 7 and the analysis housing 70, the observation optical system 9 and the observation housing 90, the housing coupler 64, and the slide mechanism 65 will be sequentially described.

—Analysis Optical System 7—

Figure 7:
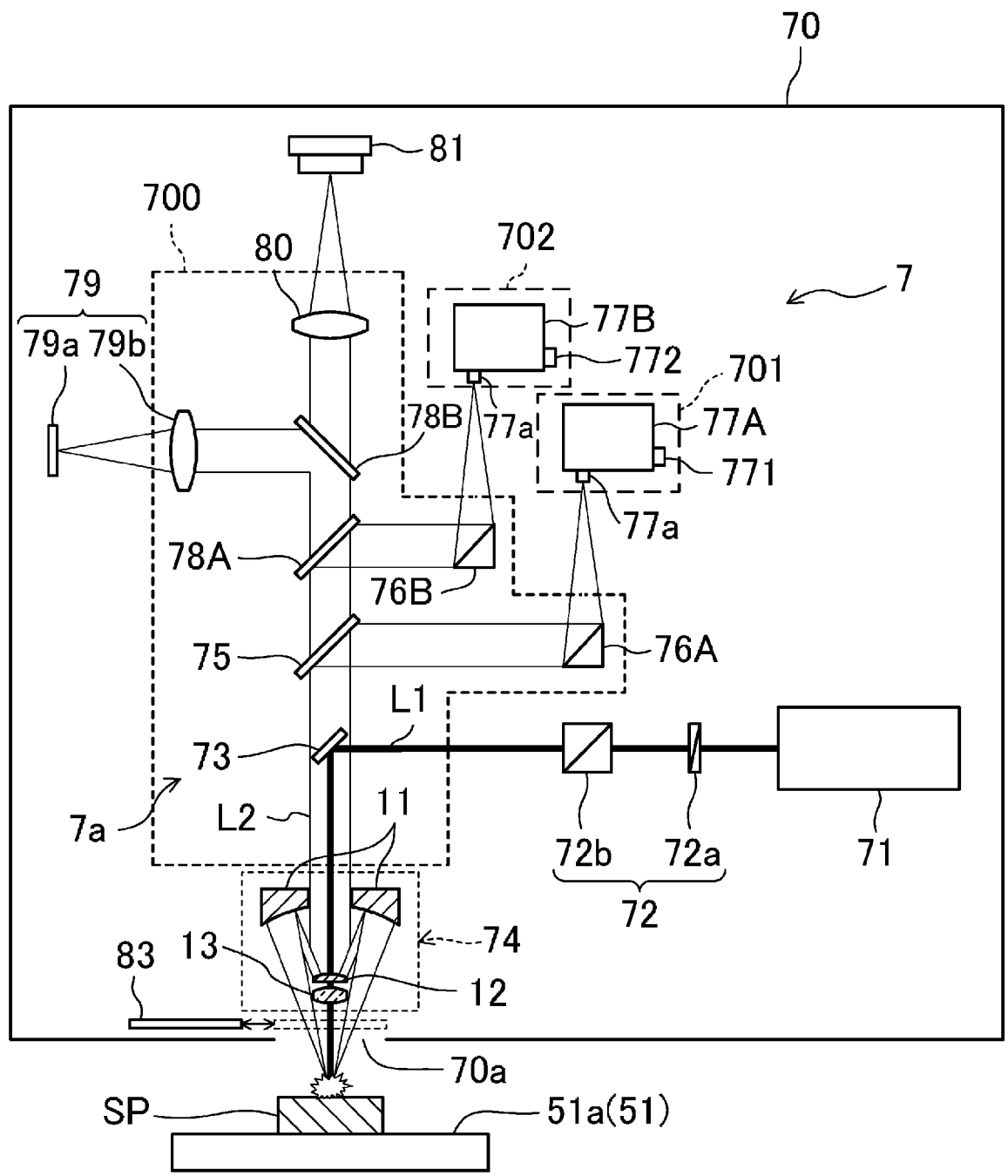
FIG. 7 is a schematic view illustrating a configuration of an analysis optical system.
Figure 8A:
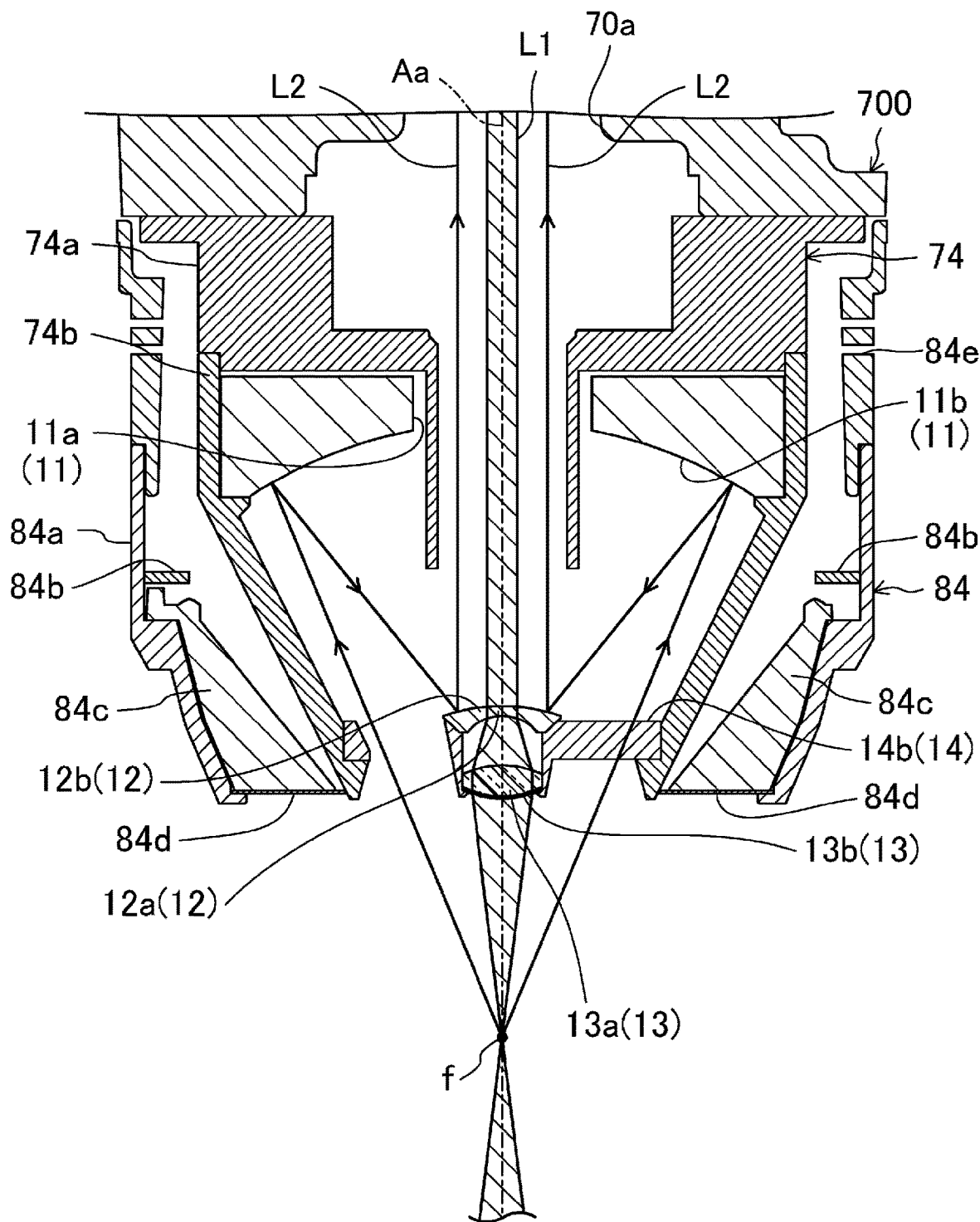
FIG. 8A is a longitudinal sectional view illustrating configurations of a reflective object lens and a side illuminator.
Figure 8B:
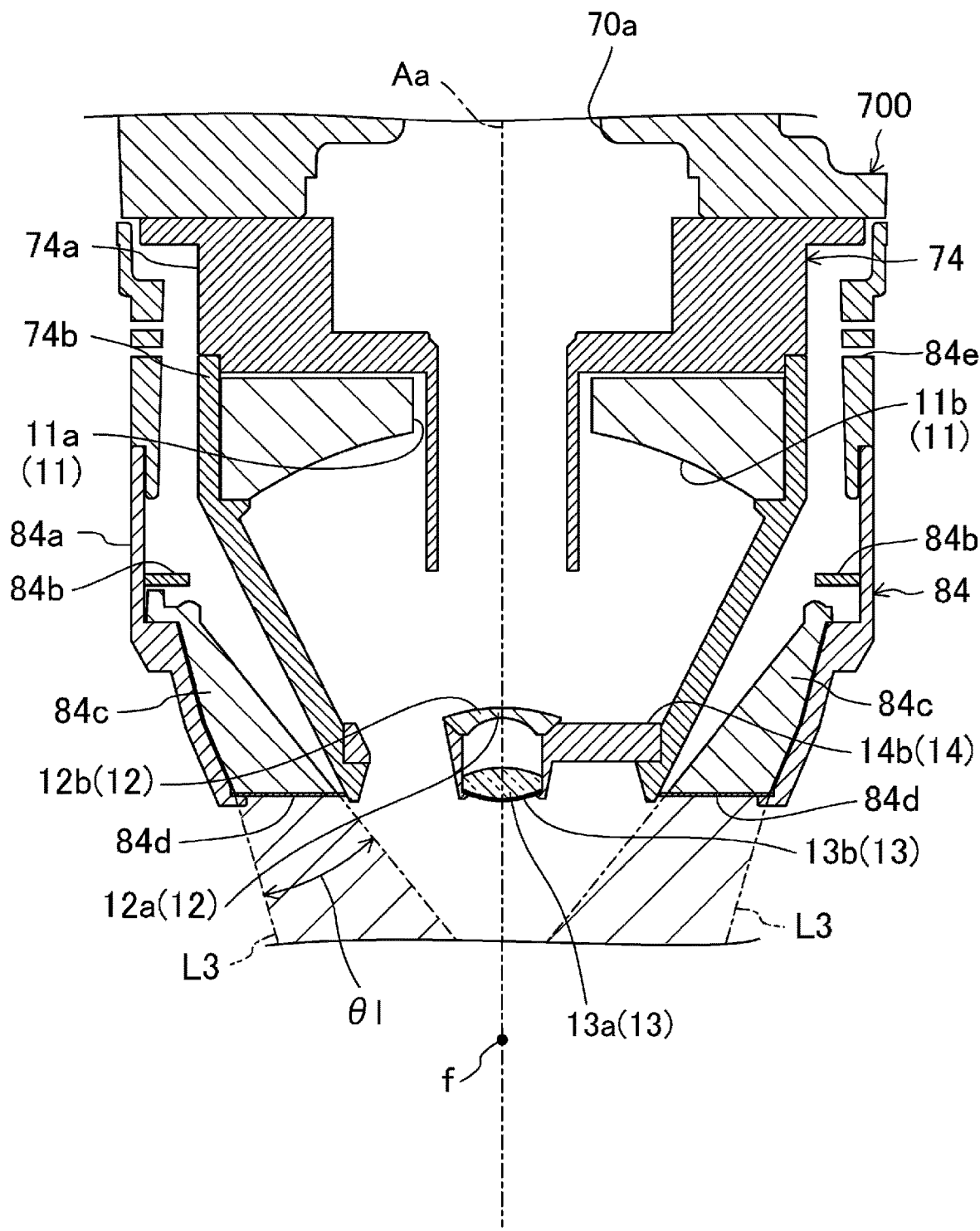
FIG. 8B is a longitudinal sectional view illustrating the configurations of the reflective object lens and the side illuminator.
Figure 10:
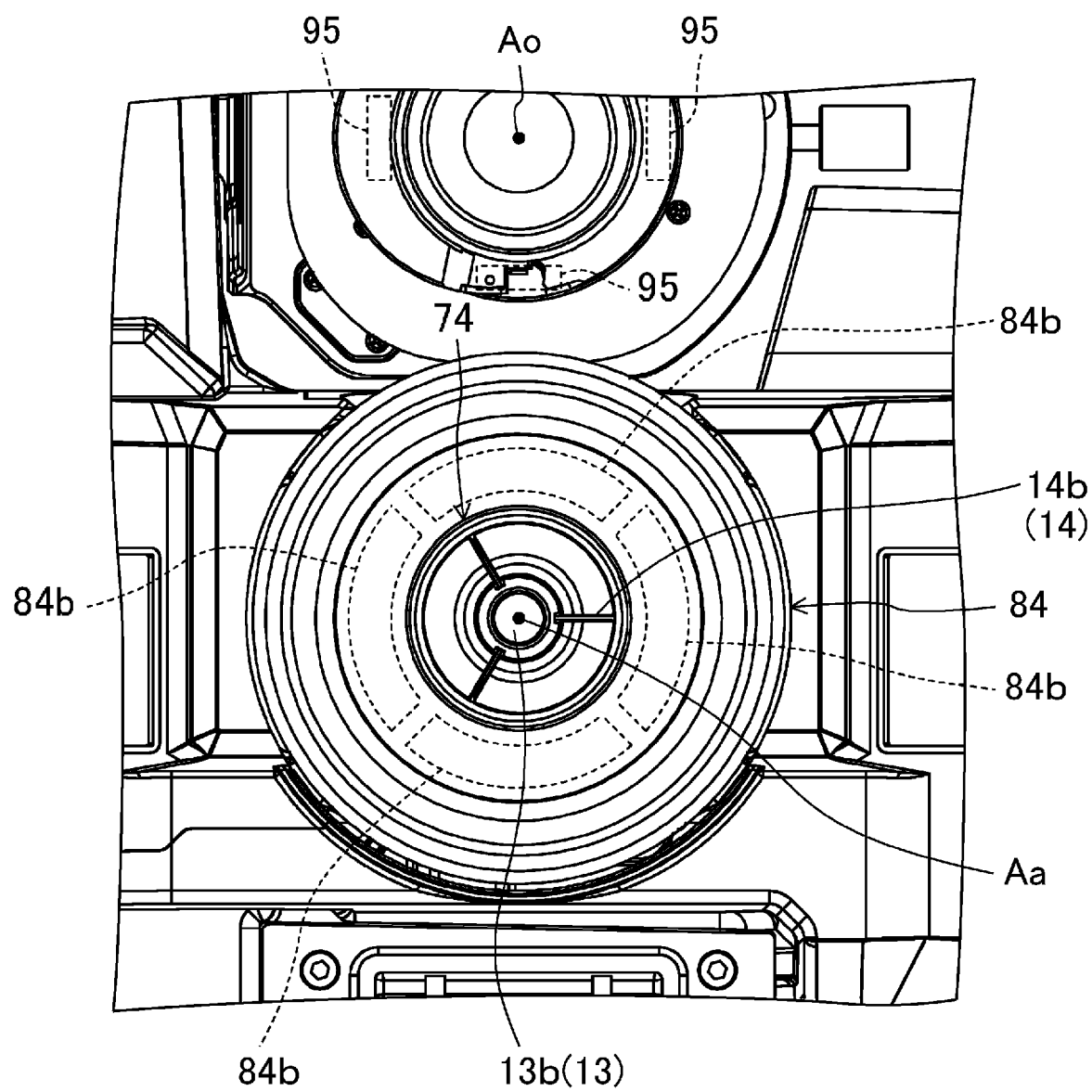
FIG. 10 is a bottom view illustrating the configurations of the reflective object lens and the side illuminator.

FIG. 7 is a schematic view illustrating the configuration of the analysis optical system 7. FIGS. 8A and 8B are longitudinal sectional views illustrating configurations of the reflective object lens 74 and a side illuminator 84. FIG. 10 is a bottom view illustrating the configurations of the reflective object lens 74 and the side illuminator 84.

Figure 11:
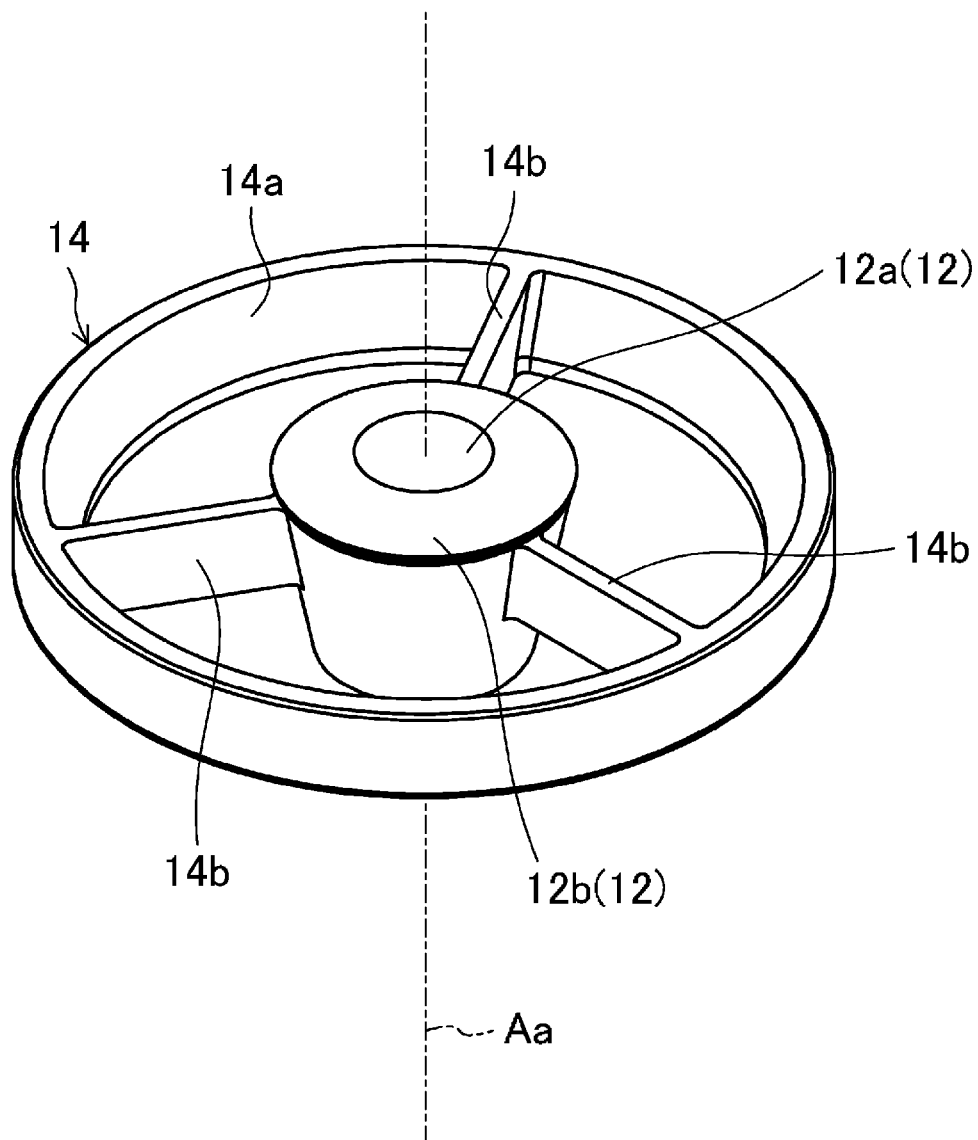
FIG. 11 is a perspective view illustrating a configuration of a secondary mirror.
Figure 12:
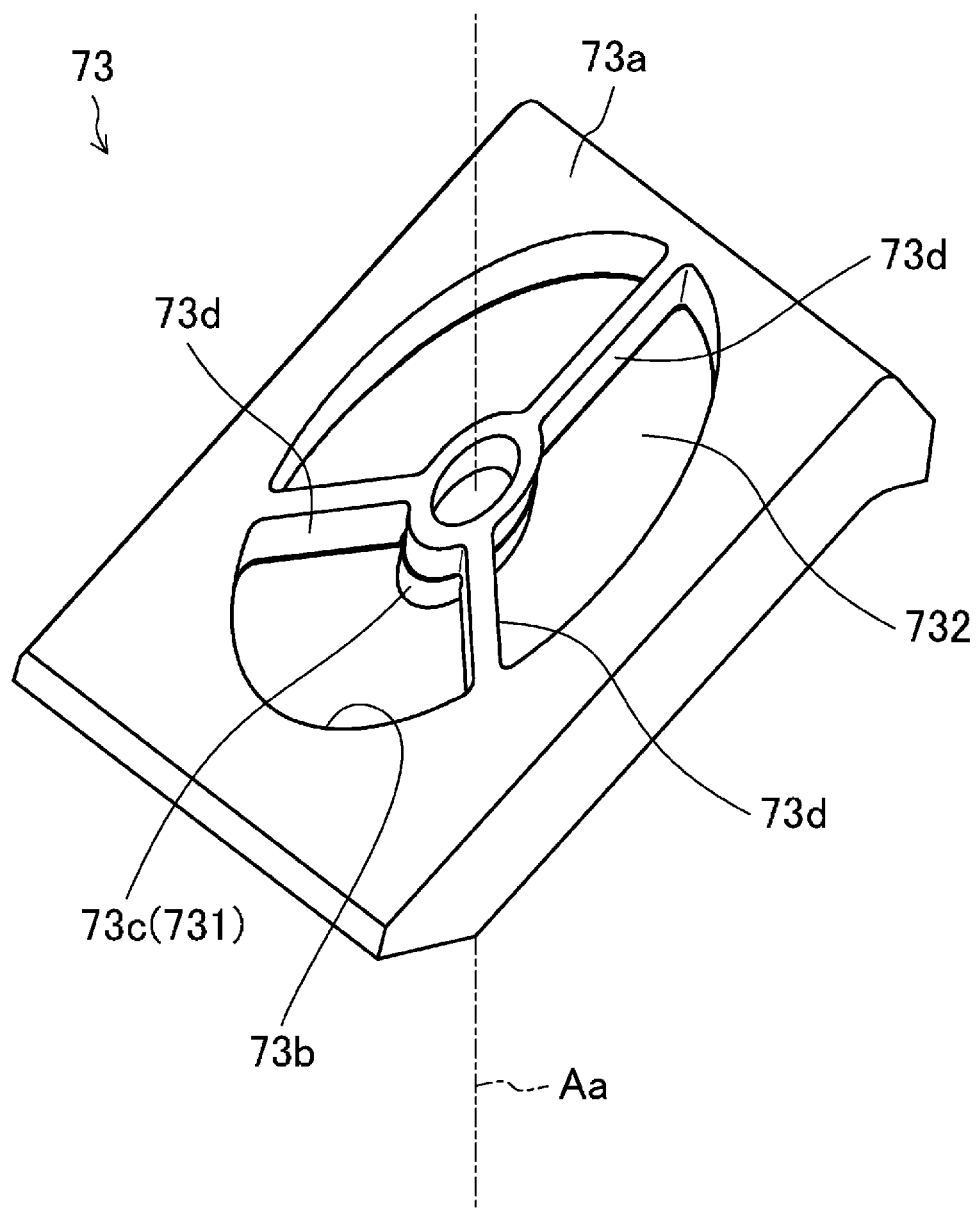
FIG. 12 is a perspective view illustrating a configuration of a deflection element.
Figure 13:
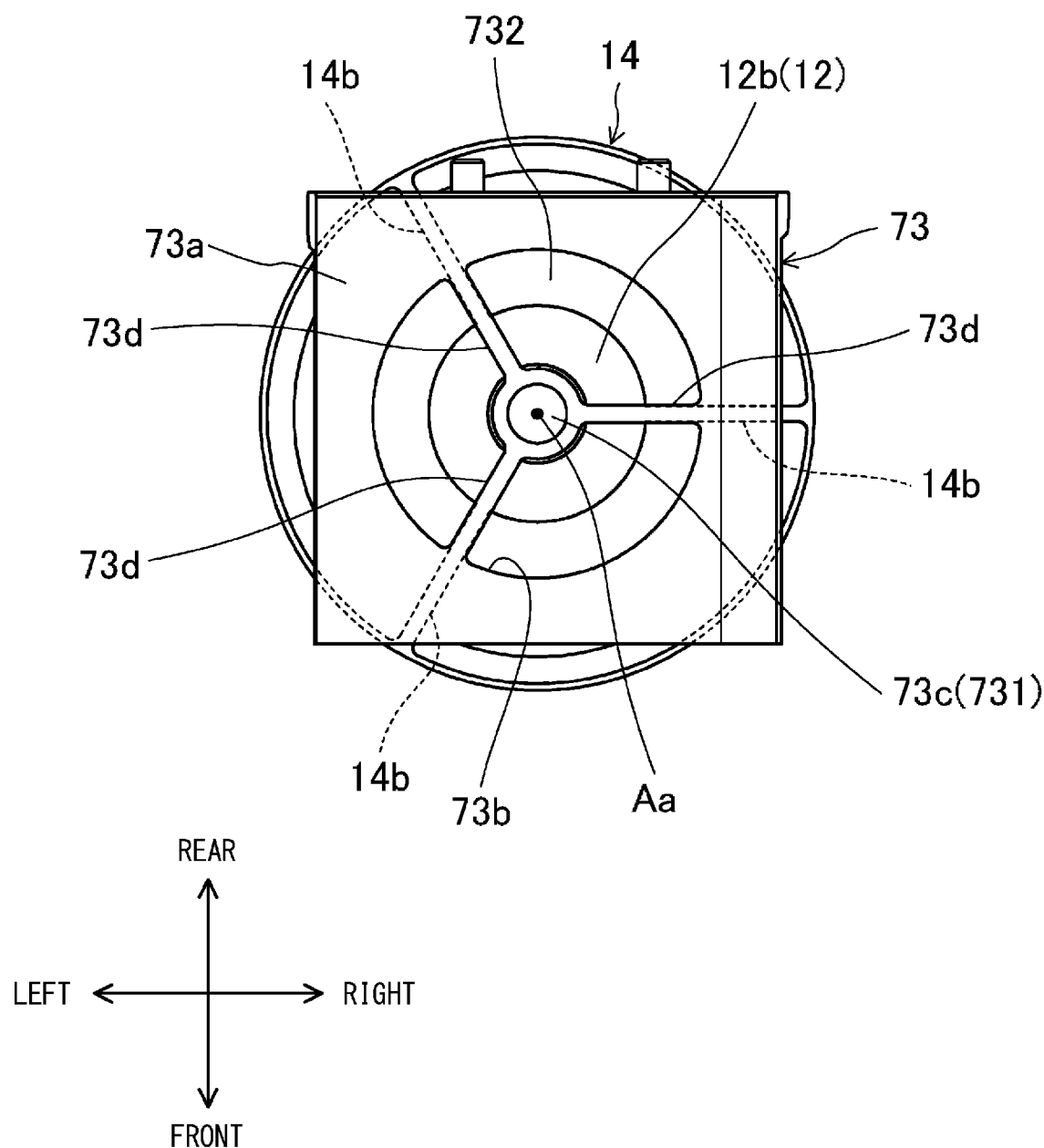
FIG. 13 is a plan view illustrating a positional relation between the secondary mirror and the deflection element.
Figure 14:
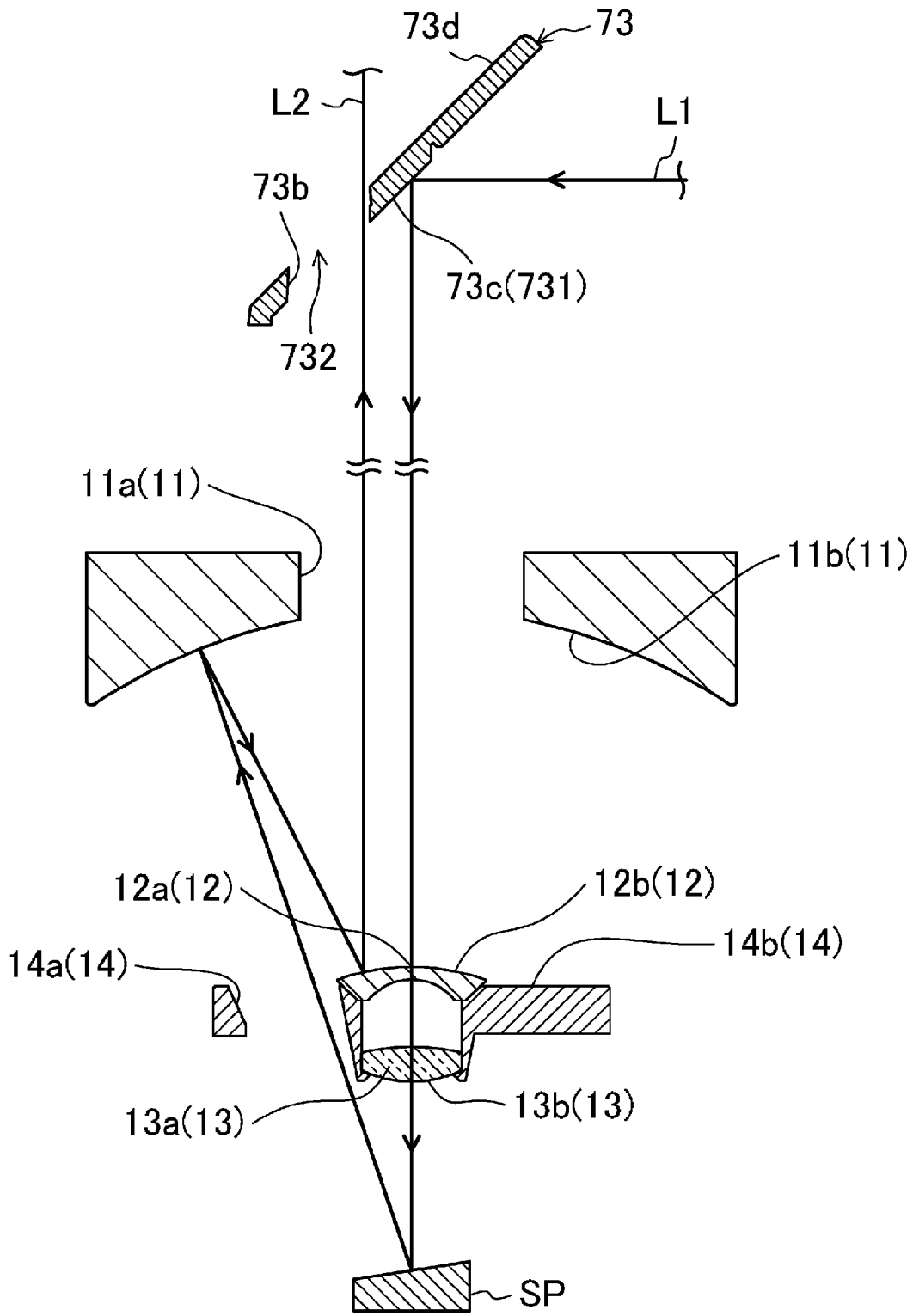
FIG. 14 is a longitudinal sectional view illustrating a positional relation among a primary mirror, the secondary mirror, and the deflection element.

Further, FIG. 11 is a perspective view illustrating a configuration of a secondary mirror 12, FIG. 12 is a perspective view illustrating a configuration of a deflection element 73, FIG. 13 is a plan view illustrating a positional relation between the secondary mirror 12 and the deflection element 73, and FIG. 14 is a longitudinal sectional view illustrating a positional relation among a primary mirror 11, the secondary mirror 12, and the deflection element 73.

The analysis optical system 7 is a set of components configured to analyze the sample SP as an analyte, and the respective components are accommodated in the analysis housing 70. Components constituting the analysis optical system 7 include an electromagnetic wave emitter 71, a collection head constituted by the reflective object lens 74, and a detector constituted by a first detector 77A and a second detector 77B. At least these components are accommodated in the analysis housing 70. Further, elements configured to analyze the sample SP also include the controller 21 as a processor.

The analysis optical system 7 can perform analysis using, for example, an LIBS method. A communication cable C1, configured to transmit and receive an electrical signal to and from the controller main body 2, is connected to the analysis optical system 7. The communication cable C1 is not essential, and the analysis optical system 7 and the controller main body 2 may be connected by wireless communication.

Note that the term "optical system" used herein is used in a broad sense. That is, the analysis optical system 7 is defined as a system including a light source, an image capturing element, and the like in addition to an optical element such as a lens. The same applies to the observation optical system 9.

As illustrated in FIG. 7, the analysis optical system 7 according to the present embodiment includes the electromagnetic wave emitter 71, an output adjuster 72, the deflection element 73, the reflective object lens 74 as the collection head, a spectroscopic element 75 as a wavelength selection element, a first parabolic mirror 76A, the first detector 77A, a first beam splitter 78A, a second parabolic mirror 76B, the second detector 77B, a second beam splitter 78B, a coaxial illuminator 79, an imaging lens 80, a first camera 81 as a camera, and the side illuminator 84. Some of the constituent elements of the analysis optical system 7 are also illustrated in FIG. 6. Further, the side illuminator 84 is illustrated only in FIGS. 8A, 8B, and 10 (not illustrated in FIG. 7).

The electromagnetic wave emitter 71 emits a primary electromagnetic wave for analysis of the sample SP. In particular, the electromagnetic wave emitter 71 according to the present embodiment includes a laser light source that emits laser light as the primary electromagnetic wave.

Although not illustrated in detail, the electromagnetic wave emitter 71 according to the present embodiment includes: an excitation light source configured using a laser diode (LD) or the like; a focusing lens that collects laser output from the excitation light source and emits the laser as laser excitation light; a laser medium that generates a fundamental wave based on the laser excitation light; a Q switch configured to pulse-oscillate the fundamental wave; a rear mirror and an output mirror configured for resonation of the fundamental wave; and a wavelength conversion element that converts a wavelength of laser light output from the output mirror.

Here, as the laser medium, for example, rod-shaped Nd:YAG is preferably used in order to obtain high energy per pulse. Note that, in the present embodiment, a wavelength (so-called fundamental wavelength) of photons emitted from the laser medium by stimulated emission is set to 1064 nm in the infrared range.

Further, as the Q switch, a passive Q switch in which a transmittance increases when an intensity of the fundamental wave exceeds a predetermined threshold can be used. The passive Q switch is configured using, for example, a supersaturated absorber such as Cr:YAG. Since the passive Q switch is used, it is possible to automatically perform pulse oscillation at a timing when a predetermined amount of energy or more is accumulated in the laser medium. Further, a so-called active Q switch capable of externally controlling an attenuation rate can also be used.

Further, two nonlinear optical crystals, such as LBO ($LiB_3O_3$), are used as the wavelength conversion element. Since two crystals are used, a third harmonic wave can be generated from the fundamental wave. A wavelength of the third harmonic wave is set to 355 nm in the ultraviolet region in the present embodiment.

That is, the electromagnetic wave emitter 71 according to the present embodiment can output the laser light formed of ultraviolet rays as the primary electromagnetic wave. As a result, it is possible to optically analyze the transparent sample SP like glass by the LIBS method. Further, the proportion of laser light in the ultraviolet range reaching a human retina is extremely small. The safety of the device can be enhanced by adopting the configuration in which the laser light does not form an image on the retina.

The output adjuster 72 is arranged on an optical path connecting the electromagnetic wave emitter 71 and the deflection element 73, and can adjust an output of the laser light (primary electromagnetic wave). Specifically, the output adjuster 72 according to the present embodiment includes a half-wave plate 72*a* and a polarization beam splitter 72*b*. The half-wave plate 72*a* is configured to rotate relative to the polarization beam splitter 72*b*, and the amount of light passing through the polarization beam splitter 72*b* can be adjusted by controlling a rotation angle thereof.

The laser light (primary electromagnetic wave) whose output has been adjusted by the output adjuster 72 is reflected by a mirror (not illustrated) and enters an optical base 700.

As illustrated in FIG. 7, the optical base 700 is arranged inside the analysis housing 70, and defines an accommodation space for optical elements constituting the analysis optical system 7. Specifically, the optical base 700 according to the present embodiment accommodates the deflection element 73, the spectroscopic element 75, the first parabolic mirror 76A, the first beam splitter 78A, the second parabolic mirror 76B, the second beam splitter 78B, an optical element 79b constituting the coaxial illuminator 79, and the imaging lens 80. Further, the optical base 700 is arranged adjacent to the electromagnetic wave emitter 71 in an internal space of the analysis housing 70. The optical base 700 corresponds to a "second housing" provided inside the analysis housing 70.

The deflection element 73 on which the laser light (primary electromagnetic wave) emitted from the electromagnetic wave emitter 71 is incident deflects the laser light (primary electromagnetic wave) in an optical axis direction (direction along the analysis optical axis Aa) of the reflective object lens 74.

Specifically, the deflection element 73 is laid out so as to reflect the primary electromagnetic wave, which has been output from the electromagnetic wave emitter 71 and passed through the output adjuster 72, to be guided to the sample SP via the reflective object lens 74, and allow passage of a secondary electromagnetic wave (which is light emitted due to plasma occurring on the surface of the sample SP, and is hereinafter also referred to as "plasma light") generated in the sample SP in response to the primary electromagnetic wave and guide the secondary electromagnetic wave to the first detector 77A and the second detector 77B. The deflection element 73 is also laid out to allow passage of visible light collected for capturing and guide most of the visible light to the first camera 81.

The reflective object lens 74 functions as the collection head that collects the secondary electromagnetic wave generated in the sample SP in response to the emission of the primary electromagnetic wave from the electromagnetic wave emitter 71. In particular, the reflective object lens 74 according to the present embodiment is configured to collect the laser light as the primary electromagnetic wave and irradiate the sample SP with the laser light, and collect the plasma light (secondary electromagnetic wave) generated in the sample SP in response to the laser light (primary electromagnetic wave) applied to the sample SP. In this case, the secondary electromagnetic wave corresponds to an electromagnetic wave emitted due to the plasma occurring on the surface of the sample SP.

The reflective object lens 74 is configured to make an optical system related to the emission of the primary electromagnetic wave from the electromagnetic wave emitter 71 coaxial with an optical system related to reception of the reflection light in the first camera 81 and reception of the secondary electromagnetic wave in the first and second detectors 77A and 77B. In other words, the reflective object lens 74 is shared by the two types of optical systems.

In the present embodiment, three functions including irradiation of the sample SP with the primary electromagnetic wave, collection of the secondary electromagnetic wave from the sample SP, and capturing of the sample SP by the first camera 81 can be implemented by the single reflective object lens 74 without inhibiting each other.

Further, a focal depth in which the primary electromagnetic wave emitted from the analysis optical system 7 is focused is deeper than a focal depth in which the first camera 81 is focused in the present embodiment. With this configuration, even if the sample SP is irradiated with the primary electromagnetic wave from an observation state where the sample SP is observed using the first camera 81 of the analysis optical system 7, it is unnecessary to re-adjust a focal point of the primary electromagnetic wave. As a result, the focal point of the primary electromagnetic wave emitted from the analysis optical system 7 can be automatically adjusted to a position observed by the first camera 81.

Furthermore, the focal depth in which the primary electromagnetic wave is focused may be deeper than a focal depth in which the secondary electromagnetic wave guided to the detector 77A or 77B is focused. That is, a configuration may be adopted in which the depth becomes shallower than the focal depth of the primary electromagnetic wave by increasing a numerical aperture of a condensing optical system of the reflective object lens 74 in order to increase the condensing efficiency of the secondary electromagnetic wave.

The reflective object lens 74 has the analysis optical axis Aa extending along the substantially vertical direction. The analysis optical axis Aa is provided to be parallel to the observation optical axis Ao of an objective lens 92 of the observation optical system 9. A "radial direction" in the following description refers to a direction that is orthogonal to a unit vector extending along the analysis optical axis Aa and extends radially from the analysis optical axis Aa. Similarly, a "circumferential direction" refers to a direction that is orthogonal to the unit vector extending along the analysis optical axis Aa and the radial direction and circles around the analysis optical axis Aa. Further, the "optical axis direction" of the analysis optical system 7 refers to a direction extending along the analysis optical axis Aa.

Specifically, the reflective object lens 74 according to the present embodiment is a Schwarzschild objective lens including two mirrors. As illustrated in FIGS. 7, 8A, and 8B, the reflective object lens 74 includes a connection member 74a mounted to the analysis housing 70, a mirror housing 74b connected to the analysis housing 70 via the connection member 74a, the primary mirror 11 having an annular shape and a relatively large diameter, the secondary mirror 12 having a disk shape and a relatively small diameter, and a support member 14 configured to connect the secondary mirror 12 to the mirror housing 74b.

The connection member 74a is formed in a pedestal shape provided with a through-hole coaxial with the analysis optical axis Aa. The connection member 74a is fastened to a lower end of the optical base 700 in a state of being fixed in the circumferential direction (non-rotatable state). This fastening fixes an angular position of the reflective object lens 74. Further, the connection member 74a is arranged such that the through-hole of the connection member 74a and a through-hole provided at the lower end of the optical base 700 communicate with each other.

The mirror housing 74b is formed in a cylindrical shape whose diameter is reduced in a tapered shape toward the lower side. The mirror housing 74b is fixed to a lower surface of the connection member 74a in a state of being fixed in the circumferential direction. An inner peripheral surface of the mirror housing 74b supports the primary mirror 11 and the secondary mirror 12.

Both the primary mirror 11 and the secondary mirror 12 are formed so as to be rotationally symmetric about the analysis optical axis Aa. The reflective object lens 74 is configured to collect the secondary electromagnetic wave by the primary mirror 11 and the secondary mirror 12, and guide the collected secondary electromagnetic wave to an opening 11a of the primary mirror 11.

The primary mirror 11 is configured using a cylindrical member having a central axis coaxial with the analysis optical axis Aa and provided with a through-hole at a center in the radial direction. As illustrated in FIGS. 8A and 8B, the through-hole of the primary mirror 11 forms the opening 11a configured to allow passage of the primary electromagnetic wave and the secondary electromagnetic wave. A lower end surface of the primary mirror 11 is mirror-finished to form a primary reflection surface 11b. The primary mirror 11 formed in a cylindrical shape is supported by the mirror housing 74b.

Specifically, the primary mirror 11 is provided with the opening 11a at the center in the radial direction, and is provided with the primary reflection surface 11b that reflects the secondary electromagnetic wave generated in the sample SP in response to the emission of the primary electromagnetic wave. The primary reflection surface 11b is provided around the opening 11a.

The secondary mirror 12 includes a lens having an optical axis coaxial with the analysis optical axis Aa. As illustrated in FIGS. 8A, 8B, and 11, the lens forming the secondary mirror 12 is provided with a secondary reflection surface 12b, obtained by performing mirror finishing on an upper end surface thereof, and a transmissive region 12a configured to transmit the primary electromagnetic wave without being subjected to mirror finishing. Further, the support member 14 supporting the lens in the secondary mirror 12 defines a hollow space for allowing passage of the secondary electromagnetic wave. The secondary mirror 12 is supported by the mirror housing 74b via the support member 14. The secondary mirror 12 is connected to the analysis housing 70 via the support member 14, the mirror housing 74b, the connection member 74a, and the optical base 700.

Specifically, the secondary reflection surface 12b is provided at an outer edge of the secondary mirror 12, and receives and further reflects the secondary electromagnetic wave reflected by the primary reflection surface 11b of the primary mirror 11. The secondary reflection surface 12b is formed in a substantially donut shape. The transmissive region 12a is provided at a center of the secondary mirror 12 and is arranged so as to transmit the primary electromagnetic wave. The transmissive region 12a is formed in a substantially disk shape.

As illustrated in FIGS. 8A and 8B, a concave meniscus lens having a convex surface facing upward and a concave surface facing downward can be used as the lens forming the secondary mirror 12. The secondary reflection surface 12b is provided on a peripheral edge of the lens, and is formed in an annular shape with a mirror surface facing substantially upward.

The transmissive region 12a is provided at a radial center of the lens (for example, concave meniscus lens). The primary electromagnetic wave transmitted through the transmissive region 12a propagates while expanding a beam diameter.

As illustrated in FIG. 11, the support member 14 includes an annular mirror supporter 14a and a second supporting leg 14b connected to the mirror supporter 14a. The support member 14 supports the secondary mirror 12 including the transmissive region 12a and the secondary reflection surface 12b provided in the periphery thereof, and can connect the secondary mirror 12 to an inner wall of the mirror housing 74b.

The mirror supporter 14a is arranged around the secondary reflection surface 12b and is formed in an annular shape coaxial with the analysis optical axis Aa. The mirror supporter 14a is attached to the inner peripheral surface of the mirror housing 74b in the non-rotatable state. The mirror supporter 14a is attached to the analysis housing 70 via the mirror housing 74b and the connection member 74a. The space through which the secondary electromagnetic wave passes is defined by an inner peripheral surface of the mirror supporter 14a and an outer peripheral surface of a cylindrical body that accommodates the concave meniscus lens and a tertiary lens 13 to be described later.

The second supporting leg 14b extends radially from the outer edge of the secondary reflection surface 12b and is connected to the inner peripheral surface of the mirror housing 74b. Specifically, the second supporting leg 14b is configured to extend radially from the cylindrical body. Three second supporting legs 14b according to the present embodiment are provided at approximately every 120° in the circumferential direction.

Further, the tertiary lens 13 is arranged between the transmissive region 12a and the placement surface 51a in the substantially vertical direction. The tertiary lens 13 transmits the primary electromagnetic wave having passed through the transmissive region 12a and collects the primary electromagnetic wave.

The tertiary lens 13 includes a lens main body 13a and an optical thin film 13b. The tertiary lens 13 is arranged coaxially with the primary mirror 11 and the secondary mirror 12.

The lens main body 13a may be configured using a biconvex lens whose diameter is smaller than an outer diameter of the entire concave meniscus lens forming the secondary mirror 12 and is larger than an outer diameter of the single transmissive region 12a in the concave meniscus lens. The primary electromagnetic wave transmitted through the lens main body 13a propagates while being collected in the radial direction.

A focal position of an optical system constituted by the transmissive region 12a and the lens main body 13a coincides with a focal position of an optical system constituted by the primary mirror 11 and the secondary mirror 12 (see the black spot fin FIGS. 8A and 8B).

The optical thin film 13b is provided on a lower surface of the lens main body 13a, and is interposed between the transmissive region 12a and the placement surface 51a. The optical thin film 13b blocks reflection light such as visible light reflected by the sample SP. As a result, the first camera 81 as the camera receives the reflection light reflected by the primary reflection surface 11b and the secondary reflection surface 12b. Note that the optical thin film 13b may be provided on a concave surface located on the opposite side of the transmissive region 12a in the concave meniscus lens forming the secondary mirror 12. It is sufficient to arrange the optical thin film 13b between the transmissive region 12a and the placement surface 51a in the optical axis direction. Note that, instead of providing the optical thin film 13b on the tertiary lens 13 or in addition to the optical thin film 13b, visible light may be shielded by the deflection element 73, or a light shielding member that shields visible light may be provided in an optical path connecting the deflection element 73 and the tertiary lens 13.

In the reflective object lens 74 configured as described above, the primary mirror 11 allows the primary electromagnetic wave to pass through the opening 11a. The primary electromagnetic wave having passed through the opening 11a is sequentially transmitted through the transmissive region 12a of the secondary mirror 12 and the lens main body 13a of the tertiary lens 13, and is emitted to the sample SP (see an optical path L1 in FIGS. 8A and 14).

At this time, the secondary mirror 12 enlarges a beam diameter of laser light (primary electromagnetic wave) transmitted through the transmissive region 12a, and the tertiary lens 13 collects the laser light enlarged in diameter by the transmissive region 12a at a predetermined focal position f. The laser light collected by the tertiary lens 13 converges at a working distance corresponding to the focal position f. The laser light diffuses in a conical shape as the distance becomes equal to or more than the predetermined working distance. If the reflective object lens 74 is not fastened to the optical base 700, the laser light propagates as parallel light indicated by the optical path L1 in FIG. 14 without converging.

Note that the tertiary lens 13 is not essential. The secondary mirror 12 may be configured by a convex lens, instead of providing the tertiary lens 13.

When the sample SP is irradiated with laser light (primary electromagnetic wave), plasma light (secondary electromagnetic wave) in response to the primary electromagnetic wave is generated and returns toward the reflective object lens 74. The plasma light collected by the reflective object lens 74 is guided to the primary mirror 11.

The primary reflection surface 11b of the primary mirror 11 reflects the secondary electromagnetic wave returning from the sample SP. The secondary electromagnetic wave reflected by the primary reflection surface 11b is guided to the secondary reflection surface 12b of the secondary mirror 12.

The secondary mirror 12 receives the secondary electromagnetic wave, reflected by the primary reflection surface 11b, by the secondary reflection surface 12b, and emits the secondary electromagnetic wave substantially upward. The secondary electromagnetic wave reflected by the secondary reflection surface 12b propagates along a cylindrical (hollow cylindrical) optical path. At that time, the optical path formed by the secondary electromagnetic wave is configured to surround an optical path of the primary electromagnetic wave propagating in a columnar shape as illustrated in FIG. 8A. In other words, the primary electromagnetic wave propagates through a hollow portion of a cylinder in the optical path of the secondary electromagnetic wave so as to be coaxial with the secondary electromagnetic wave.

Then, the secondary electromagnetic wave propagating along the cylindrical optical path is emitted from the opening 11a of the primary mirror 11 in a state of being coaxial with the primary electromagnetic wave. The secondary electromagnetic wave emitted from the opening 11a is guided to the deflection element 73 as illustrated in FIG. 14 (see an optical path L2 in FIGS. 8A and 14).

Both the primary electromagnetic wave input to the reflective object lens 74 and the secondary electromagnetic wave output from the reflective object lens 74 are optically connected to other elements via the deflection element 73. The deflection element 73 has a configuration suitable for the reflective object lens 74.

Specifically, the deflection element 73 according to the present embodiment includes a partial mirror having a reflective region 731 and a hollow region 732. Among them, the reflective region 731 is arranged to oppose the transmissive region 12a so as to reflect the primary electromagnetic wave along the optical axis direction of the reflective object lens 74. The hollow region 732 allows passage of the secondary electromagnetic wave collected by the reflective object lens 74.

Specifically, the deflection element 73 includes: a plate-shaped element supporter 73a provided with the through-hole 73b; a mirror member 73c that is arranged at a center of the through-hole 73b and forms the reflective region 731; and a first supporting leg 73d that extends radially from an outer side surface of the mirror member 73c and is connected to an inner side surface of the through-hole 73b. The through-hole 73b penetrates the element supporter 73a in the optical axis direction.

Among them, the element supporter 73a is formed in a rectangular thin plate shape, and is arranged between the spectroscopic element 75 and the opening 11a of the reflective object lens 74 in the optical axis direction. The element supporter 73a is attached to the analysis housing 70 in a posture in which a thickness direction thereof is tilted with respect to the optical axis direction.

As illustrated in FIG. 14, the through-hole 73b is formed to penetrate the element supporter 73a along the optical axis direction of the reflective object lens 74. That is, the through-hole 73b extends in a direction tilted with respect to the thickness direction of the element supporter 73a.

As illustrated in FIG. 13, the through-hole 73b is formed to have a circular cross section having a constant inner diameter when viewed along the optical axis direction of the reflective object lens 74. In this case, a central axis of the through-hole 73b coincides with the optical axis of the reflective object lens 74, that is, the analysis optical axis Aa. That is, the through-hole 73b is formed to be viewed as an oval shape when viewed along the thickness direction of the element supporter 73a, and has a substantially perfect circular projection surface when projected on a plane perpendicular to the analysis optical axis Aa.

The mirror member 73c is configured using an optical mirror arranged in a posture in which a mirror surface thereof faces obliquely downward. The mirror surface of the mirror member 73c forms the reflective region 731. The reflective region 731 is aligned with the transmissive region 12a in the optical axis direction, and can reflect the primary electromagnetic wave to be guided to the transmissive region 12a.

As illustrated in FIG. 13, the mirror member 73c is formed into a circular shape having a constant inner diameter when viewed along the optical axis direction of the reflective object lens 74. In this case, a central axis of the mirror member 73c coincides with the central axis of the through-hole 73b and the analysis optical axis Aa. That is, the mirror member 73c is formed in an oval shape when viewed along a direction perpendicular to the mirror surface, and has a substantially perfect circular projection surface when projected on a plane perpendicular to the analysis optical axis Aa.

The hollow region 732 is defined by the inner side surface of the through-hole 73b and the outer side surface of the mirror member 73c. The hollow region 732 is arranged radially outside the reflective region 731 and allows passage of the secondary electromagnetic wave.

Here, an outer diameter of the mirror member 73c is formed to be smaller than an inner diameter of the secondary reflection surface 12b when the secondary mirror 12, the support member 14, and the deflection element 73 are viewed in a plan view along the analysis optical axis Aa as illustrated in FIG. 13. Therefore, the secondary electromagnetic wave reflected by the secondary reflection surface 12b and propagated in the columnar shape passes through the hollow region 732 without being blocked by the reflective region 731 as illustrated in the optical path L2 of FIG. 14.

The first supporting leg 73d extends radially from the outer side surface of the mirror member 73c, and is connected to the inner side surface of the through-hole 73b. Specifically, three first supporting legs 73d are provided at approximately every 120° in the circumferential direction.

As illustrated in FIG. 13, the first and second supporting legs 73d and 14b are arranged so as to overlap each other when viewed along the optical axis direction. Here, a thickness of the first supporting leg 73d in the circumferential direction substantially coincides with a thickness of the second supporting leg 14b in the circumferential direction. The secondary electromagnetic wave output so as to pass between the second supporting legs 14b can pass through the hollow region 732 without being blocked by the first supporting leg 73d.

The secondary electromagnetic wave that has passed through the hollow region 732 without being blocked by the reflective region 731 and the first supporting leg 73d reaches the spectroscopic element 75. The spectroscopic element 75 is arranged between the deflection element 73 and the first beam splitter 78A in the optical axis direction of the reflective object lens 74, and guides a part of the secondary electromagnetic wave generated in the sample SP to the first detector 77A and the other part to the second detector 77B or the like. Most of the latter plasma light is guided to the second detector 77B, but the rest reaches the first camera 81.

Specifically, the secondary electromagnetic wave returned from the sample SP includes various wavelength components in addition to a wavelength corresponding to the laser light as the primary electromagnetic wave. Therefore, the spectroscopic element 75 according to the present embodiment reflects an electromagnetic wave in a short wavelength band out of the secondary electromagnetic wave returning from the sample SP, and guides the electromagnetic wave to the first detector 77A. The spectroscopic element 75 also transmits electromagnetic waves in other bands and guides the electromagnetic waves to the second detector 77B.

More specifically, the spectroscopic element 75 is made of a material having a higher transmittance of a second wavelength region on the infrared side belonging to a wavelength region equal to or more than a predetermined wavelength than that of a first wavelength region on the ultraviolet side belonging to a wavelength region less than the predetermined wavelength. Such materials include a glass material, a synthetic resin, and the like.

For example, when the glass material is used, glass itself has a low reflectance of an electromagnetic wave. Thus, it is possible to adopt a configuration in which an optical thin film that reflects an electromagnetic wave belonging to the first wavelength region is deposited on a glass surface to reflect an electromagnetic wave belonging to the wavelength region on the ultraviolet side and guide the electromagnetic wave to the first detector 77A.

Then, the spectroscopic element 75 according to the present embodiment receives the secondary electromagnetic wave collected by the reflective object lens 74. The spectroscopic element 75 is a so-called dichroic mirror, and reflects a secondary electromagnetic wave corresponding to the first wavelength region on the ultraviolet side and transmits a secondary electromagnetic wave corresponding to the second wavelength region on the infrared side among the incident secondary electromagnetic waves. As described above, the material as the main component of the spectroscopic element 75 has a relatively low transmittance of the first wavelength region and a relatively high transmittance of the second wavelength region. Therefore, the spectroscopic element 75 can minimize a loss of the entire secondary electromagnetic wave caused by absorption into the material, such as glass, as compared with a case where the first wavelength region on the ultraviolet side is transmitted.

The first parabolic mirror 76A is a so-called parabolic mirror, and is arranged between the spectroscopic element 75 and the first detector 77A. The first parabolic mirror 76A collects the secondary electromagnetic wave reflected by the spectroscopic element 75, and causes the collected secondary electromagnetic wave to be incident on the first detector 77A.

Specifically, the first parabolic mirror 76A reflects the secondary electromagnetic wave on the ultraviolet side which includes a visible light band and is reflected by the spectroscopic element 75 after being collected by the reflective object lens 74 and passing through the deflection element 73. The first parabolic mirror 76A is configured to condense the secondary electromagnetic wave reflected by the first parabolic mirror 76A on the first detector 77A.

Here, the first detector 77A generates an intensity distribution spectrum which is an intensity distribution for each wavelength of the plasma light (secondary electromagnetic wave) generated in the sample SP. In particular, the first detector 77A is configured such that the secondary electromagnetic wave on the ultraviolet side reflected by the spectroscopic element 75 is incident thereto, and has an entrance slit 77a configured to receive the secondary electromagnetic wave.

Note that a focal position of the first parabolic mirror 76A may be arranged so as to coincide with the entrance slit 77a, or may be arranged so as to be inconsistent with the entrance slit 77a. The latter arrangement corresponds to a layout shifted from just focus. This layout is advantageous in a case where energy of returning light of laser is strong and the entrance slit 77a can be damaged.

Figure 9:
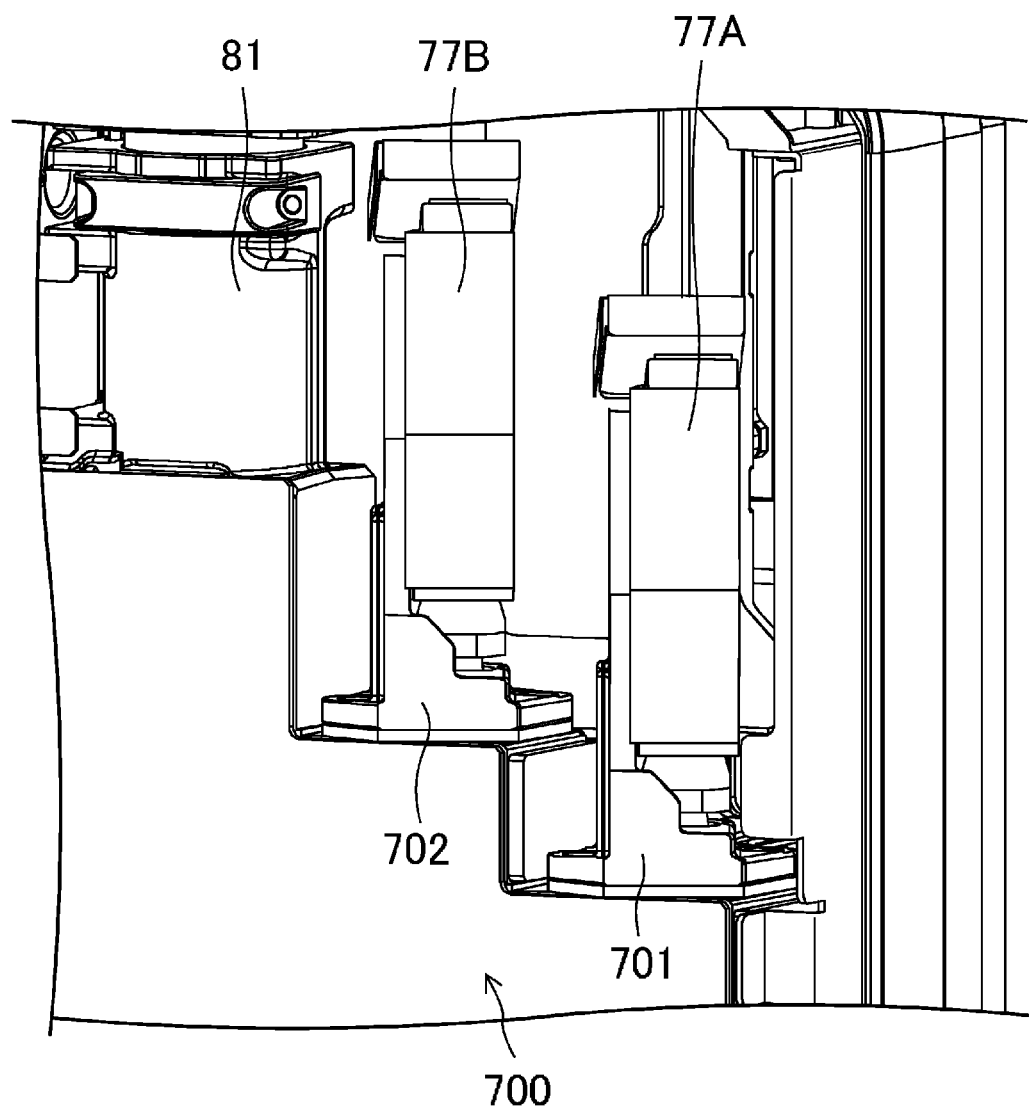
FIG. 9 is a view for describing an attachment structure of first and second detectors.

Further, the first detector 77A is supported by the first plate 701 illustrated in FIGS. 7 and 9. The first plate 701 is connected to an upper surface of the optical base 700. The first detector 77A is connected to the optical base 700 via the first plate 701. With this connection, positioning of the entrance slit 77a with respect to a light guide optical system 7a, such as the first parabolic mirror 76A, can be stabilized.

Further, a first adjustment mechanism 771 that adjusts a relative position of the first detector 77A with respect to the first plate 701 is provided in the vicinity of the first detector 77A (illustrated in only FIG. 7). Since the first adjustment mechanism 771 is used, a relative position of the entrance slit 77a with respect to the light guide optical system 7a can be adjusted.

Note that the configuration in which the first plate 701 is connected to the optical base 700 is not essential. For example, the first plate 701 may be connected to an inner wall of the analysis housing 70. In such a configuration, the first adjustment mechanism 771 adjusts a relative position of the first detector 77A with respect to the analysis housing 70.

The first detector 77A receives the secondary electromagnetic wave generated in the sample SP and collected by the reflective object lens 74, and generates the intensity distribution spectrum which is the intensity distribution for each wavelength of the secondary electromagnetic wave. The first detector 77A is configured to receive the secondary electromagnetic wave dispersed on the upstream side of the second detector 77B in the optical path of the secondary electromagnetic wave starting from the reflective object lens 74. The first wavelength region on the ultraviolet side out of the plasma light generated in the sample SP is guided to the first detector 77A by being reflected a plurality of times without being transmitted through a lens or the like. That is, the first wavelength region on the ultraviolet side is guided to the first detector 77A via a reflection optical system, such as the reflective object lens 74 and the first parabolic mirror 76A, without passing through a transmission optical system. Since no chromatic aberration occurs, the analysis accuracy can be improved.

In particular, in a case where the electromagnetic wave emitter 71 is configured using the laser light source and the reflective object lens 74 is configured to collect light generated in response to the irradiation of laser light, the first detector 77A reflects light at different angles for each wavelength to separate the light, and causes each beam of the separated light to be incident on an imaging element having a plurality of pixels. As a result, a wavelength of light received by each pixel can be made different, and a light reception intensity can be acquired for each wavelength. In this case, the intensity distribution spectrum corresponds to an intensity distribution for each wavelength of light.

As the first detector 77A, for example, a detector based on a Czerny-Turner detector can be used. The first detector 77A is configured to be suitable for detection of the first wavelength region on the ultraviolet side. The entrance slit of the first detector 77A is aligned so as to coincide with the focal position of the first parabolic mirror 76A. The intensity distribution spectrum generated by the first detector 77A is input to the controller 21 of the controller main body 2.

The first beam splitter 78A reflects a part of light, transmitted through the spectroscopic element 75 (secondary electromagnetic wave on the infrared side including the visible light band), to be guided to the second detector 77B, and transmits the other part (a part of the visible light band) to be guided to the second beam splitter 78B. A relatively large amount of plasma light is guided to the second detector 77B out of plasma light belonging to the visible light band, and a relatively small amount of plasma light is guided to the first camera 81 via the second beam splitter 78B.

The second parabolic mirror 76B is a so-called parabolic mirror, and is arranged between the first beam splitter 78A and the second detector 77B. The second parabolic mirror 76B collects a secondary electromagnetic wave reflected by the first beam splitter 78A, and causes the collected secondary electromagnetic wave to be incident on the second detector 77B.

Specifically, the second parabolic mirror 76B reflects the secondary electromagnetic wave on the infrared side reflected by the first beam splitter 78A after passing through the deflection element 73 and being transmitted through the spectroscopic element 75. The second parabolic mirror 76B is configured to condense the secondary electromagnetic wave reflected by the second parabolic mirror 76B on the second detector 77B.

Here, when the sample SP placed on the placement stage 5 is irradiated with laser light (primary electromagnetic wave) from the analysis housing 70 as a housing, the second detector 77B generates an intensity distribution spectrum which is an intensity distribution of plasma light (secondary electromagnetic wave) generated in the sample SP for each wavelength, which is similar to the first detector 77A. In particular, the second detector 77B is configured such that the plasma light on the infrared side transmitted through the spectroscopic element 75 is incident thereto, and has the entrance slit 77a configured to receive the plasma light.

Note that a focal position of the second parabolic mirror 76B may be arranged so as to coincide with the entrance slit 77a of the second detector 77B, or may be arranged so as to be inconsistent with the entrance slit 77a. The latter arrangement corresponds to a layout shifted from just focus. This layout is advantageous in a case where energy of returning light of laser is strong and the entrance slit 77a can be damaged.

Further, the second detector 77B is supported by a second plate 702 illustrated in FIGS. 7 and 9. The second plate 702 is connected to the upper surface of the optical base 700. The second detector 77B is connected to the optical base 700 via the second plate 702. With this connection, positioning of the entrance slit 77a with respect to the light guide optical system 7a, such as the second parabolic mirror 76B, can be stabilized.

Further, a second adjustment mechanism 772 that adjusts a relative position of the second detector 77B with respect to the second plate 702 is provided in the vicinity of the second detector 77B. Since the second adjustment mechanism 772 is used, a relative position of the entrance slit 77a with respect to the light guide optical system 7a can be adjusted.

Note that the configuration in which the second plate 702 is connected to the optical base 700 is not essential. For example, the second plate 702 may be connected to the inner wall of the analysis housing 70. In such a configuration, the second adjustment mechanism 772 adjusts a relative position of the second detector 77B with respect to the analysis housing 70.

The second detector 77B receives the secondary electromagnetic wave generated in the sample SP and collected by the reflective object lens 74, and generates the intensity distribution spectrum which is the intensity distribution for each wavelength of the secondary electromagnetic wave. The second detector 77B is configured to receive the secondary electromagnetic wave dispersed on the downstream side of the first detector 77A in the optical path of the secondary electromagnetic wave starting from the reflective object lens 74. The second wavelength region on the infrared side out of the plasma light generated in the sample SP is guided to the second detector 77B through a plurality of times of reflection except for passage through the spectroscopic element 75. That is, the second wavelength region on the infrared side is guided to the first detector 77A via a reflection optical system such as the reflective object lens 74 and the first parabolic mirror 76A. Since the occurrence of chromatic aberration can be minimized, the analysis accuracy can be improved.

In particular, in a case where the electromagnetic wave emitter 71 is configured using the laser light source and the reflective object lens 74 is configured to collect light generated in response to the irradiation of laser light, the second detector 77B reflects light at different angles for each wavelength to separate the light, and causes each beam of the separated light to be incident on an imaging element having a plurality of pixels. As a result, a wavelength of light received by each pixel can be made different, and a light reception intensity can be acquired for each wavelength. In this case, the intensity distribution spectrum corresponds to an intensity distribution for each wavelength of light.

As the second detector 77B, for example, a detector based on a Czerny-Turner detector can be used. The second detector 77B is configured to be suitable for detection of the second wavelength region on the infrared side. The entrance slit of the second detector 77B is aligned so as to coincide with the focal position of the second parabolic mirror 76B. The intensity distribution spectrum generated by the second detector 77B is input to the controller 21 of the controller main body 2 similarly to the intensity distribution spectrum generated by the first detector 77A.

The ultraviolet intensity distribution spectrum generated by the first detector 77A and the infrared intensity distribution spectrum generated by the second detector 77B are input to the controller 21. The controller 21 performs component analysis of the sample SP using a basic principle, which will be described later, based on the intensity distribution spectra. The controller 21 can perform the component analysis using a wider frequency range by using the intensity distribution spectrum on the ultraviolet side and the intensity distribution spectrum on the infrared side in combination.

The second beam splitter 78B reflects illumination light (visible light), which has been emitted from an LED light source 79a and passed through the optical element 79b, and irradiates the sample SP with the illumination light via the first beam splitter 78A, the spectroscopic element 75, the deflection element 73, and the reflective object lens 74. Reflection light (visible light) reflected by the sample SP returns to the analysis optical system 7 via the reflective object lens 74.

Among beams of the reflection light returned to the analysis optical system 7, the second beam splitter 78B further transmits reflection light transmitted through the first beam splitter 78A and plasma light transmitted through the first beam splitter 78A without reaching the first and second detectors 77A and 77B, and causes the reflection light and the plasma light to enter the first camera 81 via the imaging lens 80.

The coaxial illuminator 79 includes the LED light source 79a that emits the illumination light, and the optical element 79b through which the illumination light emitted from the LED light source 79a passes. The coaxial illuminator 79 functions as a so-called "coaxial epi-illuminator". The illumination light emitted from the LED light source 79a propagates coaxially with the laser light (primary electromagnetic wave) output from the electromagnetic wave emitter 71 and emitted to the sample SP and the light (secondary electromagnetic wave) returning from the sample SP.

Specifically, the coaxial illuminator 79 emits the illumination light via an optical path coaxial with the primary electromagnetic wave emitted from the electromagnetic wave emitter 71. Specifically, a portion connecting the deflection element 73 and the reflective object lens 74 in the optical path of the illumination light is coaxial with the optical path of the primary electromagnetic wave. Further, a portion connecting the first beam splitter 78A and the reflective object lens 74 in the optical path of the illumination light is coaxial with the optical path of the secondary electromagnetic wave.

Although the coaxial illuminator 79 is incorporated in the analysis housing 70 in the example illustrated in FIG. 7, the present disclosure is not limited to such a configuration. For example, a light source may be laid out outside the analysis housing 70, and the light source and the analysis optical system 7 may be coupled to the optical system via an optical fiber cable.

The side illuminator 84 is arranged to surround the reflective object lens 74 which is the collection head. The side illuminator 84 emits illumination light from the side of the sample SP (in other words, a direction tilted with respect to the analysis optical axis Aa).

Specifically, the side illuminator 84 is arranged so as to surround the outer periphery of the reflective object lens 74. More specifically, the side illuminator 84 is configured using an annular illuminator formed by annularly surrounding the reflective object lens 74. A central axis of an annulus corresponding to the side illuminator 84 (the central axis in a case where the side illuminator 84 is regarded as a ring) is arranged so as to be coaxial with the analysis optical axis Aa.

Specifically, the side illuminator 84 according to the present embodiment includes a housing 84a, an LED light source (light source) 84b that emits illumination light, a light guide member 84c that transmits the illumination light emitted from the LED light source 84b, and a diffusion plate 84d.

The housing 84a is formed in a substantially cylindrical shape having a larger diameter than the connection member 74a and the mirror housing 74b forming the reflective object lens 74. The housing 84a covers the outer periphery (the connection member 74a and the mirror housing 74b) of the reflective object lens 74. As illustrated in FIGS. 8A and 8B, the housing 84a according to the present embodiment is supported not by the reflective object lens 74 but by the analysis housing 70. An inner peripheral surface of the housing 84a is separated from an outer peripheral surface of the reflective object lens 74 in the radial direction.

The housing 84a accommodates the LED light source 84b, the light guide member 84c, and the diffusion plate 84d. The LED light source 84b, the light guide member 84c, and the diffusion plate 84d are arranged between the outer peripheral surface of the reflective object lens 74 and the inner peripheral surface of the housing 84a in the radial direction.

The LED light source 84b is supported by the inner peripheral surface of the housing 84a. The LED light source 84b is annularly arranged along the circumferential direction, and can emit annular illumination light. Further, when the reflective object lens 74 is viewed from the bottom along the analysis optical axis Aa as illustrated in FIG. 10, the LED light source 84b is divided into a plurality of blocks (four blocks in the example of the drawing) along the circumferential direction. The LED light source 84b is configured to be capable of individually lighting each divided block. In the example illustrated in FIG. 10, the illumination light can be emitted from one block located in the 3 o'clock direction when the circumferential direction is regarded as a clock, or the illumination light can be emitted from a plurality of blocks such as the 6 o'clock direction and the 9 o'clock direction. The sample SP is irradiated with the illumination light emitted from the LED light source 84b via the light guide member 84c and the diffusion plate 84d.

Specifically, the LED light source 84b according to the present embodiment is arranged so as to be closer to the inner peripheral surface of the housing 84a than the outer peripheral surface of the reflective object lens 74 in the radial direction. The LED light source 84b is arranged on the radially outer side of the primary mirror 11 and the secondary mirror 12. The LED light source 84b can also be arranged, for example, between the primary mirror 11 and the secondary mirror 12 so as to be closer to the analysis housing 70 than the secondary mirror 12 (in other words, separated from the sample SP more than the secondary mirror 12) in the direction along the analysis optical axis Aa (the optical axis direction of the reflective object lens 74).

Further, the LED light source 84b is positioned in a state of being separated from the outer peripheral surface of the reflective object lens 74, in other words, in a non-contact state with respect to the reflective object lens 74 as illustrated in FIGS. 8A and 8B. The side illuminator 84 is configured to be connected to the reflective object lens 74 via the optical base 700, and is configured not to be directly connected to the reflective object lens 74. Furthermore, a vent 84e is provided above the LED light source 84b as illustrated in FIGS. 8A and 8B. The vent 84e is open to a side surface of the housing 84a.

The reflective object lens 74 is configured as one objective lens by combining a plurality of lenses, and is more sensitive to a temperature change than an objective lens configured using one lens. Therefore, it is desirable to adopt a scheme for suppressing heat transfer to the reflective object lens 74 such that the measurement accuracy does not deteriorate due to the temperature change.

Therefore, the heat transfer from the LED light source 84b to the reflective object lens 74 can be suppressed by connecting the LED light source 84b to the reflective object lens 74 in the non-contact state and providing the vent 84e in the housing 84a as described above.

The light guide member 84c diffuses the illumination light emitted from the LED light source 84b in the radial direction. The illumination light diffused by the light guide member 84c is emitted while expanding in the radial direction (see an optical path L3 in FIG. 8B).

Specifically, the light guide member 84c according to the present embodiment is made of an annular member having an inner peripheral surface continuously reduced in diameter in the radial direction and an outer peripheral surface continuously reduced in diameter in the radial direction as approaching the placement surface 51a along the analysis optical axis Aa.

Here, the inner peripheral surface of the light guide member 84c is steeply reduced in diameter from the outer peripheral surface toward the placement surface 51a along the analysis optical axis Aa. Therefore, a thickness of the light guide member 84c in the radial direction gradually increases toward the placement surface 51a along the analysis optical axis Aa.

Then, the illumination light having passed through the light guide member 84c expands according to an angle θ1 between the inner peripheral surface and the outer peripheral surface of the light guide member 84c. It is possible to control the spread of the illumination light emitted from the side illuminator 84 by adjusting the magnitude of the angle θ1. In particular, the angle θ1 according to the present embodiment is configured such that a region including at least the focal position f of the primary electromagnetic wave is irradiated with the illumination light having passed through the light guide member 84c. The illumination light enlarged by the light guide member 84c passes through the diffusion plate 84d and is emitted to the placement surface 51a.

The side illuminator 84 emits the illumination light via an optical path tilted with respect to the primary electromagnetic wave emitted from the electromagnetic wave emitter 71 as compared with the coaxial illuminator 79. The analysis and observation device A can use the coaxial illuminator 79 and the side illuminator 84 separately.

Therefore, the controller (specifically, an illumination controller 27 to be described later) 21 as the processor inputs a control signal to at least one of the side illuminator 84 and the coaxial illuminator 79 so as to emit the illumination light from at least one of the side illuminator 84 and the coaxial illuminator 79.

The respective blocks constituting the LED light source 84b can be individually turned on as described above by adjusting the control signal generated by the controller 21. In addition, a lighting state of each illuminator, such as a light amount of the coaxial illuminator 79 or the side illuminator 84, can be controlled by the controller 21.

The first camera 81 is accommodated in the analysis housing 70 and is connected to the upper end of the optical base 700 as illustrated in FIGS. 7 and 9. The first camera 81 collects reflection light reflected by the sample SP via the reflective object lens 74. The first camera 81 captures an image of the sample SP by detecting a light reception amount of the collected reflection light. An optical axis of the first camera 81 is coaxial with the primary electromagnetic wave, the secondary electromagnetic wave, and the illumination light. Note that the reflection light collected by the first camera 81 includes both reflection light caused by the illumination light emitted from the side illuminator 84 and reflection light caused by the illumination light emitted from the coaxial illuminator 79. That is, the first camera 81 as the camera is shared by the coaxial illuminator 79 and the side illuminator 84.

Specifically, the first camera 81 as the camera receives the reflection light collected by the reflective object lens 74 as the collection head. Here, the first camera 81 collects the reflection light via an optical path common to the secondary electromagnetic wave collected by the reflective object lens 74. Here, the common optical path corresponds to an optical path connecting the reflective object lens 74 and the spectroscopic element 75 among optical paths of the reflection light. This optical path is dispersed by the spectroscopic element 75.

That is, the spectroscopic element 75 according to the present embodiment can receive the secondary electromagnetic wave and the reflection light via the common optical path, and disperse the common optical path so as to guide the secondary electromagnetic wave to the detector (first detector 77A) and guide the reflection light to the camera (first camera 81). Here, a first optical path corresponds to an optical path connecting the spectroscopic element 75, the first parabolic mirror 76A, and the entrance slit 77a. A second optical path corresponds to an optical path connecting the spectroscopic element 75 and the first camera 81.

In this manner, a portion connecting the first beam splitter 78A and the reflective object lens 74 in the optical path of the reflection light is coaxial with the optical path of the secondary electromagnetic wave. Further, a portion connecting the deflection element 73 and the reflective object lens 74 in the optical path of the reflection light is coaxial with the optical path of the primary electromagnetic wave. Further, a portion connecting the second beam splitter 78B and the reflective object lens 74 in the optical path of the reflection light is coaxial with the optical path of the illumination light.

The first camera 81 according to the present embodiment photoelectrically converts light incident through the imaging lens 80 by a plurality of pixels arranged on a light receiving surface thereof, and converts the light into an electrical signal corresponding to an optical image of a subject (the sample SP).

The first camera 81 may have a plurality of light receiving elements arranged along the light receiving surface. In this case, each of the light receiving elements corresponds to a pixel so that an electrical signal based on the light reception amount in each of the light receiving elements can be generated. Specifically, the first camera 81 according to the present embodiment is configured using an image sensor including a complementary metal oxide semiconductor (CMOS), but is not limited to this configuration. As the first camera 81, for example, an image sensor including a charged-coupled device (CCD) can also be used.

Then, the first camera 81 inputs an electrical signal generated by detecting the light reception amount by each light receiving element to the controller 21 of the controller main body 2. The controller 21 generates image data corresponding to the optical image of the subject based on the input electrical signal.

Note that the light returning from the sample SP is incident while being divided into the first detector 77A, the second detector 77B, and the first camera 81. Therefore, the light reception amount of the first camera 81 is smaller than that of a second camera 93, which will be described later, in the observation optical system 9. As a result, the image data (second image data I2) based on the electrical signal input from the first camera 81 tends to have brightness different from that of image data (first image data I1) based on the electrical signal input from the second camera 93. Therefore, brightness similar to that of the image data generated by the second camera 93 is secured in the first camera 81 by adjusting the exposure time.

The optical components that have been described so far are accommodated in the analysis housing 70. A through-hole 70a is provided in a lower surface of the analysis housing 70. The reflective object lens 74 faces the placement surface 51a via the through-hole 70a.

A shielding member 83 illustrated in FIG. 7 may be arranged in the analysis housing 70. The shielding member 83 is arranged between the through-hole 70a and the reflective object lens 74, and can be inserted on an optical path of laser light based on an electrical signal input from the controller main body 2 (see the dotted line in FIG. 7). The shielding member 83 is configured not to transmit at least the laser light.

The emission of laser light from the analysis housing 70 can be restricted by inserting the shielding member 83 on the optical path. The shielding member 83 may be arranged between the electromagnetic wave emitter 71 and the output adjuster 72.

As illustrated in FIG. 15, the analysis housing 70 also defines an accommodation space of the slide mechanism 65 in addition to an accommodation space of the analysis optical system 7. In that sense, the analysis housing 70 can also be regarded as an element of the slide mechanism 65.

Specifically, the analysis housing 70 according to the present embodiment is formed in a box shape in which a dimension in the front-rear direction is shorter than a dimension in the left-right direction. Then, a left side portion of a front surface 70b of the analysis housing 70 protrudes forward so as to secure a movement margin of the guide rail 65a in the front-rear direction. Hereinafter, such a protruding portion is referred to as a "protrusion", and is denoted by reference sign 70c. The protrusion 70c is arranged at a lower half of the front surface 70b in the vertical direction (in other words, only a lower half of the left side portion of the front surface 70b protrudes).

—Regarding Relation Between Optical Paths—

The analysis optical system 7 causes a primary electromagnetic wave to be incident on the sample SP via the output adjuster 72, the reflective region 731 of the deflection element 73, the opening 11a of the primary mirror 11, and the transmissive region 12a of the secondary mirror 12. As illustrated in FIG. 14, the reflective region 731, the opening 11a, and the transmissive region 12a are arranged in order along analysis optical axis Aa. Therefore, the transmissive region 12a according to the present embodiment can emit the primary electromagnetic wave along the analysis optical axis Aa by transmitting the primary electromagnetic wave which has been emitted from the electromagnetic wave emitter 71 and passed through the opening 11a.

The primary electromagnetic wave emitted along the analysis optical axis Aa is emitted to the sample SP to be scattered or absorbed. In the sample SP, a secondary electromagnetic wave is generated by the irradiation with the primary electromagnetic wave. The generated secondary electromagnetic wave returns to the analysis optical system 7 via the reflective object lens 74. In general, the secondary electromagnetic wave returning in this manner includes various wavelengths.

Therefore, the analysis optical system 7 causes a secondary electromagnetic wave on the ultraviolet side to be incident on the first detector 77A via the primary reflection surface 11b of the primary mirror 11, the secondary reflection surface 12b of the secondary mirror 12, the opening 11a of the primary mirror 11, the hollow region 732 of the deflection element 73, the spectroscopic element 75, and the first parabolic mirror 76A.

The analysis optical system 7 also causes a secondary electromagnetic wave on the infrared side to be incident on the second detector 77B via the primary reflection surface 11b of the primary mirror 11, the secondary reflection surface 12b of the secondary mirror 12, the opening 11a of the primary mirror 11, the hollow region 732 of the deflection element 73, the spectroscopic element 75, the first beam splitter 78A, and the second parabolic mirror 76B.

In this manner, the analysis optical system 7 causes the secondary electromagnetic wave to be incident on the detectors 77A and 77B without intervention of an optical fiber. In other words, the analysis optical system 7 according to the present embodiment guides the secondary electromagnetic wave to the detectors 77A and 77B without passing the optical fiber. The analysis optical system 7 has a so-called fiberless configuration regarding the optical path of the secondary electromagnetic wave.

Further, the analysis optical system 7 according to the present embodiment guides the secondary electromagnetic wave on the ultraviolet side to the first detector 77A using only the reflection of the electromagnetic wave without transmission through a glass material. The analysis optical system 7 has a configuration of a fiberless and all reflection system (an optical system using only reflection of an electromagnetic wave) regarding the optical path of the secondary electromagnetic wave on the ultraviolet side.

The analysis optical system 7 causes transmission through only the spectroscopic element 75 when guiding the secondary electromagnetic wave on the infrared side to the second detector 77B. The analysis optical system 7 has a fiberless configuration in which transmission of an electromagnetic wave is suppressed as much as possible regarding the optical path of the secondary electromagnetic wave on the infrared side.

Further, the analysis optical system 7 according to the present embodiment emits the first electromagnetic wave straight to pass through the reflective region 731, the opening 11a, and the transmissive region 12a, arranged along the analysis optical axis Aa, in order. On the other hand, the secondary reflection surface 12b is arranged closer to the placement surface 51a than the primary reflection surface 11b in the optical axis direction of the reflective object lens 74.

Therefore, the secondary electromagnetic wave generated in the sample SP once propagates in a direction approaching the placement surface 51a when propagating from the primary reflection surface 11b toward the secondary reflection surface 12b after being reflected by the primary reflection surface 11b. Thereafter, the secondary electromagnetic wave reflected by the secondary reflection surface 12b turns back its propagation direction to propagate in a direction away from the placement surface 51a.

In this manner, the secondary electromagnetic wave is propagated through a plurality of times of reflection. The optical path of the secondary electromagnetic wave has a longer length by the amount of turn-back caused by the plurality of times of reflection as compared with a case where a secondary electromagnetic wave is propagated straight, for example, as in the case of the primary electromagnetic wave.

Further, in a case where the concave meniscus lens is used as the secondary mirror 12 and the convex lens is used as the tertiary lens 13 as described above, or in a case where the convex lens is used as the secondary mirror 12 without using the tertiary lens 13, ultraviolet laser light incident on the reflective object lens 74 is collected by any one of the convex lenses and reaches a focal point at a predetermined working distance Df. In any configuration, the reflective object lens 74 can diffuse the ultraviolet laser light in a conical shape by gradually decreasing the energy density of the ultraviolet laser light as being away by the working distance Df or more.

—Basic Principle of Analysis by Analysis Optical System 7—

The controller 21, particularly a spectrum analyzer 213 to be described later, executes component analysis of the sample SP based on the intensity distribution spectra input from the first detector 77A and the second detector 77B as detectors. As a specific analysis method, the LIBS method can be used as described above. The LIBS method is a method for analyzing a component contained in the sample SP at an element level (so-called elemental analysis method).

Generally, when high energy is applied to a substance, an electron is separated from an atomic nucleus, so that the substance is turned into a plasma state. The electron separated from the atomic nucleus temporarily becomes a high-energy and unstable state, but loses energy from such a state and is captured again by the atomic nucleus to transition to a low-energy and stable state (in other words, returns from the plasma state to a non-plasma state).

Here, the energy lost from the electron is emitted from the electron as the electromagnetic wave, but the magnitude of the energy of the electromagnetic wave is defined by an energy level based on a shell structure unique to each element. That is, the energy of the electromagnetic wave emitted when the electron returns from the plasma to the non-plasma state has a unique value for each element (more precisely, a trajectory of the electron bound to the atomic nucleus). The magnitude of energy of an electromagnetic wave is defined by a wavelength of the electromagnetic wave. Therefore, the components contained in the substance can be analyzed at the element level by analyzing a wavelength distribution of the electromagnetic wave emitted from the electron, that is, a wavelength distribution of the light emitted from the substance at the time of the plasma state. Such a technique is generally called an atomic emission spectroscopy (AES) method.

The LIBS method is an analysis method belonging to the AES method. Specifically, in the LIBS method, the substance (sample SP) is irradiated with laser (primary electromagnetic wave) to apply energy to the substance. Here, a site irradiated with the laser is locally turned into plasma, and thus, component analysis of the substance can be performed by analyzing the intensity distribution spectrum of light (secondary electromagnetic wave) emitted with the turning into plasma.

That is, as described above, the wavelength of each plasma light (secondary electromagnetic wave) has the unique value for each element, and thus, an element corresponding to a peak becomes a component of the sample SP when the intensity distribution spectrum forms the peak at a specific wavelength. Then, when the intensity distribution spectrum includes a plurality of peaks, a component ratio of each element can be calculated by comparing the intensity (light reception amount) of each of the peaks.

According to the LIBS method, vacuuming is unnecessary, and component analysis can be performed in the atmospheric open state. Further, although the sample SP is subjected to a destructive test, it is unnecessary to perform a treatment such as dissolving the entire sample SP so that position information of the sample SP remains (the test is only locally destructive).

—Observation Optical System 9—

The observation optical system 9 is a set of components configured to observe the sample SP as the observation target, and the respective components are accommodated in the observation housing 90. The components constituting the observation optical system 9 include the objective lens 92 and the second camera 93 which is a second camera. At least these components are accommodated in the observation housing 90. Further, elements configured to observe the sample SP also include the controller 21 as the processor.

The observation optical system 9 includes an observation unit 9a having the objective lens 92. As illustrated in FIG. 3 and the like, the observation unit 9a corresponds to a cylindrical lens barrel arranged on the lower end side of the observation housing 90. The observation unit 9a is held by the analysis housing 70. The observation unit 9a can be detached alone from the observation housing 90.

A communication cable C2 configured to transmit and receive an electrical signal to and from the controller main body 2 and an optical fiber cable C3 configured to guide illumination light from the outside are connected to the observation housing 90. Note that the communication cable C2 is not essential, and the observation optical system 9 and the controller main body 2 may be connected by wireless communication.

Specifically, the observation optical system 9 includes a mirror group 91, the objective lens 92, the second camera 93 which is the second camera, a second coaxial illuminator 94, and a second side illuminator 95 as illustrated in FIG. 6.

The objective lens 92 has the observation optical axis Ao extending along the substantially vertical direction, collects illumination light to be emitted to the sample SP placed on the placement stage main body 51, and collects light (reflection light) from the sample SP. The observation optical axis Ao is provided to be parallel to the analysis optical axis Aa of the reflective object lens 74 of the analysis optical system 7. The reflection light collected by the objective lens 92 is received by the second camera 93.

The mirror group 91 transmits the reflection light collected by the objective lens 92 to be guided to the second camera 93. The mirror group 91 according to the present embodiment can be configured using a total reflection mirror, a beam splitter, and the like as illustrated in FIG. 6. The mirror group 91 also reflects the illumination light emitted from the second coaxial illuminator 94 to be guided to the objective lens 92.

The second camera 93 collects the reflection light collected by the objective lens 92 and detects a light reception amount of the reflection light to capture an image of the sample SP. Specifically, the second camera 93 according to the present embodiment photoelectrically converts light incident from the sample SP through the objective lens 92 by a plurality of pixels arranged on a light receiving surface thereof, and converts the light into an electrical signal corresponding to an optical image of the subject (sample SP).

The second camera 93 may have a plurality of light receiving elements arranged along the light receiving surface. In this case, each of the light receiving elements corresponds to a pixel so that an electrical signal based on the light reception amount in each of the light receiving elements can be generated. The second camera 93 according to the present embodiment includes an image sensor including a CMOS similarly to the first camera 81, but an image sensor including a CCD can also be used.

Then, the second camera 93 inputs an electrical signal generated by detecting the light reception amount by each light receiving element to the controller 21 of the controller main body 2. The controller 21 generates image data corresponding to the optical image of the subject based on the input electrical signal.

The second coaxial illuminator 94 emits the illumination light guided from the optical fiber cable C3. The second coaxial illuminator 94 emits the illumination light through an optical path common to the reflection light collected through the objective lens 92. That is, the second coaxial illuminator 94 functions as a "coaxial epi-illuminator" coaxial with the observation optical axis Ao of the objective lens 92. Note that a light source may be incorporated in the observation unit 9a, instead of guiding the illumination light from the outside through the optical fiber cable C3. In that case, the optical fiber cable C3 is unnecessary.

As schematically illustrated in FIG. 6, the second side illuminator 95 is configured by a ring illuminator arranged so as to surround the objective lens 92. The second side illuminator 95 emits illumination light from obliquely above the sample SP similarly to the side illuminator 84 in the analysis optical system 7. A central axis when the second side illuminator 95 is regarded as an annular ring coincides with the observation optical axis Ao although not illustrated in detail. Further, the second side illuminator 95 is divided into a plurality of blocks in the circumferential direction and the respective blocks can be individually turned on, which is similar to the side illuminator 84.

In the example illustrated in FIG. 10, the second side illuminator 95 is divided into four blocks arranged at the 0 o'clock position, the 3 o'clock position, the 6 o'clock position, and the 9 o'clock position when the circumferential direction is regarded as a clock, and can emit illumination light from one block located in the 3 o'clock direction or emit illumination light from a plurality of blocks, such as the 6 o'clock direction and the 9 o'clock direction, which is similar to the side illuminator 84 of the analysis optical system 7.

The analysis and observation device A can use the second coaxial illuminator 94 and the second side illuminator 95 separately. Therefore, the controller (specifically, the illumination controller 216 to be described later) 21 as the processor inputs a control signal to at least one of the second side illuminator 95 and the second coaxial illuminator 94 so as to emit the illumination light from at least one of the second side illuminator 95 and the second coaxial illuminator 94.

The respective blocks constituting the second side illuminator 95 can be individually turned on as described above by adjusting the control signal generated by the controller 21. In addition, a lighting state of each illuminator, such as a light amount of the second coaxial illuminator 94 or the second side illuminator 95, can be controlled by the controller 21.

—Housing Coupler 64—

The housing coupler 64 is a member configured to couple the observation housing 90 to the analysis housing 70. The housing coupler 64 couples both the housings 70 and 90, so that the analysis optical system 7 and the observation optical system 9 move integrally.

The housing coupler 64 can be attached inside and outside the analysis housing 70, that is, to the inside or outside the analysis housing 70, or to the stand 42. In particular, the housing coupler 64 is attached to an outer surface of the analysis housing 70 in the present embodiment.

Specifically, the housing coupler 64 according to the present embodiment is configured to be attachable to the protrusion 70c of the analysis housing 70 and to hold the observation unit 9a on the right side of the protrusion 70c.

Further, a front surface of the protrusion 70c protrudes forward from a front portion of the housing coupler 64 and the observation housing 90 in a state where the observation housing 90 is coupled to the analysis housing 70 by the housing coupler 64 as illustrated in FIG. 3. In this manner, the observation housing 90 and at least a part of the analysis housing 70 (the protrusion 70c in the present embodiment) are laid out so as to overlap each other when viewed from the side (when viewed from a direction orthogonal to the moving direction of the observation optical system 9 and the analysis optical system 7 by the slide mechanism 65) in the state where the housing coupler 64 holds the observation housing 90 in the present embodiment.

The housing coupler 64 according to the present embodiment can fix the relative position of the analysis optical axis Aa with respect to the observation optical axis Ao by fixing the observation housing 90 to the analysis housing 70.

Specifically, as illustrated in FIG. 15, the housing coupler 64 holds the observation housing 90, so that the observation optical axis Ao and the analysis optical axis Aa are arranged side by side along the direction (front-rear direction in the present embodiment) in which the observation optical system 9 and the analysis optical system 7 relatively move with respect to the placement stage 5 by the slide mechanism 65. In particular, the observation optical axis Ao is arranged on the front side as compared with the analysis optical axis Aa in the present embodiment.

Further, as illustrated in FIG. 15, the observation optical axis Ao and the analysis optical axis Aa are arranged such that positions in a non-moving direction (the left-right direction in the present embodiment), which is a direction that extends along the horizontal direction and is orthogonal to the moving direction (the front-rear direction in the present embodiment), coincide with each other when the housing coupler 64 holds the observation housing 90.

—Slide Mechanism 65—

FIG. 15 is a schematic view for describing the configuration of the slide mechanism 65. Further, FIGS. 16A and 16B are views for describing horizontal movement of the head 6.

The slide mechanism 65 is configured to move the relative positions of the observation optical system 9 and the analysis optical system 7 with respect to the placement stage main body 51 along the horizontal direction such that the capturing of the sample SP by the observation optical system 9 and the irradiation of the electromagnetic wave (laser light) (in other words, the irradiation of the electromagnetic wave by the electromagnetic wave emitter 71 of the analysis optical system 7) in the case of generating the intensity distribution spectrum by the analysis optical system 7 can be performed on the identical point in the sample SP as the observation target.

The moving direction of the relative position by the slide mechanism 65 can be a direction in which the observation optical axis Ao and the analysis optical axis Aa are arranged. As illustrated in FIG. 15, the slide mechanism 65 according to the present embodiment moves the relative positions of the observation optical system 9 and the analysis optical system 7 with respect to the placement stage main body 51 along the front-rear direction.

The slide mechanism 65 according to the present embodiment relatively displaces the analysis housing 70 with respect to the stand 42 and the head attachment member 61. Since the analysis housing 70 and the observation unit 9a are coupled by the housing coupler 64, the observation unit 9a is also integrally displaced by displacing the analysis housing 70.

Specifically, the slide mechanism 65 according to the present embodiment includes the guide rail 65a and an actuator 65b, and the guide rail 65a is formed to protrude forward from a front surface of the head attachment member 61.

Specifically, a proximal end of the guide rail 65a is fixed to the head attachment member 61. On the other hand, a distal side portion of the guide rail 65a is inserted into an accommodation space defined in the analysis housing 70, and is attached to the analysis housing 70 in an insertable and removable state. An insertion and removal direction of the analysis housing 70 with respect to the guide rail 65a is equal to a direction (the front-rear direction in the present embodiment) in which the head attachment member 61 and the analysis housing 70 are separated or brought close to each other.

The actuator 65b can be configured using, for example, a linear motor or a stepping motor that operates based on an electrical signal from the controller 21. It is possible to relatively displace the analysis housing 70, and eventually, the observation optical system 9 and the analysis optical system 7 with respect to the stand 42 and the head attachment member 61 by driving the actuator 65b. When the stepping motor is used as the actuator 65b, a motion conversion mechanism that converts a rotational motion of an output shaft in the stepping motor into a linear motion in the front-rear direction is further provided.

The slide mechanism 65 further includes a movement amount sensor Sw2 configured to detect each movement amount of the observation optical system 9 and the analysis optical system 7. The movement amount sensor Sw2 can be configured using, for example, a linear scale (linear encoder), a photointerrupter, or the like.

The movement amount sensor Sw2 detects a relative distance between the analysis housing 70 and the head attachment member 61, and inputs an electrical signal corresponding to the relative distance to the controller main body 2. The controller main body 2 calculates the amount of change in the relative distance input from the movement amount sensor Sw2 to determine each displacement amount of the observation optical system 9 and the analysis optical system 7.

When the slide mechanism 65 is operated, the head 6 slides along the horizontal direction, and the relative positions of the observation optical system 9 and the analysis optical system 7 with respect to the placement stage 5 move (horizontally move) as illustrated in FIGS. 16A and 16B. This horizontal movement causes the head 6 to switch between a first mode in which the reflective object lens 74 faces the sample SP and a second mode in which the objective lens 92 faces the sample SP. The slide mechanism 65 can slide the analysis housing 70 and the observation housing 90 between the first mode and the second mode.

As illustrated in FIGS. 16A and 16B, the head 6 is in a relatively advanced state in the first mode, and the head 6 is in a relatively retracted state in the second mode. The first mode is an operation mode for performing component analysis of the sample SP by the analysis optical system 7, and the second mode is an operation mode for performing magnifying observation of the sample SP by the observation optical system 9.

In particular, the analysis and observation device A according to the present embodiment is configured such that a point to which the reflective object lens 74 is directed in the first mode and a point to which the objective lens 92 is directed in the second mode are the same point. Specifically, the analysis and observation device A is configured such that a point where the analysis optical axis Aa intersects with the sample SP in the first mode and a point where the observation optical axis Ao intersects with the sample SP in the second mode are the same (see FIG. 16B).

In order to implement such a configuration, a movement amount D2 of the head 6 when the slide mechanism 65 is operated is set to be the same as a distance D1 between the observation optical axis Ao and the analysis optical axis Aa (see FIG. 15). In addition, the arrangement direction of the observation optical axis Ao and the analysis optical axis Aa is set to be parallel to a moving direction of the head 6 as illustrated in FIG. 15.

Further, a distance between the sample SP and a center (more specifically, a site where the analysis optical axis Aa and the reflective object lens 74 intersect with each other) of the reflective object lens 74 in the first mode (first state) is set to coincide with a distance between the sample SP and a center (more specifically, a site where the observation optical axis Ao and the objective lens 92 intersect with each other) of the objective lens 92 in the second mode (second state) by adjusting the dimension of the housing coupler 64 in the substantially vertical direction in the present embodiment. This setting can also be performed by obtaining an in-focus position by autofocus. With this setting, the focal position can be made consistent between the first mode during analysis of the sample SP and the second mode during observation of the sample SP. Since the focal position is made consistent in both the modes, it is possible to maintain a focused state before and after the mode switching.

Note that a dimension of the housing coupler 64 may be adjusted to obtain a design in which focal positions approximately coincide between the first mode and the second mode, and the focal positions may be more precisely adjusted by autofocus at the time of mode switching. In this manner, the focal positions are designed to approximately coincide with each other in advance, and thus, the time required for the autofocus can be shortened.

Typically, the WD of the reflective object lens 74 is shorter than that of a general objective lens such as the objective lens 92. Therefore, the WD of the reflective object lens 74 is configured to be longer than usual by setting a lens diameter of the reflective object lens 74 to be larger than that of the objective lens 92 in the present embodiment.

With the above configuration, the image generation of the sample SP by the observation optical system 9 and the generation of the intensity distribution spectrum by the analysis optical system 7 (specifically, the irradiation of the primary electromagnetic wave by the analysis optical system 7 when the intensity distribution spectrum is generated by the analysis optical system 7) can be executed on the same point in the sample SP from the same direction at timings before and after performing the switching between the first mode and the second mode.

Further, the cover member 61b in the head attachment member 61 is arranged so as to cover the reflective object lens 74 forming the analysis optical system 7 (shielding state) in the first mode in which the head 6 is in the relatively retracted state, and is arranged so as to be separated from the reflective object lens 74 (non-shielding state) in the second mode in which the head 6 is in the relatively advanced state as illustrated in FIG. 16B.

In the former shielding state, laser light can be shielded by the cover member 61b even if the laser light is unintentionally emitted. As a result, the safety of the device can be improved.

(Details of Tilting Mechanism 45)

FIGS. 17A and 17B are views for describing an operation of the tilting mechanism 45. Hereinafter, the tilting mechanism 45, such as a relation with the housing coupler 64, will be further described with reference to FIGS. 17A and 17B.

The tilting mechanism 45 is a mechanism including the above-described shaft member 44 and the like, and can tilt at least the observation optical system 9 of the analysis optical system 7 and the observation optical system 9 with respect to the reference axis As perpendicular to the placement surface 51a.

As described above, the housing coupler 64 integrally couples the analysis housing 70 and the observation housing 90 such that the relative position of the observation optical axis Ao with respect to the analysis optical axis Aa is maintained in the present embodiment. Therefore, when the observation optical system 9 having the observation optical axis Ao is tilted, the analysis optical system 7 having the analysis optical axis Aa is tilted integrally with the observation optical system 9 as illustrated in FIGS. 17A and 17B.

In this manner, the tilting mechanism 45 according to the present embodiment integrally tilts the analysis optical system 7 and the observation optical system 9 while maintaining the relative position of the observation optical axis Ao with respect to the analysis optical axis Aa.

Further, an operation of the slide mechanism 65 and the operation of the tilting mechanism 45 are independent from each other, and a combination of both the operations is allowed. Therefore, the slide mechanism 65 can move the relative positions of the observation optical system 9 and the analysis optical system 7 in a state where at least the observation optical system 9 is held in a tilted posture by the tilting mechanism 45. That is, the analysis and observation device A according to the present embodiment can slide the head 6 back and forth in a state where the observation optical system 9 is tilted as indicated by the double-headed arrow A1 in FIG. 17B.

In particular, since the analysis optical system 7 and the observation optical system 9 are configured to be tilted integrally in the present embodiment, the slide mechanism 65 moves the relative positions of the observation optical system 9 and the analysis optical system 7 while maintaining the state where both the observation optical system 9 and the analysis optical system 7 are tilted by the tilting mechanism 45.

Further, the analysis and observation device A is configured to perform eucentric observation. That is, a three-dimensional coordinate system, which is unique to the device and is formed by three axes parallel to the X direction, the Y direction, and the Z direction, is defined in the analysis and observation device A. A storage device 21b of the controller 21 further stores a coordinate of an intersection position, which will be described later, in the three-dimensional coordinate system of the analysis and observation device A. The coordinate information of the intersection position may be stored in the storage device 21b in advance at the time of shipment of the analysis and observation device A from the factory. Further, the coordinate information of the intersection position stored in the storage device 21b may be updatable by a user of the analysis and observation device A.

As illustrated in FIGS. 17A and 17B, assuming that an angle of the analysis optical axis Aa with respect to the reference axis As is referred to as a "tilt θ", the analysis and observation device A is configured to allow the emission of laser light in a case where the tilt θ is less than a predetermined first threshold θmax, for example. A hard constraint can be imposed on the tilting mechanism 45 in order to keep the tilt θ less the first threshold θmax. For example, the tilting mechanism 45 may be provided with a brake mechanism (not illustrated) to physically restrict an operation range of the tilting mechanism 45.

The observation optical axis Ao, which is the optical axis of the objective lens 92, intersects with the central axis Ac. When the objective lens 92 swings about the central axis Ac, an angle (tilt θ) of the observation optical axis Ao with respect to the reference axis As changes while an intersection position between the observation optical axis Ao and the central axis Ac is maintained constant. In this manner, when the user swings the objective lens 92 about the central axis Ac by the tilting mechanism 45, a eucentric relation in which a visual field center of the second camera 93 does not move from the same observation target portion is maintained even if the objective lens 92 is in a tilted state, for example, in a case where an observation target portion of the sample SP is at the above-described intersection position. Therefore, it is possible to prevent the observation target portion of the sample SP from deviating from the visual field of the second camera 93 (visual field of the objective lens 92).

In particular, the analysis optical system 7 and the observation optical system 9 are configured to be tilted integrally in the present embodiment, and thus, the analysis optical axis Aa, which is the optical axis of the reflective object lens 74, intersects with the central axis Ac similarly to the observation optical axis Ao. When the reflective object lens 74 swings about the central axis Ac, an angle (tilt θ) of the analysis optical axis Aa with respect to the reference axis As changes while an intersection position between the analysis optical axis Aa and the central axis Ac is maintained constant.

Further, the tilting mechanism 45 can tilt the stand 42 rightward by about 90° or leftward by about 60° with respect to the reference axis As as described above. However, in the case where the analysis optical system 7 and the observation optical system 9 are configured to be integrally tilted, there is a possibility that laser light emitted from the analysis optical system 7 is emitted toward the user if the stand 42 is excessively tilted.

Therefore, assuming that the tilt of each of the observation optical axis Ao and the analysis optical axis Aa with respect to the reference axis As is θ, it is desirable that the tilt θ falls within a range satisfying a predetermined safety standard at least under a situation where laser light can be emitted. Specifically, the tilt θ according to the present embodiment can be adjusted within a range below the predetermined first threshold θmax as described above.

<Details of Controller Main Body 2>

Figure 19:
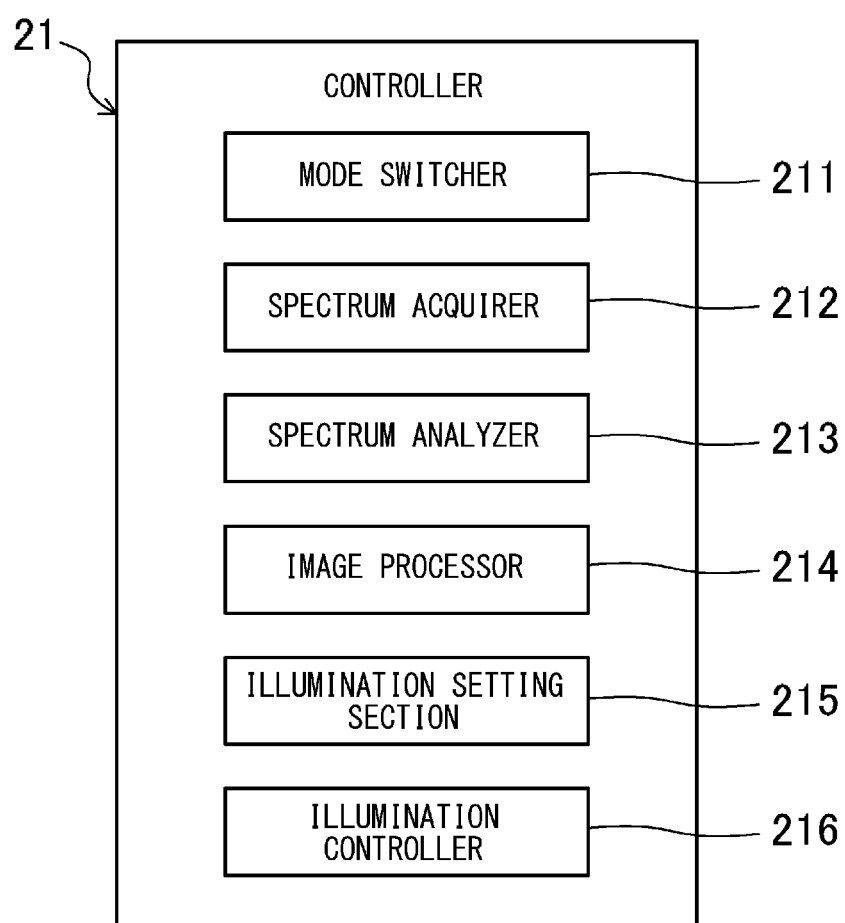
FIG. 19 is a block diagram illustrating a configuration of a controller.

FIG. 18 is a block diagram illustrating the configuration of the controller main body 2. Further, FIG. 19 is a block diagram illustrating the configuration of the controller 21. Although the controller main body 2 and the optical system assembly 1 are configured separately in the present embodiment, the present disclosure is not limited to such a configuration. At least a part of the controller main body 2 may be provided in the optical system assembly 1.

As described above, the controller main body 2 according to the present embodiment includes the controller 21 that performs various processes and the display 22 that displays information related to the processes performed by the controller 21. Among them, the controller 21 includes: a processing device 21a including a CPU, a system LSI, a DSP, and the like; the storage device 21b including a volatile memory, a nonvolatile memory, and the like; and an input/output bus 21c.

The controller 21 is configured to be capable of executing both generation of image data of the sample SP based on the light reception amount of light from the sample SP and analysis of a substance contained in the sample SP based on an intensity distribution spectrum.

Specifically, the controller 21 is electrically connected with at least the mouse 31, the console 32, the keyboard 33, the head drive 47, the placement stage drive 53, the electromagnetic wave emitter 71, the output adjuster 72, the LED light source 79a, the first camera 81, the shielding member 83, the LED light source 84b, the second camera 93, the second coaxial illuminator (second coaxial illuminator) 94, the second side illuminator (second side illuminator) 95, the actuator 65b, the lens sensor Sw1, the movement amount sensor Sw2, the first tilt sensor Sw3, and the second tilt sensor Sw4 as illustrated in FIG. 18.

The controller 21 electrically controls the head drive 47, the placement stage drive 53, the electromagnetic wave emitter 71, the output adjuster 72, the LED light source 79a, the first camera 81, the shielding member 83, the LED light source 84b, the second camera 93, the second coaxial illuminator 94, the second side illuminator 95, and the actuator 65b.

Further, output signals of the first camera 81, the second camera 93, the lens sensor Sw1, the movement amount sensor Sw2, the first tilt sensor Sw3, and the second tilt sensor Sw4 are input to the controller 21. The controller 21 executes calculation or the like based on the input output signal, and executes processing based on a result of the calculation.

For example, the controller 21 calculates the tilt θ of the analysis optical system 7 with respect to the reference axis As perpendicular to the placement surface 51a based on a detection signal of the first tilt sensor Sw3 and a detection signal of the second tilt sensor Sw4. When the tilt exceeds a predetermined threshold, the controller 21 notifies the user of a warning or the like.

Further, the controller 21 can identify at least a type of the objective lens 92 among types of the observation optical system 9 corresponding to the observation unit 9a fixed to the analysis optical system 7 by the housing coupler 64, and can execute processing related to capturing of the sample SP based on a result of the identification. Here, the type of the objective lens 92 can be identified based on a detection signal of the lens sensor Sw1. The controller 21 can execute, for example, adjustment of exposure time of the second camera 93, adjustment of brightness of illumination light, and the like as the processing related to the capturing of the sample SP.

Specifically, the controller 21 according to the present embodiment includes a mode switcher 211, a spectrum acquirer 212, a spectrum analyzer 213, an image processor 214, an illumination setting section 215, and an illumination controller 216 as illustrated in FIG. 19. These elements may be implemented by a logic circuit or may be implemented by executing software.

—Mode Switcher 211—

The mode switcher 211 switches from the first mode to the second mode or switches from the second mode to the first mode by advancing and retracting the analysis optical system 7 and the observation optical system 9 along the horizontal direction (the front-rear direction in the present embodiment).

Specifically, the mode switcher 211 according to the present embodiment reads, in advance, the distance between the observation optical axis Ao and the analysis optical axis Aa stored in advance in the storage device 21b. Next, the mode switcher 211 operates the actuator 65b of the slide mechanism 65 to advance and retract the analysis optical system 7 and the observation optical system 9.

Here, the mode switcher 211 compares each displacement amount of the observation optical system 9 and the analysis optical system 7 detected by the movement amount sensor Sw2 with the distance read in advance, and determines whether or not the former displacement amount reaches the latter distance. Then, the advancement and retraction of the analysis optical system 7 and the observation optical system 9 are stopped at a timing when the displacement amount reaches a predetermined distance. Note that the predetermined distance may be determined in advance, or the predetermined distance and the maximum movable range of the actuator 65b may be configured to coincide with each other.

Note that the head 6 can be also tilted after switching to the second mode is performed by the mode switcher 211.

—Spectrum Acquirer 212—

The spectrum acquirer 212 emits laser light from the analysis optical system 7 in the first mode to acquire an intensity distribution spectrum. Specifically, the spectrum acquirer 212 according to the present embodiment emits the laser light (ultraviolet laser light) as a primary electromagnetic wave from the electromagnetic wave emitter 71, and irradiates the sample SP with the laser light via the reflective object lens 74. When the sample SP is irradiated with the laser light, a surface of the sample SP is locally turned into plasma, and light (secondary electromagnetic wave) having energy corresponding to a width between energy levels is emitted from an electron when returning from the plasma state to a gas or the like. The secondary electromagnetic wave emitted in this manner returns to the analysis optical system 7 through the reflective object lens 74, and reaches the first camera 81, the first detector 77A, and the second detector 77B.

The image processor 214 generates image data based on the light returning to the first camera 81. Further, the spectrum acquirer 212 disperses the light reception amount for each wavelength based on the light returning to the first and second detectors 77A and 77B to generate the intensity distribution spectrum. The intensity distribution spectrum generated by the spectrum acquirer 212 is input to the spectrum analyzer 213.

Note that the spectrum acquirer 212 synchronizes light reception timings of the first and second detectors 77A and 77B with an emission timing of the laser light. With this setting, the spectrum acquirer 212 can acquire the intensity distribution spectrum in accordance with the emission timing of the laser light.

—Spectrum Analyzer 213—

The spectrum analyzer 213 executes component analysis of the sample SP based on the intensity distribution spectrum generated by the spectrum acquirer 212. As described above, when the LIBS method is used, the surface of the sample SP is locally turned into plasma, and a peak wavelength of light emitted when returning from the plasma state to a gas or the like has a unique value for each element (more precisely, electron trajectory of an electron bound to an atomic nucleus). Therefore, it is possible to determine that an element corresponding to a peak position is a component contained in the sample SP by identifying the peak position of the intensity distribution spectrum, and it is also possible to determine component ratios of the respective elements and estimate the composition of the sample SP based on the determined component ratios by comparing magnitudes of peaks (heights of peaks).

An analysis result of the spectrum analyzer 213 can be displayed on the display 22 or stored in the storage device 21b in a predetermined format.

—Image Processor 214—

The image processor 214 can control a display mode on the display 22 based on image data (first image data I1 to be described later) generated by the second camera 93 in the observation optical system 9, image data (second image data I2 to be described later) generated by the first camera 81 in the analysis optical system 7, the analysis result by the spectrum analyzer 213, and the like.

In particular, the image processor 214 according to the present embodiment causes a region, captured by the second camera 93 (for example, a center position of the region), and a region, captured by the first camera 81 (for example, a center position of the region), to coincide before and after switching between the first mode and the second mode. The image processor 214 can adjust display modes of the first and second cameras 81 and 93, and eventually, the first and second image data I1 and I2 generated by the cameras 81 and 93, so as to make the respective regions coincide.

Figure 26:
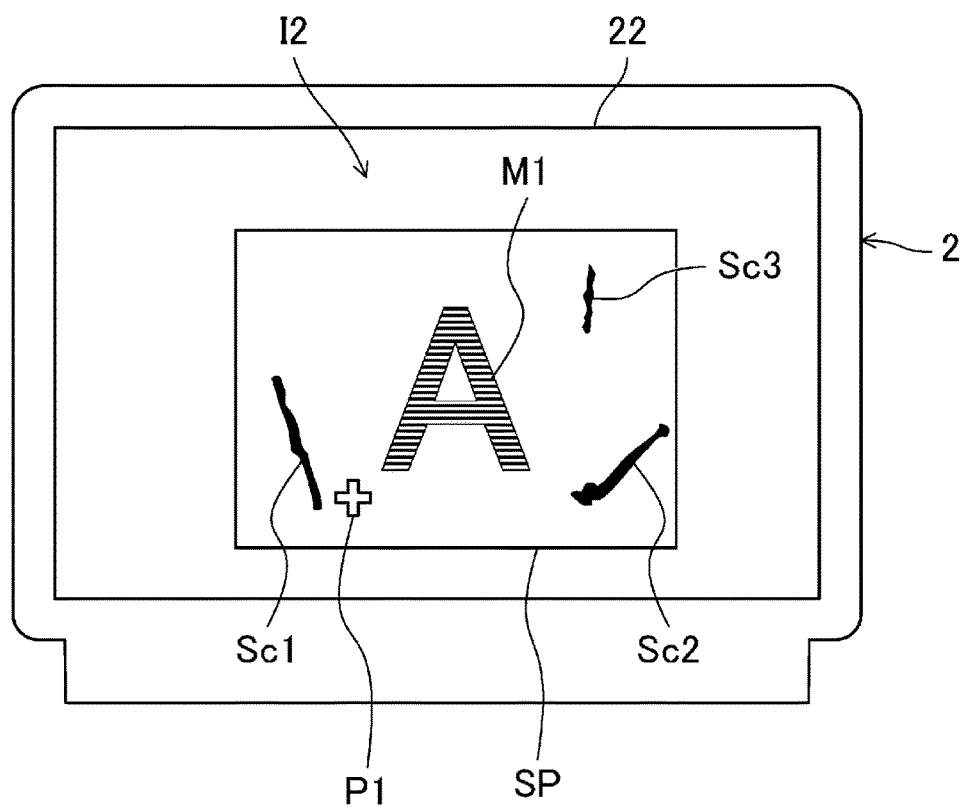
FIG. 26 is a view illustrating image data generated using the coaxial illuminator in a first mode.
Figure 27:
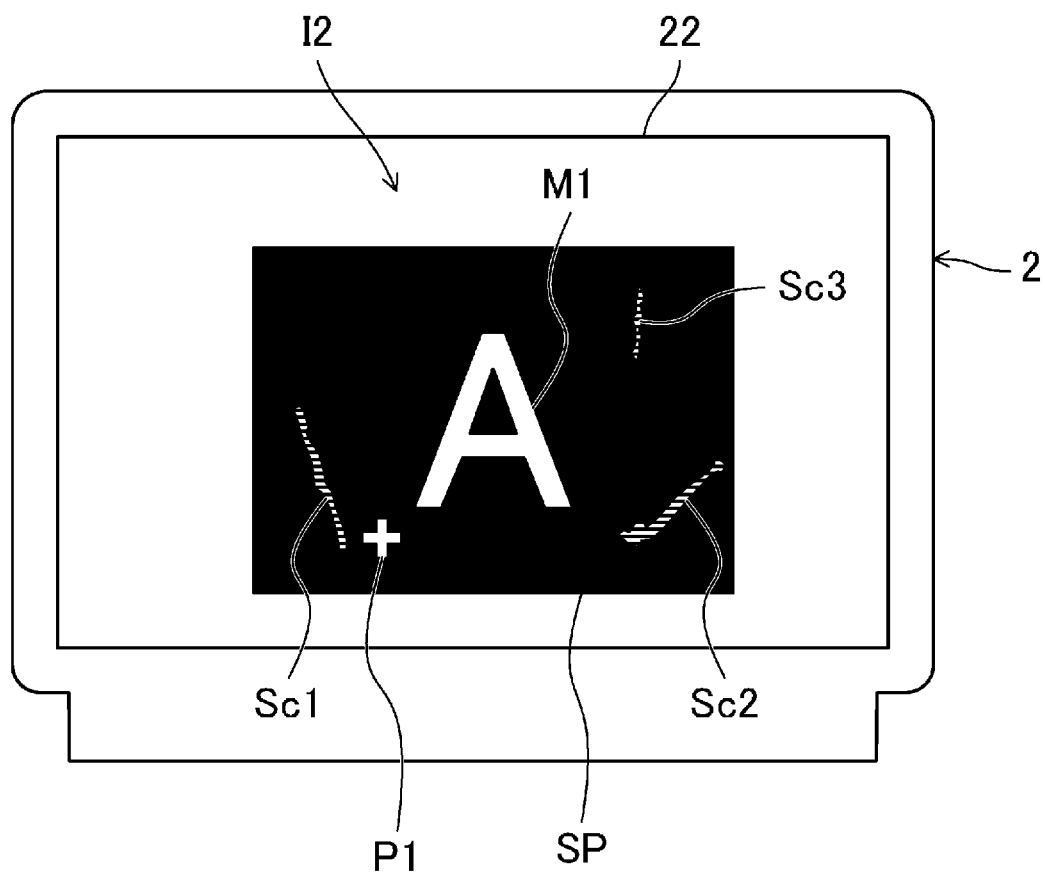
FIG. 27 is a view illustrating image data generated using the side illuminator in the first mode.

In addition, the image processor 214 can also display an index P1 indicating an irradiation position (more generally, a region irradiated with an electromagnetic wave) of laser light in a superimposed manner on the second image data I2 as illustrated in FIGS. 26 and 27 to be described later.

—Illumination Setting Section 215—

When switching from the first mode to the second mode or switching from the second mode to the first mode, the illumination setting section 215 stores an illumination condition before the mode switching and sets an illumination condition after the mode switching based on the stored illumination condition.

Specifically, the illumination setting section 215 according to the present embodiment sets the illumination condition after the switching such that an illumination condition, which has been referred to before the switching among an illumination condition related to the coaxial illuminator 79 and an illumination condition related to the side illuminator 84 in the first mode, and an illumination condition related to the second coaxial illuminator 94 and an illumination condition related to the second side illuminator 95 in the second mode, is reproduced before and after the switching between the first mode and the second mode.

Here, the illumination condition refers to control parameters related to the first camera 81, the coaxial illuminator 79, and the side illuminator 84 and control parameters related to the second camera 93, the second coaxial illuminator 94, and the second side illuminator 95. The illumination conditions include a light amount of each illuminator, a lighting state of each illuminator, and the like. The illumination conditions include a plurality of items that can be changed in setting.

The control parameters related to the light amount of each illuminator include a magnitude of a current flowing through the LED light source 79a, a timing of energizing with the current, an energizing time, and the like. For example, the light amount of the coaxial illuminator 79 can be controlled through the magnitude of the current flowing through the LED light source 79a. The control parameters also include each exposure time of the first camera 81, the second camera 93, and the like.

The control parameters related to the lighting state of each illuminator include, for example, information indicating which block among the blocks constituting each of the side illuminator 84 and the second side illuminator 95 is to be turned on.

The illumination setting section 215 compares a current illumination condition, that is, an item that has been referred to before the mode switching and an item that can be set after the mode switching among the illumination conditions including a plurality of setting items to extract a common item.

The illumination setting section 215 sets an illumination condition such that a setting content before the mode switching is used for the extracted common item, and stores the illumination condition in the storage device 21b. For example, it is possible to consider a case where the second side illuminator 95 is used in the second mode before switching and the side illuminator 84 is used in the first mode after the switching at the time of switching from the second mode to the first mode. In this case, the illumination setting section 215 stores the light amount of the second side illuminator 95 and a block, which has been set in the lighting state in the second mode before the switching, in the second side illuminator 95 including the four blocks. The illumination setting section 215 sets an illumination condition including the light amount and the block that has been set in the lighting state, and stores the illumination condition in the storage device 21b.

Note that the illumination setting section 215 can set a current illumination condition by reading an initial setting of the illumination condition or reading an illumination condition used in the previous use if there is an item unique to one of illumination conditions before and after switching, for example, if there is an item that can be set only in a state after the switching and it is difficult to refer to a setting item before the switching. That is, illumination conditions which have been referred to in the past use are stored in the storage device 21b in the order of use, and the illumination setting section 215 can set an item that is not usable among the illumination conditions based on the stored content.

Further, the illumination condition can be manually changed through operation section 3 after the mode switching.

Further, a visible light transmittance of the optical element of the analysis optical system 7 through which light reflected by the sample SP passes when returning to the first camera 81, such as the spectroscopic element 75 and the imaging lens 80 and a light receiving sensitivity of the imaging element forming the first camera 81, and a visible light transmittance of the optical element forming the observation optical system 9, such as the mirror group 91 and a light receiving sensitivity of the imaging element forming second camera 93 may be considered in the initial setting and adjustment of the illumination condition.

Further, the exposure time of the first camera 81 and the exposure time of the second camera 93 can be made common by adjusting the light amount of the illuminator so as to make the brightness of image data displayed on the display 22 constant at the time of switching from the first mode to the second mode or from the second mode to the first mode.

As a result, frame rates of the first camera 81 and the second camera 93 can be made common. Note that the brightness of the image data can be made constant, for example, by controlling the product of the visible light transmittance and the light receiving sensitivity associated with each of the first camera 81 and the second camera 93 to be constant.

—Illumination Controller 216—

The illumination controller 216 reads the illumination condition set by the illumination setting section 215 from the storage device 21*b*, and controls the coaxial illuminator 79, the side illuminator 84, the second coaxial illuminator 94, or the second side illuminator 95 so as to reflect the read illumination condition. With this control, one or both of the coaxial illuminator 79 and the side illuminator 84 can be turned on, or one or both of the second coaxial illuminator 94 and the second side illuminator 95 can be turned on.

The illumination controller 216 further temporarily turns off all of the coaxial illuminator 79 and the side illuminator 84 regardless of the content of the illumination condition when laser light is emitted in the first mode.

The illumination controller 216 further causes the storage device 21*b* to store the illumination condition that has been referred at the time of execution of the turn-off before turning off the coaxial illuminator 79 or the side illuminator 84.

The illumination controller 216 releases the turn-off of the coaxial illuminator 79 and the side illuminator 84 at a timing after the emission of laser light is completed (for example, timing before and after analysis by the spectrum analyzer 213). At that time, the illumination controller 216 reads the illumination condition stored in the storage device 21*b* before execution of the turn-off, and reflects the illumination condition in turning on the coaxial illuminator 79 or the side illuminator 84.

<Specific Example of Control Flow>

Figure 20:
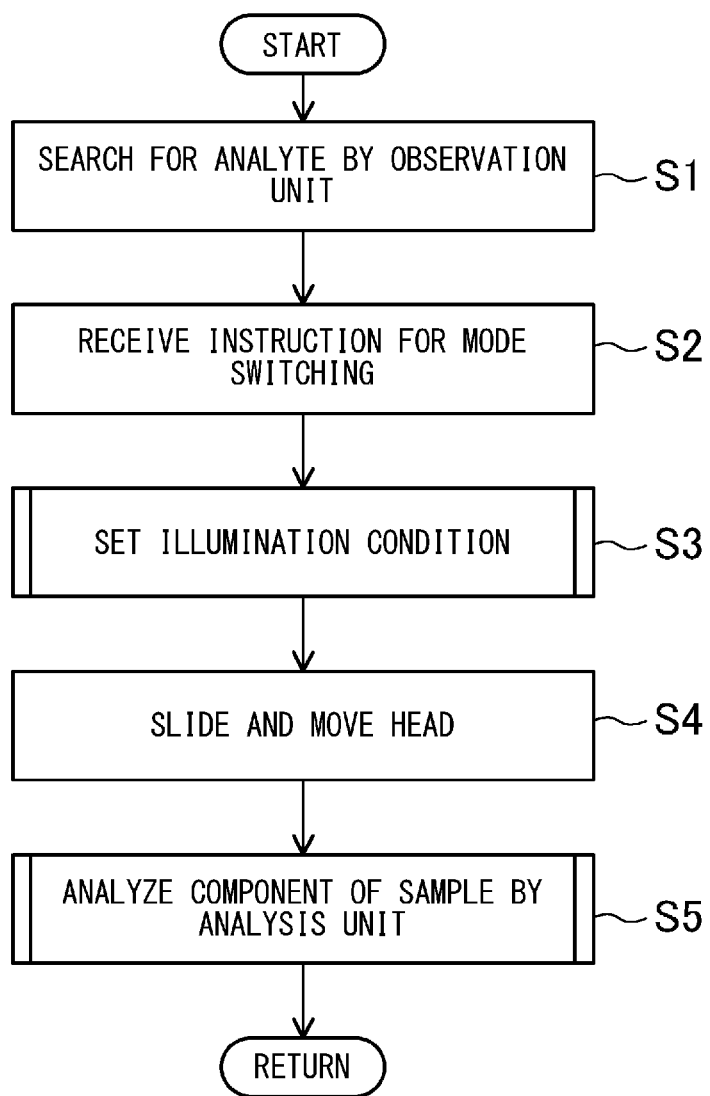
FIG. 20 is a flowchart illustrating a basic operation of the analysis and observation device.
Figure 21:
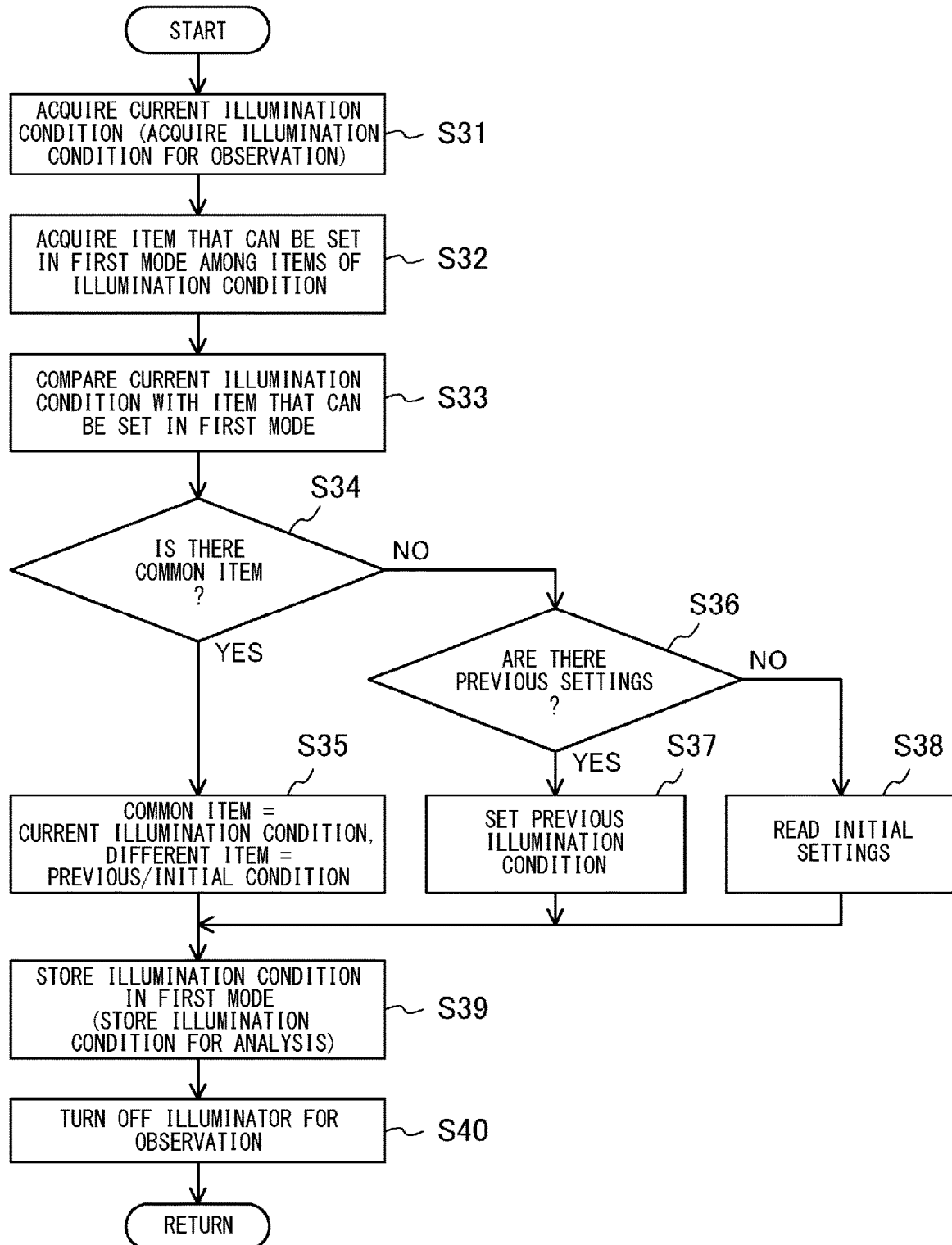
FIG. 21 is a flowchart illustrating an illumination condition setting procedure by an illumination setting section.
Figure 22:
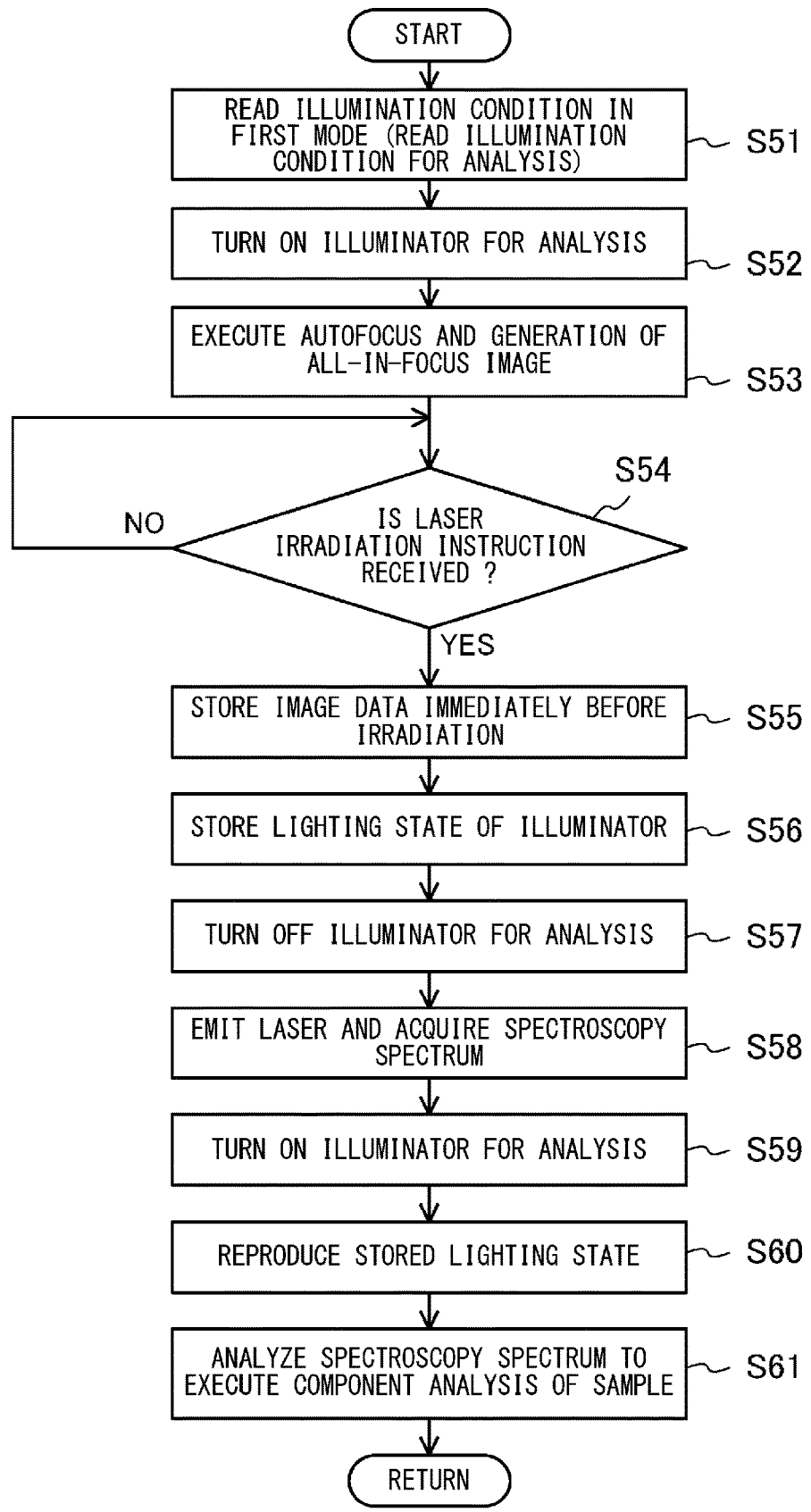
FIG. 22 is a flowchart illustrating a sample analysis procedure by the analysis optical system and a lighting state control procedure by an illumination controller.

FIG. 20 is a flowchart illustrating a basic operation of the analysis and observation device A. Further, FIG. 21 is a flowchart illustrating an illumination condition setting procedure by the illumination setting section 215, and FIG. 22 is a flowchart illustrating an analysis procedure of the sample SP by the analysis optical system 7 and a lighting state control procedure by the illumination controller 216. Further, FIG. 23 is a view illustrating a display screen of the analysis and observation device A.

First, the observation optical system 9 searches for an analyte in the second mode in step S1 of FIG. 20. In this step S1, the controller 21 searches for a portion (analyte) to be analyzed by the analysis optical system 7 among portions of the sample SP while adjusting conditions, such as the exposure time of the second camera 93 and the brightness of image data (first image data I1) generated by the second camera 93, such as illumination light guided by the optical fiber cable C3, based on an operation input by the user. At this time, the controller 21 stores the first image data I1 generated by the second camera 93 as necessary.

Note that the adjustment of the exposure time of the second camera 93 and the adjustment of the brightness of the illumination light can be also configured to be automatically executed by the controller 21 based on a detection signal of the lens sensor Sw1 without accompanying the operation input by the user.

Figure 23:
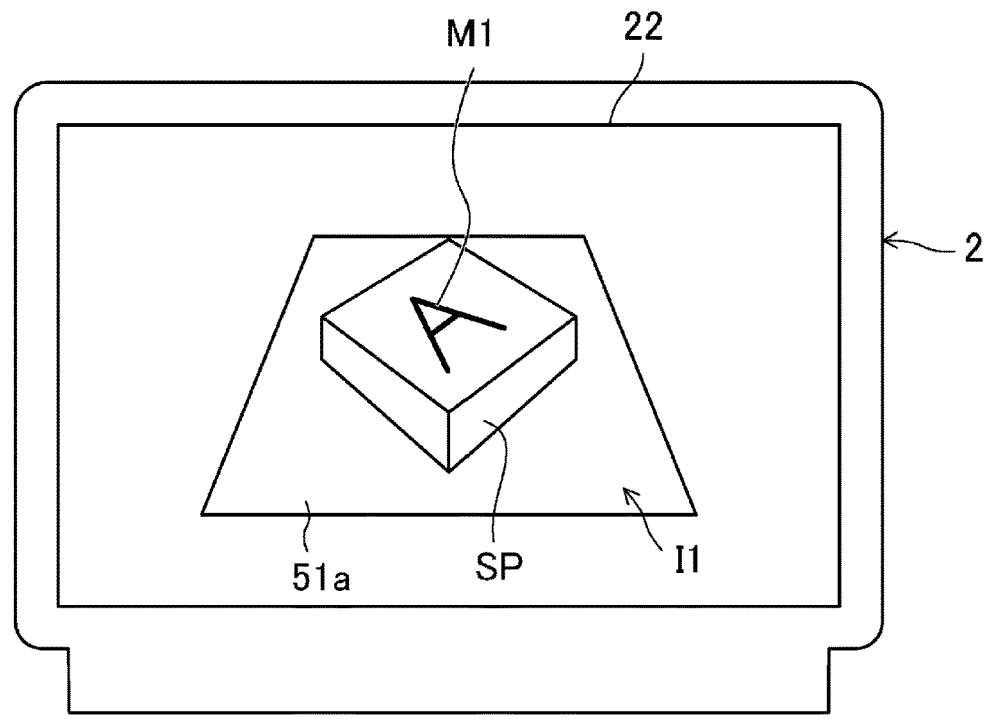
FIG. 23 is a view illustrating a display screen of the analysis and observation device.

FIG. 23 illustrates the display screen when the sample SP placed on the placement surface 51*a* is captured from obliquely above in the second mode. As illustrated in FIG. 23, a groove M1 indicating a character "A" is provided on an upper surface of the sample SP.

Figure 24:
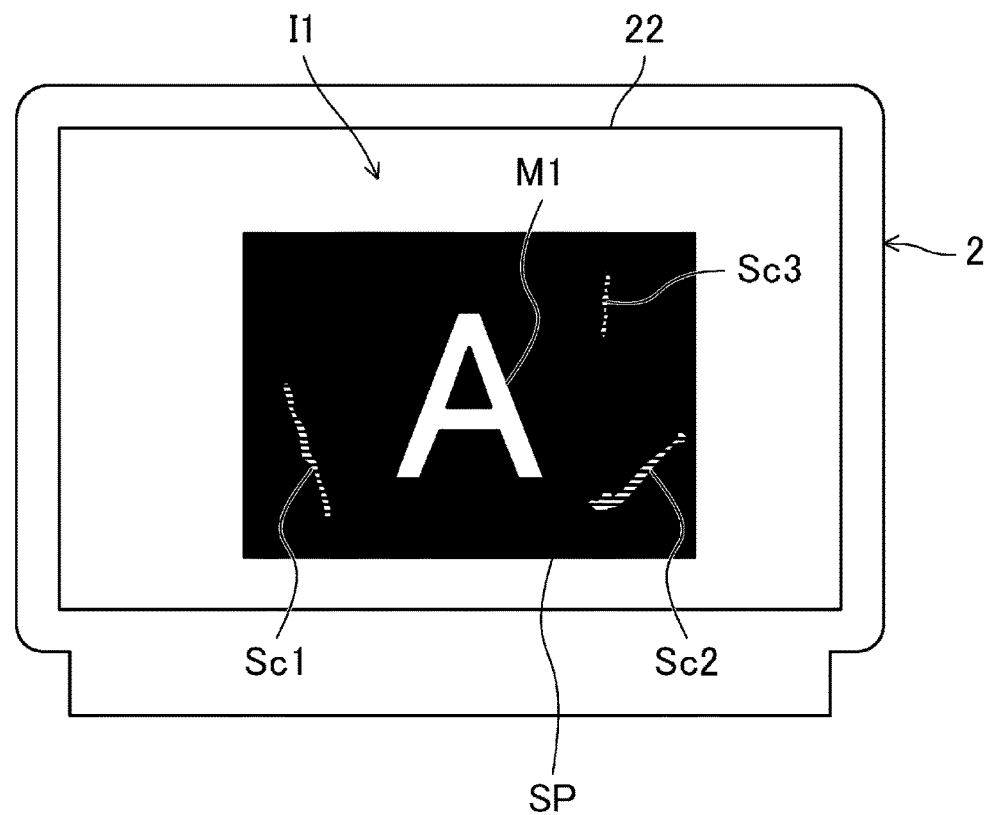
FIG. 24 is a view illustrating image data generated using the side illuminator in a second mode.

Further, FIG. 24 illustrates a display screen when the sample SP is captured from directly above ($\theta=\pm0°$) while using the second side illuminator 95 in the second mode. In this case, the first image data I1 generated by the image processor 214 based on a detection signal of the second camera 93 is displayed on the display 22.

Figure 25:
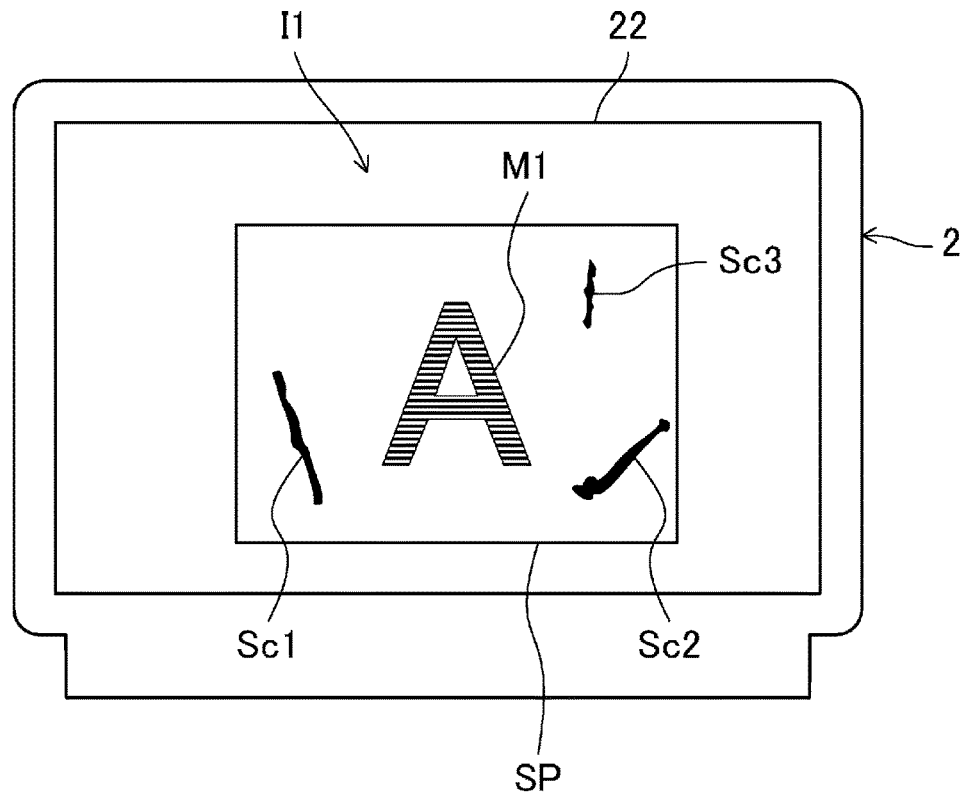
FIG. 25 is a view illustrating image data generated using a coaxial illuminator in the second mode.

On the other hand, FIG. 25 illustrates a display screen when the sample SP is captured from directly above ($\theta=\pm0°$) while using the second coaxial illuminator 94 in the second mode. In this case, the first image data I1 generated by the image processor 214 based on a detection signal of the second camera 93 is displayed on the display 22.

As illustrated in FIGS. 24 and 25, images that appear that the contrast of light and darkness of the first image data I1 is inverted are obtained in a case where the second side illuminator 85 is used and a case where the second coaxial illuminator 94 is used. Specifically, for example, in a case where the sample SP having a uniform surface, such as metal, is used, a large amount of specular reflection light is emitted from a metal surface. Thus, when the second coaxial illuminator 94 is used, a relatively large amount of reflection light is collected by the objective lens 92, so that a relatively bright image is obtained. On the other hand, when the second side illuminator 85 is used for the similar sample SP, a relatively small amount of specular reflection light is collected by the objective lens 92, so that a relatively dark image is obtained.

Since the light and darkness of the image is made different depending on the type of illuminator in this manner, even information (for example, a surface state of the sample SP) that is difficult to visually recognize when one illuminator is used becomes easily visually recognized when the other illuminator is used.

For example, in examples illustrated in FIGS. 24 and 25, not only the groove M1 but also the light and darkness of a minute uneven structure, such as scratches Sc1 and Sc2 existing on the surface of the sample SP, changes. In FIG. 24, it is easy to visually recognize the groove M1, but it is difficult to visually recognize the scratches Sc1 and Sc2. Further, it is also difficult to visually recognize a scratch Sc3 in FIG. 24. On the other hand, in FIG. 25, it is difficult to visually recognize the groove M1, but it is easy to visually recognize the scratches Sc1 and Sc2. Further, the scratch Sc3 is clearly visually recognized in FIG. 25. In this manner, the user can more appropriately grasp the surface state of the sample SP by changing the illuminator according to the type of the sample SP.

In the subsequent step S2, the controller 21 receives an instruction for switching from the second mode to the first mode based on an operation input by the user. At this time, the operation of the slide mechanism 65 by the mode switcher 211 is not executed.

Subsequently, in step S3, an illumination condition is set by the illumination setting section 215 before executing the mode switching. The processing performed in step S3 is illustrated in FIG. 21. That is, step S3 in FIG. 20 includes steps S31 to S40 in FIG. 21.

First, in step S31 of FIG. 21, the illumination setting section 215 acquires each of items forming a current illumination condition (illumination condition being referred to in the second mode).

In the subsequent step S32, the illumination setting section 215 acquires an item available in the first mode among items forming an illumination condition that needs to be referred to in the first mode.

In the subsequent step S33, the illumination setting section 215 compares each item of the current illumination condition acquired in step S31 with the available item acquired in step S32, and extracts a common item therebetween.

In the subsequent step S34, the illumination setting section 215 determines whether or not a common item has been extracted in step S33 (whether or not there is a common item), and proceeds to step S35 if the determination is YES or proceeds to step S36 if the determination is NO.

In step S35, the illumination setting section 215 uses the current illumination condition for the common item extracted in step S33 (item that can be used in both the first mode and the second mode, such as a block in which direction is to be turned on in the side illuminator 84 and the second side illuminator 95) among the illumination conditions including the plurality of items. On the other hand, previously used settings, initial settings, and the like are read for items not extracted in step S33 (for example, setting items unique to the first mode related to the configuration of analysis optical system 7). When the setting of each item is completed, the illumination setting section 215 advances the control process to step S39 and causes the storage device 21b to store the set illumination condition as the illumination condition for the first mode.

On the other hand, in step S36, the illumination setting section 215 determines whether or not there are the previously used settings, and proceeds to step S37 if the determination is YES, and proceeds to step S38 if the determination is NO. In step S37, the illumination setting section 215 reads the previously used settings as an illumination condition, proceeds to step S39, and causes the storage device 21b to store the read illumination condition as the illumination condition for the first mode. Further, in step S38, the illumination setting section 215 reads the initial settings as an illumination condition, proceeds to step S39, and causes the storage device 21b to store the read illumination condition as the illumination condition for the first mode.

In step S40 subsequent to step S39, the illumination controller 216 turns off an illumination for observation (the second coaxial illuminator 94 or the second side illuminator 95) and ends the flow illustrated in FIG. 21. Thereafter, the control process proceeds from step S3 to step S4 in FIG. 20.

In step S4, the mode switcher 211 operates the slide mechanism 65 to slide the observation optical system 9 and the analysis optical system 7 integrally, so that the switching from the second mode to the first mode is executed.

In the subsequent step S5, the illumination control by the illumination controller 216 and the component analysis of the sample SP by the spectrum acquirer 212 and the spectrum analyzer 213 are executed after the mode switching is completed. The processing performed in step S5 is illustrated in FIG. 22. That is, step S5 in FIG. 20 includes steps S51 to S61 in FIG. 22.

First, in step S51, the illumination controller 216 reads the illumination condition set by the illumination setting section 215 from the storage device 21b. In the subsequent step S52, the illumination controller 216 turns on an illuminator for analysis (the coaxial illuminator 79 or the side illuminator 84) so as to reflect the illumination condition read in step S51. As a result, the respective control parameters related to the illuminator for analysis, such as the exposure time of the first camera 81 and the light amount of illumination light emitted from the LED light source 79a, reproduce the control parameters in the second mode as much as possible.

In the present embodiment, the reflective object lens 74 for component analysis has a shallower subject depth during observation than the objective lens 92 for observation.

Therefore, the illumination controller 216 executes autofocus at each position in the second image data I2 and generates an all-in-focus image in step S53 subsequent to step S52.

Further, in a case where the magnification of the objective lens 92 is lower than that of the reflective object lens 74, the image processor 214 can display, on the display 22, only the first image data IL stored at the time of switching from the second mode to the first mode, as a mapping image, and any point in the mapping image that has been captured as the second image data I2.

FIG. 25 illustrates the display screen when the sample SP is captured from directly above (θ=±0°) using the coaxial illuminator 79 in the first mode. In this case, the second image data I2 generated by the image processor 214 based on a detection signal of the first camera 81 is displayed on the display 22.

On the other hand, FIG. 26 illustrates a display screen when the sample SP is captured from directly above (θ=±0°) while using the side illuminator 84 in the second mode. In this case, the second image data I2 generated by the image processor 214 based on a detection signal of the first camera 81 is displayed on the display 22.

When comparing the case of using the coaxial illuminator 79 and the case of using the side illuminator 84, images that appear that the contrast of light and darkness of the second image data I2 is inverted are obtained as in the comparison between the second side illuminator 95 and the second coaxial illuminator 94. As described above, not only the groove M1 but also the light and darkness of the minute uneven structures, such as the scratches Sc1 and Sc2 existing on the surface of the sample SP, changes by selectively using the two types of illuminators. The user can more appropriately grasp the surface state of the sample SP by changing the illuminator according to the type of the sample SP.

Further, the image processor 214 can also display a mark P1 indicating an irradiation position of laser light (laser irradiation point) in an overlay manner on the second image data I2. The mark P1 indicates the alignment of the laser light. The user can confirm whether or not an analyte is appropriately set by checking a position of the mark P1. The image processor 214 can cause the control process to proceed based on an operation input (for example, a manual input by the user) indicating a result of the confirmation.

Here, when the analyte is not appropriately set, the head 6 drives the placement stage drive 53 to adjust a position of the placement stage main body 51 based on, for example, an operation input by the user. As a result, a relative position of the sample SP with respect to the mark P1 can be corrected.

In the subsequent step S54, the controller 21 determines whether or not a laser light irradiation instruction has been received. This determination is executed, for example, based on an operation input by the user. Until this determination becomes YES, the controller 21 repeats step S54.

In the subsequent step S55, the image processor 214 stores the second image data I2 immediately before the laser light irradiation in the storage device 21b. In the subsequent step S56, the illumination controller 216 causes the storage device 21b to store a lighting state of an illuminator at that time (illumination condition at a timing immediately before emission of the laser light). In the subsequent step S57, the illumination controller 216 turns off the illuminator for analysis (the coaxial illuminator 79 or the side illuminator 84).

Then, in step S58, the spectrum acquirer 212 causes the analysis optical system 7 to emit the laser light to the sample SP. In step S58, the first and second detectors 77A and 77B receive light (secondary electromagnetic wave) emitted due to plasma occurring on the sample SP. At that time, light reception timings of the first and second detectors 77A and 77B are set to be synchronized with an emission timing of the laser light. The spectrum acquirer 212 acquires an intensity distribution spectrum in accordance with the emission timing of the laser light.

In the subsequent step S59, the illumination controller 216 turns on the illuminator for analysis (the coaxial illuminator 79 or the side illuminator 84). In the subsequent step S60, the illumination controller 216 reads an illumination condition stored in the storage device 21b and controls the illuminator for analysis so as to reflect the illumination condition. As a result, the lighting state immediately before emission of the laser light is reproduced. Note that the order of steps S59 and S60 may be exchanged, or both steps may be executed simultaneously.

In the subsequent step S61, the spectrum analyzer 213 analyzes the intensity distribution spectrum to execute analysis of components and component ratios of elements contained in the sample SP and estimation of a material based on the component ratios. A result of the material estimation is displayed on the display 22, for example. As a result, step S5 in FIG. 20 is completed, and the flow illustrated in FIG. 20 ends.

<Main Features of Analysis and Observation Device A>

(Features Contributing to Improvement of Measurement Accuracy)

As described above, the transmissive region 12a according to the present embodiment transmits the primary electromagnetic wave, which has been emitted from the electromagnetic wave emitter 71 and passed through the opening 11a, to emit the primary electromagnetic wave along the analysis optical axis Aa of the reflective object lens 74 as illustrated in FIGS. 8A and 14. The sample SP is irradiated with the primary electromagnetic wave in the state of being coaxial with the analysis optical axis Aa. As a result, the secondary electromagnetic wave generated in the sample SP can be collected as sufficiently as possible by the primary mirror 11. As a result, the intensity of the secondary electromagnetic wave reaching the first and second detectors 77A and 77B can be increased, and the detection accuracy of the analysis and observation device A can be enhanced.

Further, the secondary electromagnetic wave collected by the reflective object lens 74 reaches the first or second detectors 77A and 77B via the first or second parabolic mirrors 76A and 76B as illustrated in FIG. 7. Since the secondary electromagnetic wave is guided by using only a reflection system in this manner, it is possible to implement a fiberless configuration that does not require an optical fiber. As a result, a loss of the secondary electromagnetic wave is suppressed as much as possible, which is advantageous in terms of enhancing the detection accuracy of the analysis and observation device A.

Further, each gain of the secondary electromagnetic wave received by the first and second detectors 77A and 77B can be maximized by aligning the focal positions of the first and second parabolic mirrors 76A and 76B with the entrance slits 77a and 77a of the first and second detectors 77A and 77B, respectively, as illustrated in FIG. 7. This is advantageous in terms of enhancing the detection accuracy of the analysis and observation device A.

Further, the analysis and observation device A is configured to guide the first wavelength region on the ultraviolet side, which is likely to be lost due to transmission through a glass material, to the first detector 77A without requiring the transmission through the spectroscopic element 75 mainly made of the glass material, and to cause the second wavelength region on the infrared side, which is less affected by the loss than the first wavelength region, to be transmitted through the spectroscopic element 75 and guided to the second detector 77B as illustrated in FIG. 7. With this configuration, it is possible to implement detection by the plurality of detectors while suppressing the loss of the secondary electromagnetic wave as much as possible. The detection by the plurality of detectors contributes to improvement of wavelength resolution. Therefore, such a configuration contributes to improvement of measurement accuracy due to suppression of the loss of the secondary electromagnetic wave and improvement of the wavelength resolution.

Further, the deflection element 73 reflects the primary electromagnetic wave by the reflective region 731 to be guided to the reflective object lens 74, and allows the secondary electromagnetic wave to pass through the hollow region 732 as illustrated in FIG. 14. The loss of the secondary electromagnetic wave can be suppressed by allowing the secondary electromagnetic wave to pass through the hollow region 732. Therefore, such a configuration is advantageous in terms of achieving both the coaxial setting of the coaxial primary electromagnetic wave by the reflective region 731 and the improvement of measurement accuracy due to the suppression of loss of the secondary electromagnetic wave.

Further, the reflective region 731 and the hollow region 732 can be simultaneously obtained by the single deflection element 73 as illustrated in FIG. 12. Such a configuration is advantageous in terms of achieving both the coaxial setting of the coaxial primary electromagnetic wave by the reflective region 731 and the improvement of measurement accuracy due to the suppression of loss of the secondary electromagnetic wave.

Further, the secondary electromagnetic wave having passed through a region near the first supporting leg 73d can pass through the deflection element 73 without being blocked by the second supporting leg 14b as illustrated in FIG. 14. This is advantageous in terms of suppressing the loss of the secondary electromagnetic wave and achieving the improvement of the measurement accuracy in the analysis and observation device A.

Further, the through-hole 73b defining the hollow region 732 is formed to extend along the analysis optical axis Aa direction of the reflective object lens 74 as illustrated in FIG. 13. When being formed in this manner, the through-hole 73b can be configured to be rotationally symmetric (three-fold symmetric in the illustrated example) in a plan view at the time of rotating the through-hole 73b by a predetermined angle about the analysis optical axis Aa. As a result, it is possible to secure a distance between the inner peripheral surface of the through-hole 73b and the secondary electromagnetic wave passing through the hollow region 732 and to suppress interference between the through-hole 73b and the secondary electromagnetic wave. This is advantageous in terms of suppressing the loss of the secondary electromagnetic wave, and contributes to the improvement of measurement accuracy.

Further, not only the primary electromagnetic wave but also the optical axis of the first camera 81 is also set to be coaxial with the reflective object lens 74 as illustrated in FIG. 7. As a result, the three functions including the irradiation of the sample SP with the primary electromagnetic wave, the collection of the secondary electromagnetic wave from the sample SP, and the capturing of the sample SP by the first camera 81 can be implemented by the single reflective object lens 74 without inhibiting each other.

Further, the optical thin film 13b is interposed between the transmissive region 12a and the placement surface 51a, and thus, the collection of reflection light via the transmissive region 12a can be suppressed, and reflection light can be collected only by the primary reflection surface 11b and the secondary reflection surface 12b. As a result, a possibility that the reflection light is doubly captured in the first camera 81 is suppressed, which is advantageous in terms of improving the measurement accuracy.

Further, not only the optical axis of the first camera 81 but also the coaxial illuminator 79 is also set to be coaxial with the reflective object lens 74 as illustrated in FIG. 7. As a result, four functions including the irradiation of the sample SP with the primary electromagnetic wave, the collection of the secondary electromagnetic wave from the sample SP, the capturing of the sample SP by the first camera 81, and irradiation of the sample SP with the illumination light can be implemented by the single reflective object lens 74 without inhibiting each other.

(Features Contributing to Improvement of Usability)

Further, the analysis and observation device A according to the present embodiment includes the first camera 81 as the camera for analysis, and includes the side illuminator 84 that irradiates the analyte with illumination light from obliquely above as illustrated in FIGS. 8A and 8B as an illumination device used for capturing by the first camera 81. Since the side illuminator 84 is provided around the reflective object lens 74, which is the collection head, in this manner, it is possible to cause the user to grasp the surface state that is difficult to grasp if another illuminator, such as a coaxial illuminator, is used. As a result, the usability in the component analysis can be improved.

Further, since the side illuminator 84 is arranged on the outer periphery of the reflective object lens 74, it is possible to emit the illumination light over a wider area without impairing a compact size of the reflective object lens 74. As a result, image data excellent in visibility is generated, and the user can more clearly grasp the surface state of the sample SP.

Further, the side illuminator 84 according to the present embodiment can emit the illumination light so as to be rotationally symmetric about the analysis optical axis Aa of the reflective object lens 74, for example, as illustrated in FIG. 10. This is advantageous in terms of sufficiently irradiating a region to be captured by the first camera 81 with the illumination light.

Further, the illumination light can be emitted over a wider area by emitting the illumination light via the light guide member 84c as illustrated in FIG. 8B. As a result, it is possible to suppress the occurrence of vignetting that is likely to be caused by the secondary mirror 12, the second supporting leg 14b, or the like. Since the occurrence of vignetting is suppressed, it is possible to suppress the occurrence of shading in image data. As a result, image data more excellent in visibility is generated, and the user can more clearly grasp the surface state of the sample SP.

Further, thermal connection between the LED light source 84b and the primary mirror 11 and the secondary mirror 12 is suppressed by adopting the configuration in which the side illuminator 84 and the reflective object lens 74 are not directly connected as illustrated in FIGS. 8A and 8B. As a result, it is possible to suppress thermal influence on the primary mirror 11 and the secondary mirror 12 due to heat generation from the LED light source 84b. Since the thermal influence on the primary mirror 11 and the secondary mirror 12 is suppressed, positional displacement between both the mirrors 11 and 12 can be suppressed. This is advantageous in terms of securing the accuracy of component analysis by the controller 21.

Further, the LED light source 84b is arranged between the primary mirror 11 and the secondary mirror 12 in the optical axis direction as illustrated in FIGS. 8A and 8B, and thus, the LED light source 84b can be prevented from approaching the placement surface 51a more than necessary. As a result, it is possible to sufficiently secure the accommodation space of the light guide member 84c in the optical axis direction. Further, since the LED light source 84b is configured so as not to be separated from the placement surface 51a more than necessary, it is possible to sufficiently secure a tilting angle formed by the side illuminator 84 relative to the reflective object lens 74 without excessively increasing the diameter of the side illuminator 84. As a result, an appropriate region can be irradiated with the illumination light, and image data with excellent visibility can be generated. As a result, the user can more clearly grasp the surface state of the sample SP.

Further, the side illuminator 84 including the plurality of blocks can emit the illumination light from various angles by individually turning on the respective blocks as illustrated in FIG. 10. As a result, the user can more clearly grasp the surface state of the sample SP.

Further, the analysis and observation device A according to the present embodiment can selectively use two types of illumination devices having different irradiation directions. As a result, more variety of image data can be generated, which is advantageous in terms of allowing the user to grasp the surface state of the sample SP.

Further, the analysis and observation device A can selectively use the two types of illumination devices having different irradiation directions not only in the analysis optical system 7 but also in the observation optical system 9. As a result, more variety of image data can be generated, which is advantageous in terms of allowing the user to grasp the surface state of the sample SP.

Further, the controller 21 as the processor can generate image data under the same conditions as much as possible between the observation and the analysis of the sample SP as described with reference to FIGS. 21 and 22. As a result, it is possible to switch between the image data (first image data I1) generated during the observation and the image data (second image data I2) generated during the analysis without giving a sense of discomfort to the user, which is advantageous in terms of improving the usability.

Further, the analysis and observation device A according to the present embodiment is configured to make the working distance consistent between the observation and the analysis of the sample SP. As a result, image data can be generated under the same conditions as much as possible between the observation and the analysis of the sample SP. As a result, it is possible to switch between the image data (first image data I1) generated during the observation and the image data (second image data I2) generated during the analysis without giving a sense of discomfort to the user, which is advantageous in terms of improving the usability.

Other Embodiments (Modification Related to Hardware Configuration)

FIG. 28 is a bottom view illustrating a modification of the side illuminator.

Although the side illuminator 84 is configured by the annular illumination capable of emitting the annular illumination light in the above embodiment, the present disclosure is not limited to such a configuration. The side illuminator device according to the present disclosure includes a general illumination device that is arranged so as to surround the reflective object lens 74, which is the collection head, and irradiates the sample SP with illumination light from obliquely above. That is, the side illuminator is not limited to the side illuminator 84, which is the annular illuminator illustrated in the upper part of FIG. 28, and a rectangular illuminator 84' illustrated in the middle part of FIG. 28 may be used as the side illuminator, or a cross-shaped illuminator 84" illustrated in the lower part of FIG. 28 may be used as the side illuminator.

Further, the above embodiment is configured such that the observation housing 90 is supported by the outer surface of the analysis housing 70, but the present disclosure is not limited to such a configuration. The observation housing 90 or the observation unit 9*a* may be supported by an inner surface of the analysis housing 70. In this case, the observation housing 90 or the observation unit 9*a* is accommodated in the analysis housing 70 similarly to the analysis optical system 7.

Further, the above embodiment is configured such that the observation optical axis Ao and the analysis optical axis Aa ae parallel to each other, but the present disclosure is not limited to such a configuration. The analysis optical system 7 and the observation optical system 9 can also be arranged such that the observation optical axis Ao and the analysis optical axis Aa are twisted.

(Modification of Analysis Method)

Although the analysis and observation device A according to the above embodiment is configured to perform the component analysis using the LIBS method by causing the electromagnetic wave emitter 71 to emit the laser light as the primary electromagnetic wave, the present disclosure is not limited to such a configuration.

For example, infrared light may be used as the primary electromagnetic wave to perform analysis by infrared spectroscopy, instead of the LIBS method. Specifically, a chemical structure of a molecule contained in an observation target may be analyzed by irradiating the observation target with the infrared light and measuring transmitted or reflection light (secondary electromagnetic wave). Monochromatic light may be used as the electromagnetic wave to perform analysis by Raman spectroscopy in which physical properties, such as crystallinity of an observation target, are investigated using Raman scattered light generated by irradiating the observation target with the monochromatic light. Further, light in an ultraviolet region, a visible region, and an infrared region of about 180 to 3000 nm may be used as the electromagnetic wave to perform analysis by ultraviolet-visible near-infrared spectroscopy. Specifically, qualitative and quantitative analysis of a target component contained in an observation target may be performed by irradiating the observation target with the electromagnetic wave and measuring transmitted or reflection light. Furthermore, spectroscopic analysis of an X-ray region may be performed by using an X-ray as the electromagnetic wave. Specifically, X-ray fluorescence analysis may be performed in which an observation target (specimen) is irradiated with X-rays, and elements of the observation target are analyzed by energy and intensity of fluorescent X-rays which are unique X-rays generated by the irradiation. An electron beam may be used instead of the electromagnetic wave to analyze a surface of an observation target based on energy and intensity of reflected electrons generated by irradiating the observation target with the electron beam. The configuration according to the present disclosure is also applicable to a case of performing spectroscopy in the above analysis.

What is claimed is:

1. An analysis device which performs component analysis of an analyte, the analysis device comprising:
   an electromagnetic wave emitter that emits a primary electromagnetic wave for analysis of the analyte;
   a reflective object lens for collecting a secondary electromagnetic wave generated on the analyte due to the emission of the primary electromagnetic wave that has a primary mirror, having an opening at a radial center, which is provided a primary reflection surface around the opening to reflect the secondary electromagnetic wave, and a secondary mirror which is provided a secondary reflection surface to receive and further reflect the secondary electromagnetic wave reflected by the primary reflection surface;
   a detector that receives the secondary electromagnetic wave generated on the analyte and collected by the reflective object lens, and generates an intensity distribution spectrum which is an intensity distribution for each wavelength of the secondary electromagnetic wave; and
   a processor that performs the component analysis of the analyte based on the intensity distribution spectrum generated by the detector,
   wherein the secondary reflection surface is provided at an outer edge of the secondary mirror, and a transmissive region through which the primary electromagnetic wave is transmitted is provided at a center of the secondary mirror,
   the transmissive region is configured to emit the primary electromagnetic wave along an optical axis of the reflective object lens by transmitting the primary electromagnetic wave emitted from the electromagnetic wave emitter and passed through the opening, and
   the reflective object lens is configured to emit the primary electromagnetic wave to the analyte by passing through the opening and transmitting through the transmissive region, and is configured to guide the secondary electromagnetic wave generated on the analyte by irradiating the analyte with the primary electromagnetic wave to the opening by reflecting the secondary electromagnetic wave with the primary reflection surface and the secondary reflection surface.

2. The analysis device according to claim 1, further comprising
   a parabolic mirror that reflects the secondary electromagnetic wave collected by the reflective object lens,
   wherein the parabolic mirror is configured to condense the secondary electromagnetic wave, reflected by the parabolic mirror, on the detector.

3. The analysis device according to claim 1, further comprising
   a spectroscopic element made of a material having a higher transmittance of a second wavelength region belonging to a wavelength region equal to or more than a predetermined wavelength than that of a first wavelength region belonging to a wavelength region less than the predetermined wavelength,
   wherein the spectroscopic element is configured to receive the secondary electromagnetic wave collected by the reflective object lens and reflect the secondary electromagnetic wave corresponding to the first wavelength region out of the secondary electromagnetic waves, and to transmit the secondary electromagnetic wave corresponding to the second wavelength region out of the secondary electromagnetic waves, and the detector has a first detector on which the secondary electromagnetic wave reflected by the spectroscopic element is incident, and a second detector on which the secondary electromagnetic wave transmitted through the spectroscopic element is incident.

4. The analysis device according to claim 1, further comprising a deflection element on which the primary electromagnetic wave emitted from the electromagnetic wave emitter is incident and which deflects the primary electromagnetic wave in an optical axis direction of the reflective object lens, wherein the deflection element has a reflective region arranged to oppose the transmissive region so as to reflect the primary electromagnetic wave along the optical axis direction of the reflective object lens, and a hollow region allowing passage of the secondary electromagnetic wave collected by the reflective object lens.

5. The analysis device according to claim 4, further comprising an analysis housing that accommodates the deflection element, wherein the deflection element has a plate-shaped element supporter attached to the analysis housing and provided with a through-hole, a mirror member which is arranged at a center of the through-hole and forms the reflective region, and a first supporting leg which radially extends from an outer side surface of the mirror member and is connected to an inner side surface of the through-hole, and the hollow region is defined by the inner side surface of the through-hole and the outer side surface of the mirror member.

6. The analysis device according to claim 5, wherein the secondary mirror is connected to the analysis housing via an annular mirror supporter arranged around the secondary reflection surface and attached to the analysis housing, and a second supporting leg which radially extends from an outer edge of the secondary reflection surface and is connected to an inner peripheral surface of the mirror supporter, and the first and second supporting legs are arranged to overlap each other when viewed along the optical axis direction of the reflective object lens.

7. The analysis device according to claim 5, wherein the element supporter is attached to the analysis housing in a posture in which a thickness direction is tilted with respect to the optical axis direction of the reflective object lens, and the through-hole is formed so as to penetrate the element supporter along the optical axis direction of the reflective object lens.

8. The analysis device according to claim 1, further comprising a camera that collects reflection light, reflected by the analyte via the reflective object lens, and detects a light reception amount of the collected reflection light, wherein the camera receives the reflection light collected via an optical path common to the secondary electromagnetic wave collected by the reflective object lens.

9. The analysis device according to claim 8, wherein an optical thin film that blocks the reflection light reflected by the analyte is interposed between the transmissive region and a placement surface on which the analyte is placed, and the camera receives reflection light reflected by the primary reflection surface and the secondary reflection surface.

10. The analysis device according to claim 8, further comprising a coaxial illuminator that irradiates the analyte with illumination light, wherein the coaxial illuminator emits the illumination light via an optical path coaxial with the primary electromagnetic wave emitted from the electromagnetic wave emitter.

11. The analysis device according to claim 1, wherein the electromagnetic wave emitter is configured using a laser light source that emits laser light as the primary electromagnetic wave, the reflective object lens collects light generated on the analyte by irradiating the laser light emitted from the electromagnetic wave emitter, and the detector generates an intensity distribution spectrum which is an intensity distribution for each wavelength of light generated on the analyte and collected by the reflective object lens.

* * * * *